United States Patent
Sudhakaran et al.

(10) Patent No.: US 6,636,901 B2
(45) Date of Patent: Oct. 21, 2003

(54) OBJECT-ORIENTED RESOURCE LOCK AND ENTRY REGISTER

(75) Inventors: Erath Unikat Sudhakaran, San Jose, CA (US); Glenn P. Andert, Cupertino, CA (US)

(73) Assignee: Object Technology Licensing Corp., Cupertino, CA (US)

( * ) Notice: Subject to any disclaimer, the term of this patent is extended or adjusted under 35 U.S.C. 154(b) by 0 days.

(21) Appl. No.: 09/016,693

(22) Filed: Jan. 30, 1998

(65) Prior Publication Data

US 2003/0014468 A1 Jan. 16, 2003

(51) Int. Cl.[7] .................................................. G06F 9/52
(52) U.S. Cl. ........................................ 709/327; 710/200
(58) Field of Search ................................ 709/104, 322; 710/104, 8, 10, 220, 240, 244; 711/167, 168, 169

(56) References Cited

U.S. PATENT DOCUMENTS

| | | | |
|---|---|---|---|
| 5,161,102 A | * 11/1992 | Griffin et al. | 710/104 |
| 5,353,432 A | * 10/1994 | Richek et al. | 710/10 |
| 5,446,454 A | 8/1995 | Koike | |
| 5,450,570 A | 9/1995 | Richek et al. | |
| 5,524,269 A | 6/1996 | Hamilton et al. | |
| 5,537,337 A | 7/1996 | Williams | |
| 5,546,595 A | 8/1996 | Norman et al. | |
| 5,548,779 A | 8/1996 | Andert et al. | |
| 5,596,728 A | 1/1997 | Belmont | |
| 5,652,832 A | 7/1997 | Kane et al. | |
| 5,675,748 A | 10/1997 | Ross | |
| 5,761,603 A | 6/1998 | Nojima et al. | |
| 5,793,979 A | 8/1998 | Lichtman et al. | |
| 5,815,731 A | 9/1998 | Doyle et al. | |
| 5,875,309 A | 2/1999 | Itkowsky et al. | |
| 5,884,075 A | 3/1999 | Hester et al. | |

OTHER PUBLICATIONS

Hardware Adapter Configuration, IBM TDB, vol. 31, No. 12, May 1989, p. 344.

Levy–Abegnoli T., "Plug and Play: Une Philosophie De Conception Des PC" Electronique, No. 37; Apr. 1994; pp. 36–39.

* cited by examiner

Primary Examiner—St. John Courtenay, III
(74) Attorney, Agent, or Firm—Kudirka & Jobse, LLP

(57) ABSTRACT

System resources are automatically assigned by a single resource conflict resolver to all functions on expansion buses in a computer system. Such system resources include, but are not limited to, memory ranges, input-output (I/O) register ranges, interrupt request lines and direct memory access (DMA) channels. Generally, the assignment is exclusive, however, in some cases, the assignment may be shared so that one or more resources will be shared between different functions. In order to prevent contention between two functions for the same resource, classes are provided which classes can be instantiated to construct resource lock objects. The resource lock objects provide an access control mechanism to synchronize access to the resources among the devices that use and, possibly, share the resources. The lock object contains methods which retrieve the resource assignments for an I/O function and acquire a lock on the resources. The lock object can be used by device drivers to first retrieve the resource assignments from the hardware configuration database and then acquire access to the resources assigned to an I/O function. The acquired access can be either exclusive or shared.

24 Claims, 25 Drawing Sheets

OBJECT-ORIENTED RESOURCE LOCK AND ENTRY REGISTER

COPYRIGHT NOTIFICATION

Portions of this patent application contain material that is subject to copyright protection. The copyright owner has no objection to the facsimile reproduction by anyone of the patent document, or the patent disclosure, as it appears in the Patent and Trademark Office. All other rights are expressly reserved.

FIELD OF THE INVENTION

This invention relates to the configuration of computer systems and, more particularly, to an object-oriented apparatus and a method for assigning computer system resources to a plurality of I/O devices coupled to the computer system while avoiding conflicts among the devices for the resources.

BACKGROUND OF THE INVENTION

A typical computer system is comprised of a variety of interconnected computer hardware components and devices. The terms "computer hardware components," "hardware components," "peripheral devices" or simply "devices" all refer to individual electronic devices which are coupled together to provide the computer system. For example, the computer keyboard, mouse, monitor, printer, hard disk drives, floppy disk drives, memory boards and the like constitute such devices. Many of these components are mounted on a printed circuit board generally referred to as a "planar" or a "motherboard."

In many conventional architectures, the various components are connected together by means of a system bus which defines a medium over which information is transferred between the components. The system bus typically includes data, address and control lines which carry data, address and control information between the various system components. For example, an interrupt signal may be sent from one or more of the peripheral devices over the control lines of the system bus to the processor.

The system bus and some basic hardware components connected to the system bus form an integrated system which is generally contained on the motherboard. In many personal computer systems, the system bus is connected to an extension called an "expansion" bus and the motherboard typically has one or more slots or connectors on the expansion bus, which connectors are referred to as "expansion slots" or "expansion connectors."

To enhance the performance of the computer system, additional hardware components on printed circuit boards referred to as "device expansion boards", "device expansion cards", "expansion boards" or "expansion cards" can be plugged into the expansion slots. Depending upon the particular architecture of the computer system bus, an expansion card may constitute a bus adapter which has its own bus and slots. Other expansion cards can then be plugged into these latter slots.

Expansion cards are generally coupled to a computer system to enhance the capabilities or performance of the computer system. For example, one type of expansion card is a memory expansion card which may be used to increase the amount of random access memory (RAM) available for use by the processor of the computer system. Other expansion cards include sound cards, SCSI bus adapters, graphics accelerator cards and others.

Many expansion cards can be customized or configured by setting the values of one or more parameters. In some cards, the values are set manually by changing jumpers of switches located on the boards. In other cases, the parameters are set either manually or automatically by software. More particularly, the computer system is typically controlled and coordinated by a software program called a computer operating system (e.g. MS-DOS, OS/2, etc . . . ). Each device connected to the system bus interacts with the computer operating system through another software routine called a device driver. The device driver receives commands from the operating system and uses the commands to control the device.

In the case where device parameters are set by software, the device driver can often access the device parameters which parameters may be stored in the device itself, in the computer memory or in other portions of the computer system. The device parameters can then be set manually through the device driver software. In other cases, the device parameters are set automatically be means of configuration software which interacts with the driver software.

Device drivers are provided as part of the computer operating system software for devices which are typically found in a conventional computer system. For example, operating system software typically includes device drivers for the computer keyboard, monitor, hard and floppy disk drives, and communication ports. Since there are so many different I/O expansion device configurations, these devices have device-specific device drivers which typically are not provided as part of the operating system software, but instead are stored as separate files. Such individual device drivers are generally referred to as installable device drivers since they must be explicitly installed in the system memory before the associated device can be used.

For example, in a computer which executes the MS-DOS operating system, an installation command for a particular installable device driver could be added to a boot file named "config.sys" which file is stored in a memory of the computer. When the computer processor initially begins executing the MS-DOS operating system, the processor executes the commands contained in the config.sys file. When device driver commands are included in this file, the processor executes the installation command for the installable device driver which loads the installable device driver into memory thereby providing access to the device. Alternatively, an application program which needs access to the device could load the driver during its initialization phase.

In addition to physically inserting an expansion card, installing the device driver and setting device parameters, in many cases it is also necessary to allocate computer resources to the expansion card. The term "computer resource" or more simply "resource" refers to anything within a computer system which either occupies memory of the computer system or which is required to allow the computer system to perform a particular function. To print a page of a document, for example, certain resources such as character font sets, glyph sets, point tables, brush tables, user defined graphic images and data that describes a page to be printed may be required to perform a print function. Thus, such resources may be referred to as printer resources.

Expansion cards also provide I/O functions to the computer system. An I/O function is provided by a discrete device that is independently assigned I/O resources. Examples of I/O Functions are, Serial Port, SCSI port, Floppy, etc. I/O functions require I/O resources, which include, but are not limited to, computer memory space, I/O registers, interrupt signal lines, interrupt levels, interrupt sockets, direct memory access (DMA) channels, etc., which allow the I/O hardware components to operate with the computer system. Generally, the term I/O function is used in the discussion which follows rather than I/O device, since a single physical device or card may have several I/O functions implemented on it. Consequently, a function corresponds to a logical device rather than a physical device.

The computer resources are often allocated to the I/O expansion boards in the same manner as hardware component parameters are set. For example, in some cases, resources can be allocated or selected manually, while in other cases, automatic configuration software allocates the resources.

More specifically, many personal computers utilize a system bus architecture referred to as the industry standard architecture (ISA) bus architecture. The ISA bus architecture has been implemented in a very large number of IBM and IBM-compatible personal computers. Computers employing the ISA bus architecture require the allocation of system resources such as memory, I/O address spaces, direct memory access (DMA) channels, interrupt request lines and interrupt levels among multiple ISA expansion cards in the system.

The types of expansion cards which may be used in computer systems having an ISA architecture may be divided into the following six categories: (1) manually-configured ISA cards; (2) manually-configured motherboard devices; (3) manually-configured local bus cards; (4) auto-configuration ISA cards; (5) peripheral component interconnect (PCI) cards; and (6) PCMCIA cards. Auto-configuration ISA cards include mechanisms for card identification, resource usage determination, conflict detection and conflict resolution. This capability allows compatible operating system software to automatically identify and configure auto-configuration ISA cards without manual user intervention.

The conventional ISA standard, however, does not define any hardware or software mechanism for allocating system resources. Thus, expansion cards and motherboard devices which conform to the ISA standard may not include any on-board mechanisms for card identification, resource usage determination, conflict detection or conflict resolution. This can lead to problems in assignment of system resources.

For example, depending upon the particular operating system (e.g. MS-DOS, WINDOWS, OS/2, WINDOWS 95 etc . . . ) controlling the computer, it may be necessary to assign an interrupt line to a particular device. Often, each device requires a unique interrupt line. For example, a serial communication board installed on a computer operating with a WINDOWS™ graphical user interface must have a unique interrupt line coupled thereto. That is, no other device which is operating simultaneously can have the same interrupt line assigned to it.

In conventional systems, a user must examine the configuration of each installed device to determine which, if any, interrupt line each device is using and which interrupt lines are unused. The user then selects an unused interrupt line to couple to the serial communication board. The selection of the interrupt line may be implemented on the ISA card manually by connecting so-called jumper wires (or more simply jumpers), opening or closing particular terminals of dual in-line pin (DIP) switches which are located on the expansion cards, or via the device driver. Thus, a user must devote a relatively large amount of time to configuring a conventional ISA card.

In addition to the above, the configuration files of the computer system may also need to be updated to allow the computer system to recognize that an additional device has been added to the computer system. When a problem does arise, users typically must manually resolve resource allocations by referring to documentation provided by the manufacturer of the expansion card involved in the resource allocation.

A problem, referred to as a resource conflict, can arise however, if two or more devices simultaneously attempt to use the same computer system resource, such as the same, or overlapping, memory regions of the same memory device. When such a resource conflict occurs, one or more of the devices involved in the conflict may not operate correctly or the computer system may not operate correctly or may even stop operating altogether (i.e., the computer system becomes "hung-up"). This problem is particularly acute when resources must be manually allocated. In this latter case, the user may be unsophisticated and not able to properly allocate resources. Many computer systems come preconfigured with I/O devices such as a mouse, communication ports, etc. and resources are already allocated when the user receives the system. In these cases, it may be difficult for the user to ascertain which resources are already allocated even if the user is sophisticated enough to allocate resources.

In order to assist the user in manually selecting free resources, some expansion cards come with resource checking programs that attempt to determine which resources are already in use. These programs are run before a user physically inserts an expansion card and generally identify resources which are not in use and which would satisfy the requirements of the card. One problem which arises with such programs is that, often, the resources are not in use when the checking program is run because the card which uses the resources is not active. Therefore, a resource shows up as free, when it is not. Later, when all cards are active, a resource conflict occurs.

In conventional computer systems, when a resource conflict arises, a user must ascertain the cause of the resource conflict by determining which computer system resource is being accessed by each device and which devices are attempting to access the same resource. Once the user has ascertained the cause of the resource conflict, the user must then devise a plan to resolve the resource conflict. This is often a time consuming effort, since the user must determine which computer resources each device in the computer system uses, often by trial and error, and then reassign available computer resources to devices involved in the resource conflict.

In addition to ISA cards, some computer systems employing an ISA architecture are provided having expansion slots which handle additional bus architectures. For example, some expansion slots are referred to as local bus slots and accommodate a "local bus" card. Local bus slots typically accept expansion cards such as video adapter cards or mass storage cards. Cards conforming to this architecture have an internal bus structure that allows information to be transferred between components on the card without involving the system bus. Use of the internal local bus improves the performance of the computer system. Generally, computer systems employing the ISA architecture can operate with a variety of local bus architectures including but not limited to the video electronics standards association (VESA) bus architecture. However, many of the local bus architectures do not include any mechanism for identification and automatic configuration of the cards plugged into their slots. That is, many expansion cards employing local bus architecture cards are not auto-configuration expansion cards.

Rather, such local bus cards are typically configured manually by connecting jumper wires and setting DIP switches, as is done with expansion cards which conform to the conventional ISA standard. Since conventional ISA cards and manually-configured local bus cards are configured in the same manner, these types of cards will collectively be referred to herein as "manual I/O expansion cards" or "manually-configured I/O expansion cards."

One local bus architecture referred to as a Peripheral Component Interconnect (PCI) architecture accepts expansion cards which conform to a PCI standard. Expansion cards which conform to the PCI standard are auto-configurable in that they include mechanisms for card identification and resource usage determination.

In addition in some computers, a motherboard may be provided having a socket which accepts an expansion card that conforms to a PCMCIA standard. Expansion cards conforming to the PCMCIA standard can be inserted into a system still having power applied thereto (i.e. the computer system need not be turned off while the PCMCIA expansion card is coupled to the computer). Furthermore, expansion cards conforming to a PCMCIA standard can be configured with software rather than via jumper wires and DIP switches. Thus, computer systems which only include expansion cards which conform to either the auto-configurable ISA, PCI or PCMCIA standards are fully auto-configurable.

Some computer systems, however, include expansion cards which conform to the manually-configured ISA and local bus standards as well as expansion cards which conform to the auto-configurable ISA, PCI or PCMCIA standards. Thus, such computer systems require some user intervention in configuring the manually-configured I/O expansion cards.

Computer systems which accept manually-configured I/O expansion cards require some mechanism to specify to the operating system software the configuration information for such expansion cards. Certain manually-configured expansion cards may be identified by device-specific probing techniques. That is, configuration information of the expansion card may be determined by reading and writing to device specific hardware ports of the expansion card. However, such probing techniques are not always reliable. Furthermore, some expansion cards are not compatible with probing techniques. Thus, conventional techniques for configuring devices in computer systems having an ISA bus architecture either use a configuration file in memory to specify the resource assignment information or hard code the resource assignment information into the corresponding device drivers.

In the case of expansion boards which incorporate an additional bus architecture, a program called a resource manager is used to store and manage the configuration and resource allocation information for the devices plugged into the additional bus. A problem arises, however, in that, in conventional systems, a separate resource manager is used for each different type of expansion bus. For example, in a computer system having both a Peripheral Component Interconnect (PCI) bus and a Personal Computer Memory Card Interface Association (PCMCIA) bus, the resources used by the PCI expansion card and the resources used by PCMCIA expansion card would be managed by separate resource managers located on each expansion card. These separate resource managers typically do not share information and thus neither resource manager contains any information as to which resources the other resource manager is using, leading to possible resource conflicts.

It would, therefore, be desirable to provide a system which automatically detects and resolves resource conflicts between two or more devices in the computer system. Such resource conflicts may occur, for example, between two devices coupled to the motherboard via an expansion card or between a device on the motherboard and a device on an expansion card.

SUMMARY OF THE INVENTION

In accordance with the present invention, system resources are automatically assigned by a resource conflict resolver to all functions on expansion buses in the computer system. Such system resources include, but are not limited to, memory ranges, input-output (I/O) register ranges, interrupt request lines and direct memory access (DMA) channels. Generally, the assignment is exclusive, however, in some cases, the assignment may be shared so that one or more resources will be shared between different functions. In order to prevent contention between two functions for the same resource, the inventive conflict resolver framework includes classes which can be instantiated to construct objects that provide an access control mechanism to synchronize access to the resources among the devices that use and, possibly, share them.

Specifically, the resource conflict resolver generates conflict free resource assignments and stores these assignments in resource usage objects in a persistent hardware configuration database. The inventive I/O framework provides classes from which a lock object can be instantiated. The lock object contains methods which retrieve the resource assignments for an I/O function from the resource usage objects and methods which acquire a lock on resources assigned to an I/O function. The lock object can be used by device drivers to first retrieve the resource assignments from the hardware configuration database and then acquire access to the resources assigned to an I/O function. The acquired access can be either exclusive or shared.

In order to access the resources for an I/O function, clients instantiate a lock entry object from a framework resource lock entry class and call the Acquire( ) method of the object. The lock entry object also includes a method which retrieves a conflict-free resource assignment for an I/O function from the corresponding resource usage objects in the hardware configuration database. The method which retrieves the resource assignment can be called after the resource lock is acquired by means of the Acquire( ) method. The resources can be used only by the task which calls the Acquire( ) method or by interrupt handlers which have been registered in the I/O resource conflict resolver.

DETAILED DESCRIPTION OF THE PREFERRED EMBODIMENT

Figure 1:
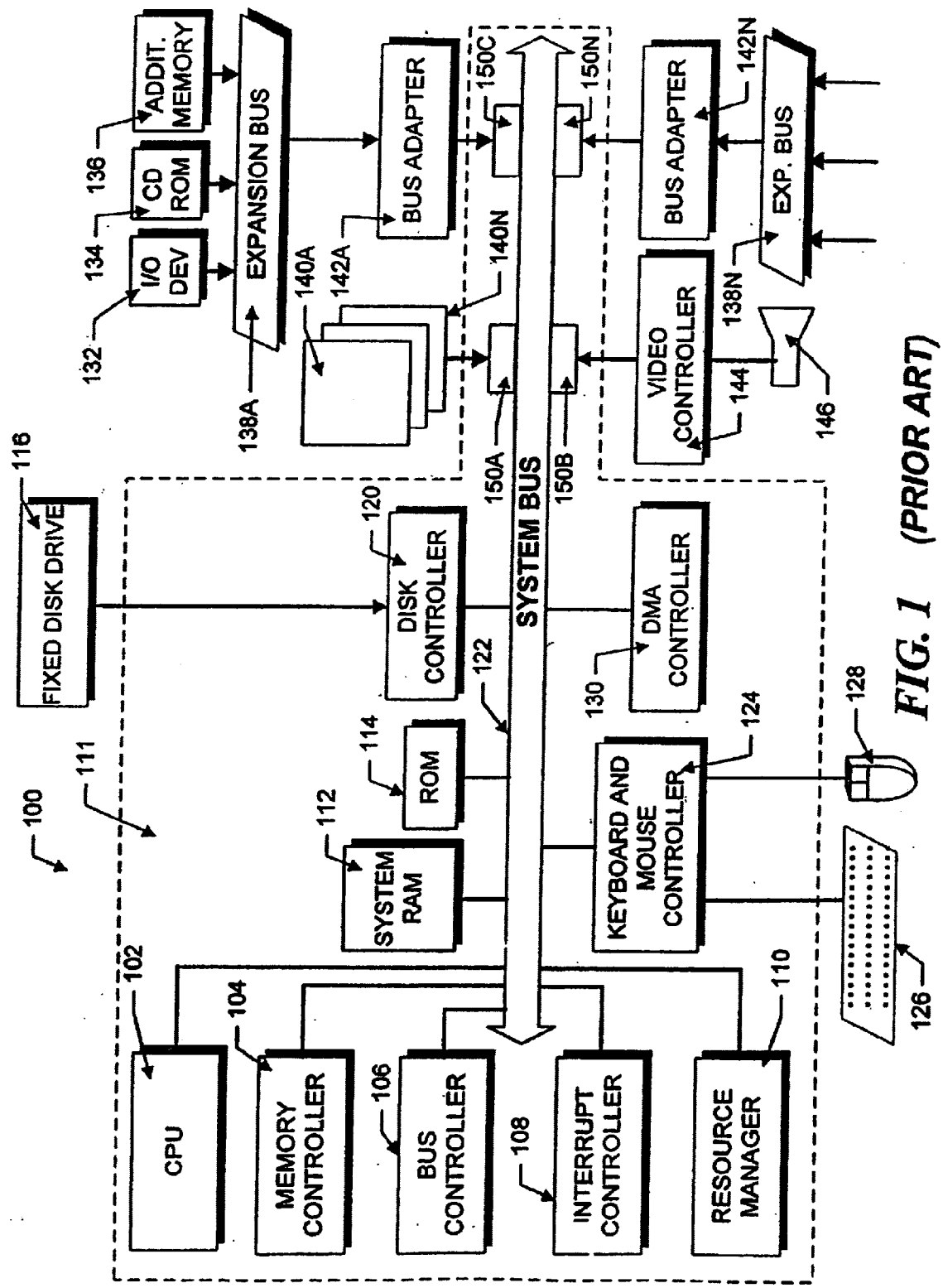
FIG. 1 is a block diagram of a computer system having a resource manager with a resource conflict resolver which operates in accordance with the present invention.

Referring now to FIG. 1, a computer 100 includes a central processing unit 102 which may be one or more conventional microprocessors interconnected via a system bus 122. The computer 100 may be, for example, an IBM® or IBM® compatible computer or alternatively computer 100 may be an Apple® Macintosh® computer or an Apple® compatible computer. Thus, the computer 100 typically has stored in memory 112 thereof a computer operating system such as the IBM OS/2® operating system, the Apple System/7® operating system a DOS operating system or a WINDOWS® operating system.

Also coupled to system bus 122 are a plurality of devices including a random access memory (RAM) 112, a read only memory (ROM) 114, a hard disk drive 116, a keyboard 126, a mouse 128 and monitor 146. Each hardware device in computer 100 has a controller which is coupled between the hardware device and the system bus 122. A controller is attached to the actual peripheral device and operates the device on behalf of the processor. Thus, a keyboard/mouse controller 124 is coupled between system bus 122 and the keyboard 126 and mouse 128. Similarly, a hard disk controller 120 is coupled between the system bus 122 and the hard disk drive 116 and video controller 144 is coupled between system bus 122 and monitor 146. Also, coupled to system bus 122 is a memory controller 104, a bus controller 106, and an interrupt controller 108. A DMA controller 130 can be used to control direct data transfers into memory 112.

Processor 102 operates devices by programming the respective controllers. For example, the hard disk drive 116 is connected to the hard disk controller 120 which is programmed by processor 102. Each controller 120, 124 and 144 includes internal registers used to program the respective device. Command operations, status operations, and data transfers with the device, are initiated by programming of the controller through its registers.

Controllers also contain device buffers for data transfer. For example, the hard disk controller 120 contains registers for programming hard disk operations and a disk buffer. When a read operation occurs, the processor 102 programs the controller 120 to perform a read from the hard disk drive 116. The controller 120 initiates the operation and reads the data to the disk buffer within the controller 120. The data in the disk buffer are later transferred across the bus 122 to a memory location specified in the read request to the device driver.

Each of the controllers 120, 124 and 130 and system bus 122 are physically located on a motherboard 111. Also coupled to bus 122 and located on the motherboard are a plurality of expansion slots 150A–150N. Various expansion cards 140A–140N may be inserted into the expansion slots 150A. For example, the video controller 144 may be coupled to system bus 122 via an expansion slot 150B. Likewise a plurality of bus adaptors 142A–142N, may also be coupled to system bus 122 by inserting the appropriate cards into slots 150C–150N. An expansion bus 138A–138N may be inserted into each of the bus adapters 142A and 142N. Coupled to each expansion bus may be a plurality of devices such as an I/O device 132 and CD ROM 134 and additional memory 136.

In accordance with the present invention, computer 100 also includes a resource manager 110 which identifies and resolves system resource conflicts that arise within the computer 100. It should be noted that computer 100 includes the single resource manager 110 which manages each expansion card 140A–140N, each expansion bus 138A–138N and expansion cards, such as cards 132, 134 and 136 on the expansion busses coupled to the computer system 100. Thus, if expansion bus 138A corresponds to an ISA expansion bus and expansion bus 138N corresponds to a PCMCIA expansion bus, resource manager 110 still managers the system resources used by each of the expansion buses 138A, 138N. Since computer 100 includes only the single resource manager 110, resource manager 110 tracks both the system resources and the devices attempting to access the system resources on all of the expansion cards and buses coupled to the computer 100.

In a preferred embodiment, the present invention may be implemented with "object-oriented" computer programming techniques. Object-oriented computer programming techniques involve the definition, creation, use and destruction of software entities referred to as "objects." Each object is an independent software entity comprised of data called "attributes" and software routines called "member functions" or "methods" which manipulate the data.

One characteristic of an object is that only methods of that object can change the data contained in the object. The term "encapsulation" describes the concept of packaging the data and methods together in an object. Objects are thus said to encapsulate or hide the data and methods included as part of the object. Encapsulation protects an object's data from arbitrary and unintended use by other objects and therefore prevents an object's data from corruption.

To write an object-oriented computer program, a computer programmer conceives and writes computer code which defines a set of "object classes" or more simply "classes." Each of these classes serves as a template which defines a data structure for holding the attributes and program instructions which perform the method of an object. Each class also includes a means for creating an object from the class template. The means for creating is a method referred to as a "constructor."

When a processor of a computer executes an object oriented computer program, the processor generates objects from the class information using the constructor methods. During program execution, one object is constructed, which object then constructs other objects which may, in turn, construct other objects. Thus, a collection of objects which are constructed from one or more classes form the executing computer program.

Inheritance refers to a characteristic of object oriented programming techniques which allows software developers to re-use pre-existing computer code for classes. The inheritance characteristic allows software developers to avoid writing computer code from scratch. Rather, through inheritance, software developers can derive so-called sub-classes that inherit behaviors from base classes. The software developer can then customize the data attributes and methods of the subclasses to meet particular needs.

With a base-class/sub-class relationship, a first method having a particular name may be implemented in the base-class and a second different method with the same name may be implemented differently in the sub-class. When the program is executing, the first or second method may be called by means of a statement having a parameter which represents an object. The particular method which is called depends upon whether the object was created from the class or the sub-class. This concept is referred to as polymorphism.

For example, assume a computer program includes a class called Employee. Further assume that class Employee includes a member function which defines a series of method steps to be carried out when a worker retires from the company. In an object-oriented implementation, the retire method is automatically inherited by sub-classes of class Employee. Thus if a class called Executive is a sub-class of the class called Employee, then class Executive automatically inherits the retire method which is a member function of the class Employee.

A company or organization, however, may have different methods for retiring an employee who is an executive an employee who is not an executive. In this case, the sub-class Executive could include its own retire method which is performed when retiring an employee who is an executive. In this situation, the method for retiring executive employees contained in the Executive class overrides the method for retiring employees in general contained in the Employee class. With this base class/subclass arrangement another object may include a method which invokes a retirement method. The actual retirement method which is invoked depends upon the object type used in the latter call. If an Executive object type is used in the call the overriding retirement method is used. Otherwise the retirement method in the base-class is used. The example is polymorphic because the retire operation has a different method of implementation depending upon whether the object used in the call is created from the Employee class or the Executive class and this is not determined until the program runs.

Since the implementation and manner in which data attributes and member functions within an object are hidden, a method call can be made without knowing which particular method should be invoked. Polymorphism thus extends the concept of encapsulation.

Object-oriented computer programming techniques allow computer programs to be constructed of objects that have a specified behavior. Several different objects can be combined in a particular manner to construct a computer program which performs a particular function or provides a particular result. Each of the objects can be built out of other objects that in turn can be built out of other objects. This resembles complex machinery being built out of assemblies, subassemblies and so on.

For example, a circuit designer would not design and fabricate a video cassette recorder (VCR) transistor by transistor. Rather, the circuit designer would use circuit components such as amplifiers, active filters and the like each of which may contain hundreds or thousands of transistors. Each circuit component can be analogized to an object which performs a specific operation. Each circuit component has specific structural and functional characteristics and communicates with other circuit components in a particular manner. The circuit designer uses a bill of materials which lists each of the different types of circuit components which must be assembled to provide the VCR. Similarly, computer programs can be assembled from different types of objects each having specific structural and functional characteristics.

The term "client object," or more simply "client," is any object that uses the resources of another object which is typically referred to as the "server object" or "server." The term "framework" can refer to a collection of inter-related classes that can provide a set of services (e.g. services for securities and bond trading) for a particular type of application program. Alternatively, a framework can refer to a set of inter-related classes that provide a set of services for a wide variety of application programs (e.g. foundation class libraries for providing a graphical user interface for a Windows system). A framework thus provides a plurality of individual classes and mechanisms which clients can use or adapt.

An application framework refers to a set of classes which are typically compiled, linked and loaded with one particular application program and which are used by the particular application program to implement certain functions in the particular application program. A system framework, on the other hand, is provided as part of a computer operating system program. Thus, a system framework is not compiled, linked and loaded with one particular application program. Rather, a system framework provides a set of classes which are available to every application program being executed by the computer system which interacts with the computer operating system.

Resource manager 110, and its components, will be described in detailed below in conjunction with FIGS. 2–17. In summary, resource manager 110 detects and resolves resource usage between I/O functions on different buses in computer system 100. After detecting the existence of a resource conflict, the resource manager 110 computes a conflict-free set of system resource allocations between all I/O functions in the computer system regardless of the type of expansion bus or the type of cards plugged into the busses. Resource manager 110 assists in booting the computer's I/O system by dynamically instantiating configuration recorders for the expansion cards and motherboard in an ISA system. Bus systems with only plug & play cards are fully auto-configurable. However, it is recognized that manually-configured cards such as manual I/O cards and system board devices may coexist with auto-configurable cards in the same system. Such systems require some user intervention in configuring the manually-configured cards.

Figure 2:
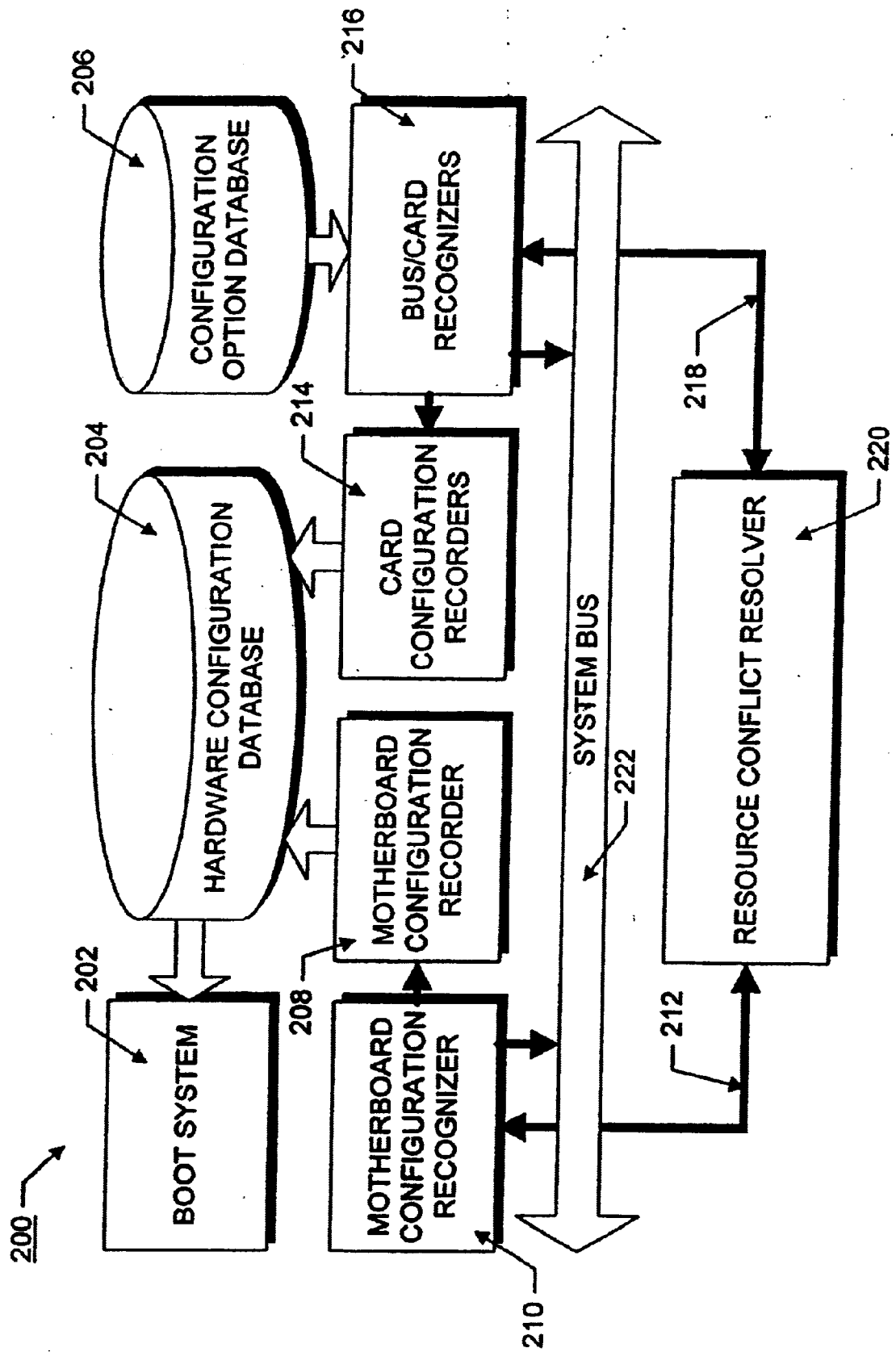
FIG. 2 is a schematic block diagram illustrating the components of a resource manager and their relationship to other system components.

FIG. 2 is a schematic block diagram illustrating the components of computer 200 including the components of resource manager 110 and their relationship to other system components. In FIG. 2, elements which correspond to those in FIG. 1 are given corresponding numbers. For example, system bus 122 illustrated in FIG. 1 corresponds to system bus 222 in FIG. 2.

In order to compute and manage conflict-free resource assignments, the resource manager 110 includes a resource conflict resolver module 220. A bus/card recognizer system 270 coupled to the resource conflict resolver module 220 recognizes the expansion cards 140A–140N and busses 138A–138N connected to the system, and, retrieves information from those busses and cards which store, on-board, resource requirements, such as plug and play cards. Some cards do not contain on-board storage for resource requirements and a configuration option database 206 is used to store the resource requirements for the I/O functions on these expansion cards. Illustratively, the configuration option database 206 is a persistent database in which entries may be created during the installation of a manually-configured I/O expansion card by the user, or by a setup program run by the user during installation of the card. The setup program installs configuration information provided by the card manufacturer in the database 206. The bus/card recognizer system 216 retrieves information from the configuration option database 206 for those busses and cards which do not store resource requirements.

The configuration of the motherboard 111 is determined by a motherboard configuration recognizer 210 which includes a slot identifier mechanism (not shown) for creating a hardware interface identifier for each of the expansion slots 150A–150N on the system bus 122. The bus/card recognizer system uses the slot identifiers as keys to register the resource requirements for the I/O functions on the expansion cards 140A–140N with the resource conflict resolver module 274.

As described in detail below, the resource conflict resolver module 220 uses the bus/card information from the recognizer system 216 to generate a set of conflict-free resource assignments. If the resource conflict resolver module 220 encounters conflicts while producing such an assignment, it generates information, such as an identity of the conflicting resources, a conflicting period, an identity of conflicting I/O functions, etc. . . . which information is encapsulated in a resource conflict object 221 provided by the I/O resource conflict module 220 to the user.

Once the resources have been assigned by means of the inventive system, the various assignments are stored by the card configuration recorder system 214 in a hardware configuration database 204. The configuration of the motherboard is recorded in database 204 by the motherboard configuration recorder 208. As will be described below in detail the hardware configuration database 204 is used by the computer boot system 202 during subsequent boots to determine which recognizers to construct and to retrieve previously-stored resource assignments.

If the resource manager 170 is implemented via the aforementioned object oriented programming techniques, then the bus recognizer system 216 and recorder system 208 and 214 can be implemented as parts of frameworks which generally describe the behaviors of the various busses and cards. For example, an expansion bus framework can include a set of classes that represent the general behavior of various expansion buses. For a specific type of expansion bus, a specific set of subclasses are derived from the classes provided by the expansion bus framework. The expansion bus framework provides a common model for recognizing expansion cards, registering the resource requirements of I/O functions on the expansion cards and instantiating configuration recorder objects for each of the expansion cards on various expansion buses. Similar frameworks are provided for the auto-configurable expansion cards, the manually configurable cards and the motherboard.

If the resource conflict resolver module 220 is implemented as an object-oriented computer program, the conflict resolver 220 may be an object which is created from classes that are part of a conflict resolver framework which includes a plurality of classes which encapsulate various representations (e.g. adapter descriptor files of micro-channel architecture cards and configuration files of EISA cards) of resource requirements and constraints by the expansion cards 140A–140N. These classes provide a bus independent model for detecting and resolving conflicts in resource usage which arise between multiple I/O functions on the expansion cards and motherboard of the computer. The important abstractions of the I/O conflict resolver framework are briefly discussed below and are discussed in detail in conjunction with FIGS. 7–9.

The description which follows is divided into two distinct phases for two types of expansion boards. The first phase concerns the operation of the conflict resolver system when a new expansion board is installed into the computer system 200. Board installation is discussed for both plug and play and manually-configured boards.

Manually-configured I/O expansion cards are not configurable, via software, as are auto-configurable expansion cards. Rather, manually-configured I/O expansion cards are configured by manually connecting jumper wires or setting DIP switches on the card. Thus, in computer systems which include manually-configured I/O expansion cards, the resource requirements of each of the manually-configured I/O expansion cards must be satisfied first so that the auto-configurable cards can be configured with the remaining resources.

When a manually-configured I/O expansion card is installed in an available expansion slot, the conflict resolver maintains a record of the current resource assignments and generates new resource assignments. Since the new manually-configured I/O card is not recognized by the computer operating system until the computer is re-booted, the conflict resolver manages resource assignments for both current boot and the next boot. This enables a user to register the resource requirements for manually-configured I/O cards prior to physically installing the cards in the system. Thus, a user can be assured that after a card is inserted and a conflict-free resource assignment produced, that the board will boot up conflict free on the next boot.

Initial Expansion Card Installation

Figure 3:
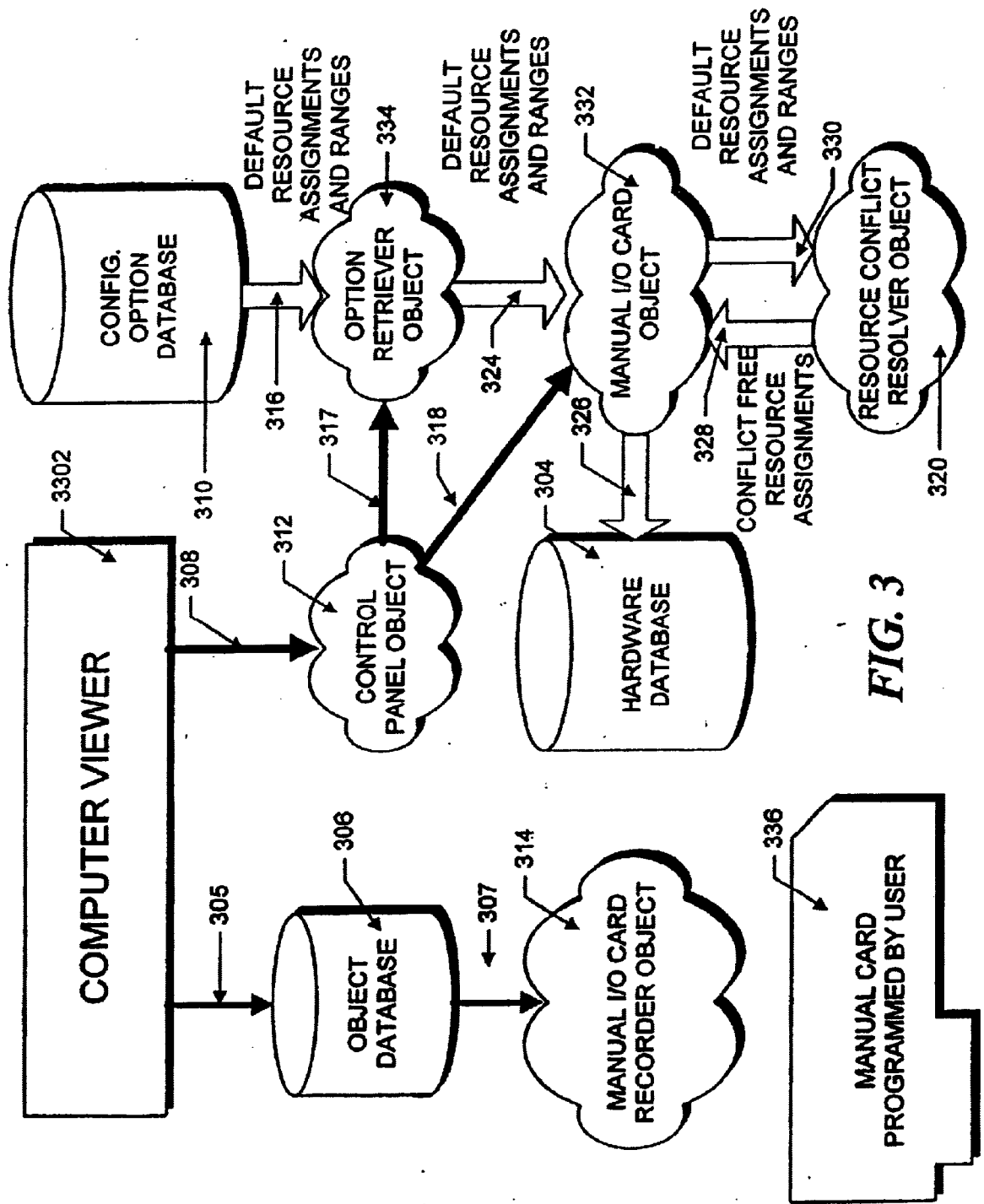
FIG. 3 is a schematic block diagram of the interaction between resource manager objects which are involved in the assignment of resources and resolution of conflicts which occur during the initial installation of a manually-configured card.

Referring now to FIG. 3, the initial installation of a manual card 336 into a computer system is disclosed. For the purposes of this discussion, it is assumed that the computer system is booted and running. For manual I/O cards that are essential for booting, it is necessary to have entries in the persistent hardware configuration database 304 prior to booting in order to invoke the appropriate device drivers and successfully load the operating system. Such cards would generally include the motherboard, an output device controller, such as a display card, a keyboard or other input device controller and a boot device controller, such as a disk drive. The initial database entries for these cards may be created by some low level installation utility. Alternatively, manual cards which are essential for booting can be arranged to automatically configure themselves on power up. This might be done by setting manually appropriate jumpers or switches on the cards to produce a non-conflicting set of resource allocations. Since the number of cards is small, the task is feasible.

For manual I/O cards that are not essential for booting, such as card 336, entries can be created in the hardware configuration database 304 using a computer viewer object 302 which provides to a user a graphical view of the hardware components in the computer system. Object 302 might, for example, be generated by a hardware configuration system such as that described in U.S. Pat. No. 5,546,595, the contents of which are hereby incorporated by reference.

The computer viewer object 302 instantiates a control panel object 312 which provides a user with a way to change the system configuration. The control panel object 312, in turn, instantiates an configuration option retriever object 334 and a manual I/O card object 332 as indicated by arrows 317 and 318, respectively. The option retriever object 334 retrieves default resource assignments from the configuration option database 310 as indicated by arrow 316 and provides the default resource assignments to the manual I/O card object 332 (schematically illustrated by arrow 324.)

The manual I/O card object 332 registers the resource requirements, such as possible assignments, default assignment and constraints in assignments for the I/O functions on the card with the resolver object 320 as indicated by arrow 330. The manual I/O card object 332 then asks the resolver object 320 to produce a resource assignment for each I/O function on the card, corresponding to its default jumper settings (when the card is initially installed, its jumper settings are generally at the default settings.)

If the resolver object 320 succeeds in creating a conflict free resource assignment set for the I/O functions on the card using their default assignments, the installation completes without any user intervention. The conflict-free resource set is returned to the manual I/O card object as indicated by arrow 328. The manual I/O card object then stores the resource requirements for the card in the persistent hardware configuration data base 304 as indicated by arrow 326.

If the resources corresponding to the default jumper settings of the card are currently allocated to an auto-configurable card (such as Plug & Play ISA or PCI card) and, if these resources can be re-assigned during the next boot operation, the manual I/O card object 332 stores the resource requirements for the card in the persistent data base 304. The user is then instructed to reboot the system. During reboot, the auto-configurable cards are re-configured and resources corresponding to the default jumper settings of the card are assigned to the manual I/O card 336.

Alternatively, if the resources corresponding to the default jumper settings of the card 336 are currently allocated to other cards and, if those resources can not be re-assigned, user intervention is required in changing the jumper settings of the card 336. The resolver object 320 creates a conflict object 338 which provides detailed information about the conflict such as conflicting resource, I/O function with which the card being installed is conflicting and possible conflict free assignments that can be used by the card 336. The user should manually change the jumper settings of the card 336 using the information provided by the conflict object 338. When the user chooses to change the jumper setting according to the information provided by the conflict object 338, the manual I/O card object 332 creates an appropriate entry for the card 336 in the persistent hardware configuration database 304.

Whenever the manual I/O card object 332 creates an entry in the persistent database 304, that entry is associated with a hardware interface identifier for a connector (typically a default connector) on the card 336. During subsequent boots, the resource requirements are retrieved from the persistent data base using the identifier for the connector as a key.

During installation, the configuration recorder object 314 for a manual card that requires a nested recognizer (such as SCSI bus) to be invoked during boot, is registered with a persistent database called a manual recorder registry. The manual recorder registry maintains a collection of manual recorders that require nested recognizers to be initiated during boot. After completing the steps described in the above paragraphs, the computer viewer 302 registers the card module with the hardware configuration database 304. If the card is assigned resources for this boot and if the card's recorder is registered with the manual recorder registry for recognition, a nested recognizer required by the card is initiated.

Figure 4:
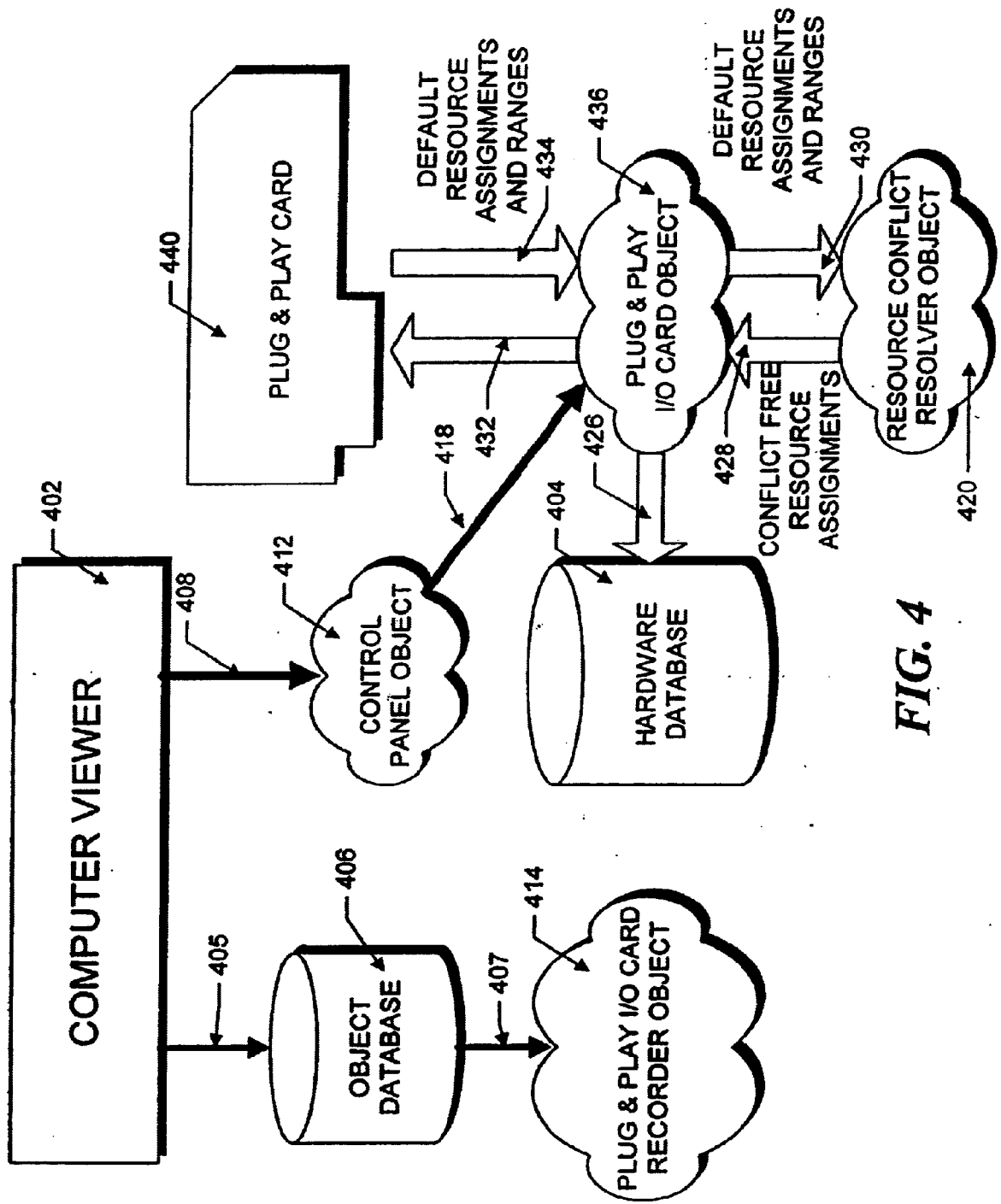
FIG. 4 is a schematic block diagram of the interaction between resource manager objects which are involved in the assignment of resources and resolution of conflicts which occur during the initial installation of a "plug and play" card.

FIG. 4 illustrates the initial installation of an auto-configurable card 440, such as a plug and play card into the computer system. Again, for purposes of the discussion, it is assumed that the computer system is booted and operational at the time that the card 440 is inserted.

As with the manual I/O card, the auto-configurable card 440 is installed using a computer viewer object 402 which provides to a user a graphical view of the hardware components in the computer system. The computer viewer object 402 instantiates a control panel object 412 which provides a user with a way to change the system configuration. The control panel object 412, in turn, instantiates a plug and play 1/0 card object 436 as indicated by arrow 418. The plug and play I/O card object 436 retrieves default resource assignments directly from the card 440 as indicated by arrow 434.

The plug and play I/O card object 436 registers the resource requirements, such as possible assignments, default assignment and constraints in assignments for the I/O functions on the card with the resolver object 420 as indicated by arrow 430. The plug and play I/O card object 436 then asks the resolver object 420 to produce a resource assignment for each I/O function on the card.

If the resolver object 420 succeeds in creating a conflict free resource assignment set for the I/O functions on the card, the installation completes without any user intervention. The conflict-free resource set is returned to the plug and play I/O card object 436 as indicated by arrow 428. The plug and play I/O card object 436 then programs the card 440 with the conflict free resource assignments as indicated by arrow 432 and stores the resource requirements for the card in the persistent hardware configuration data base 404 as indicated by arrow 426.

A plug and play I/O card recorder object 414 is also resurrected from an object database 406 under control of the computer viewer 402 as indicated by arrows 405 and 407.

Resource Assignment on Boot

Figure 5:
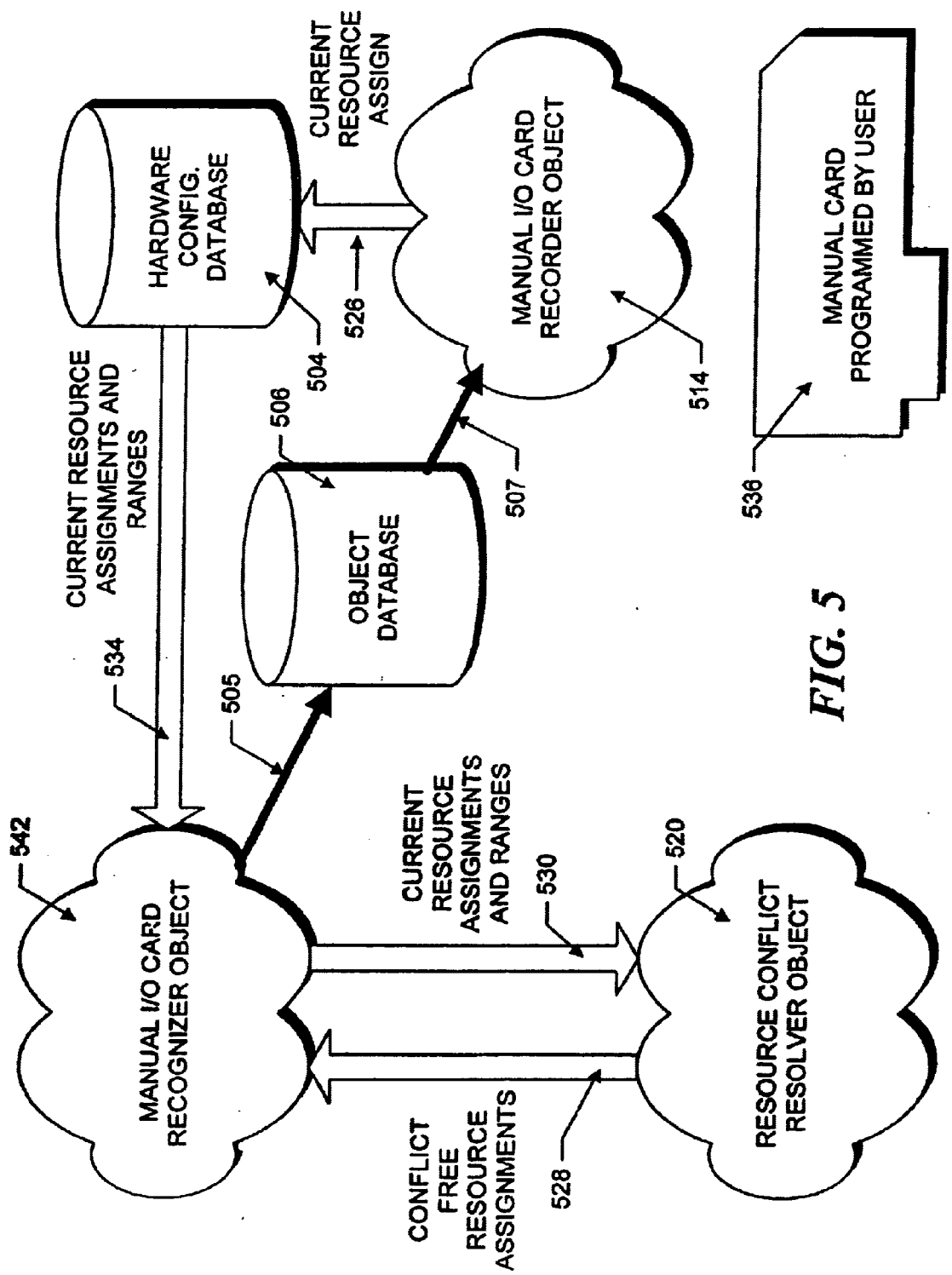
FIG. 5 is a schematic block diagram of the interaction between resource conflict resolver objects which are involved in the assignment of resources and resolution of conflicts which occur during system boot up.

Referring now to FIG. 5, the operations and objects used during a boot up operation of a computer system which includes a manual card 536 or a motherboard (not shown in FIG. 5) is illustrated. During computer booting, the boot system (not shown) instantiates an appropriate card recognizer set. The card recognizer set contains card recognizers for all the buses in the system, such as motherboard devices, ISA slots, VESA slots, PCI slots and PCMCIA sockets. Each card recognizer is responsible for determining the expansion cards on the bus it represents, registering possible resource assignments for the functions on each card with the resource conflict resolver and for instantiating an appropriate configuration recorder for each card.

In particular, a manual card I/O recognizer object 542 is instantiated by a boot system (not shown) which may be similar to the boot system described in U.S. Pat. No. 5,379,431, the disclosure of which is incorporated herein by reference. As discussed in detail below, the recognizer object 542 is instantiated from a subclass which has been tailored for card 536 from more general classes which are part of a recognizer framework that is designed to obtain information from various cards. The subclass might, for example, be generated by the card manufacturer.

During the system boot operation, the card recognizer object 542 identifies each of the manual I/O cards coupled to the system bus. The boot system also instantiates an appropriate motherboard configuration recognizer (294, FIG. 2) that represents a specific motherboard. Since the manual cards and the motherboard do not have on-board storage for resource requirements, the recognizer objects 294 and 542 retrieve resource requirements for the motherboard and each manual card 536 from the hardware configuration database 504. Resource requirements in the hardware configuration database 504 can be generated by a hardware configuration management system using a computer viewer as described above when the card is installed. Alternatively, the resource requirements can be entered by the user directly, or obtained from the card itself.

The manual I/O card recognizer object 542 receives the current resource assignment and ranges of the manual card 536 as indicated by arrow 534 and provides the current resource assignments and ranges to the resource conflict resolver object 520 as indicated schematically by arrow 530.

If the resource conflict resolver object 520 identifies a resource conflict, then resolver object 520 instantiates a conflict object 478 which notifies a user of the resource conflict and provides to the user an indication of potential solutions (i.e. conflict free resource assignments.) Alternatively, if resolver object 520 determines that no resource conflicts exist, then resolver object 520 returns to recognizer object 542 the conflict free resource assignments for the manual card 536 as indicated by arrow 528.

The conflict free resource assignments are then encapsulated in a manual card I/O recorder object 514 instantiated by the recognizer object 542 and a corresponding motherboard recorder object instantiated by the motherboard recognizer. As indicated in FIG. 5, the recorder objects are instantiated by a service which resurrects the objects from a database 506 using an identifier derived from a unique card ID. Object database 506 is persistent in the memory of the computer system which includes the resource conflict resolver object 520. Configuration recorder objects are instantiated using a service that resurrects the appropriate object using an identifier based on the board ID and the motherboard type as indicated by arrows 505 and 507. In the case of the motherboard the recorder creates a manual I/O card representing the motherboard and a collection of manual I/O function resource objects for the functions on the motherboard.

Recognizer object 542 then uses a method in the recorder object 514 to record the current resource assignments in the hardware configuration database 504.

Figure 6:
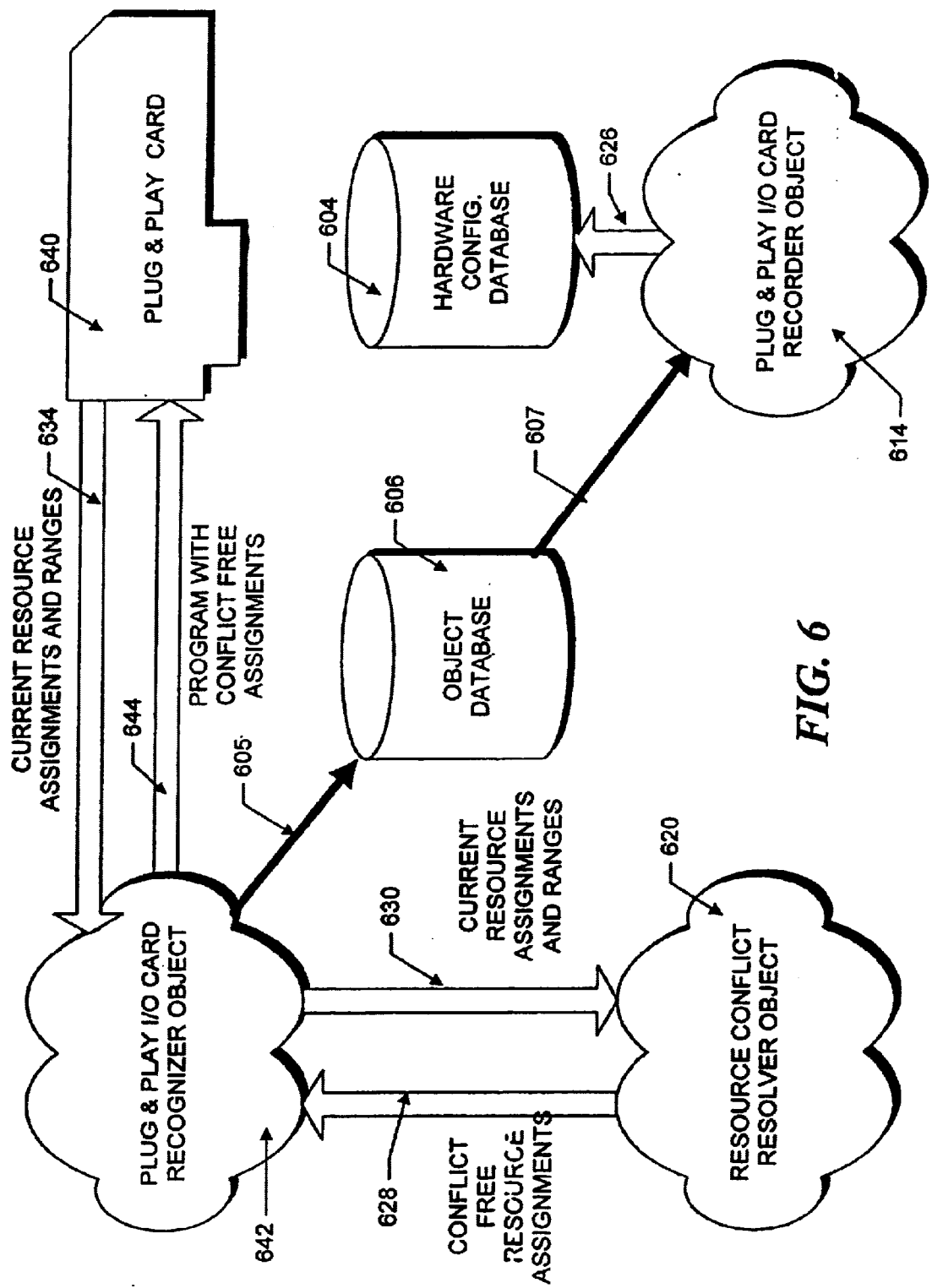
FIG. 6 is a schematic block diagram of the interaction between resource conflict resolver objects which are involved in the assignment of resources and resolution of conflicts which occur during system boot up.

Referring now to FIG. 6, the operations and objects used during a boot of a computer which includes a plug and play card 640 are shown. As with the manual I/O cards, a plug and play I/O card recognizer object 642 is instantiated by a boot system (not shown.) As discussed in detail below, the recognizer object 642 is instantiated from a subclass which has been tailored for card 640 from more general classes which are part of a recognizer framework that is designed to obtain information from various cards. The subclass might, for example, be generated by the card manufacturer.

For configurable cards, each recognizer is also responsible for configuring the cards with conflict free resource assignments. The possible resource assignments for plug and play cards are retrieved from the cards themselves. In particular, plug and play I/O card recognizer object 642 retrieves from plug and play card 640 current resource assignments and ranges for plug and play card 640. Such current resource assignments and ranges can be retrieved from a memory (not shown) which is mounted on card 640 as schematically indicated by arrow 634.

The current resource assignments and ranges are fed from recognizer object 642 to a resource conflict resolver object 620 as indicated by arrow 630. Other recognizer objects (not shown) also retrieve information from other cards (not shown) which are present at boot up. As discussed in detail below, resource conflict resolver object 620 examines the resource assignments and ranges fed thereto and then takes one of two actions. If resolver object 620 determines that a conflict between the resource assignments and ranges of card 640 exists with other system resources, then resolver object 620 instantiates a conflict object 650 which indicates that a conflict exists and the nature of the conflict. The conflict object 650 may include information such as an identity of the conflicting resources, a conflicting period, an identity of conflicting I/O functions, etc.

If, however, resolver object 620 can generate a conflict-free assignment of resources and, accordingly, the resources and ranges assigned to card 640 do not produce any conflicts with other resource assignments and ranges of the other cards in the system, resolver object 620 generates a set of conflict free resource assignments and returns the conflict free resource assignments for card 640 to recognizer object 642 as indicated by arrow 628. Recognizer object 642 then "programs" card 640 by causing the resource assignment information to be stored in a memory of the card 640, for example as illustrated by arrow 644.

The plug and play card recognizer 642 also instantiates an appropriate plug and play card configuration recorder object 614 for each plug and play card identified.

Configuration recorder object 614 is also instantiated using a service that resurrects an appropriate object from objects stored in object database 606 using an identifier derived from a unique card ID. Card recorder object 614 is responsible for registering card 640 in the hardware configuration database 604 and also recording the configuration information in the database.

As described below, recognizer object 642, conflict resolver object 620, conflict object 650 and recorder object 614 may all be provided from classes similar to the classes to be described below in conjunction with FIGS. 7–18. FIGS. 7–18 are a series of so-called Booch diagrams illustrating classes which form a variety of different frameworks. Each of the classes and the relationships therebetween will be discussed in detail below. The Booch diagrams and notations used therein are well known to those of ordinary skill in the art and will not be described or explained herein. The interpretation of the Booch diagrams and notations are explained in a text book published by The Benjamin/Cummings Publishing Company, Inc. entitled Object-Oriented Analysis and Design with Applications by Grady Booch which is hereby incorporated herein by reference.

Conflict Resolver Framework Classes

1. The Expansion Bus Framework

Figure 7:
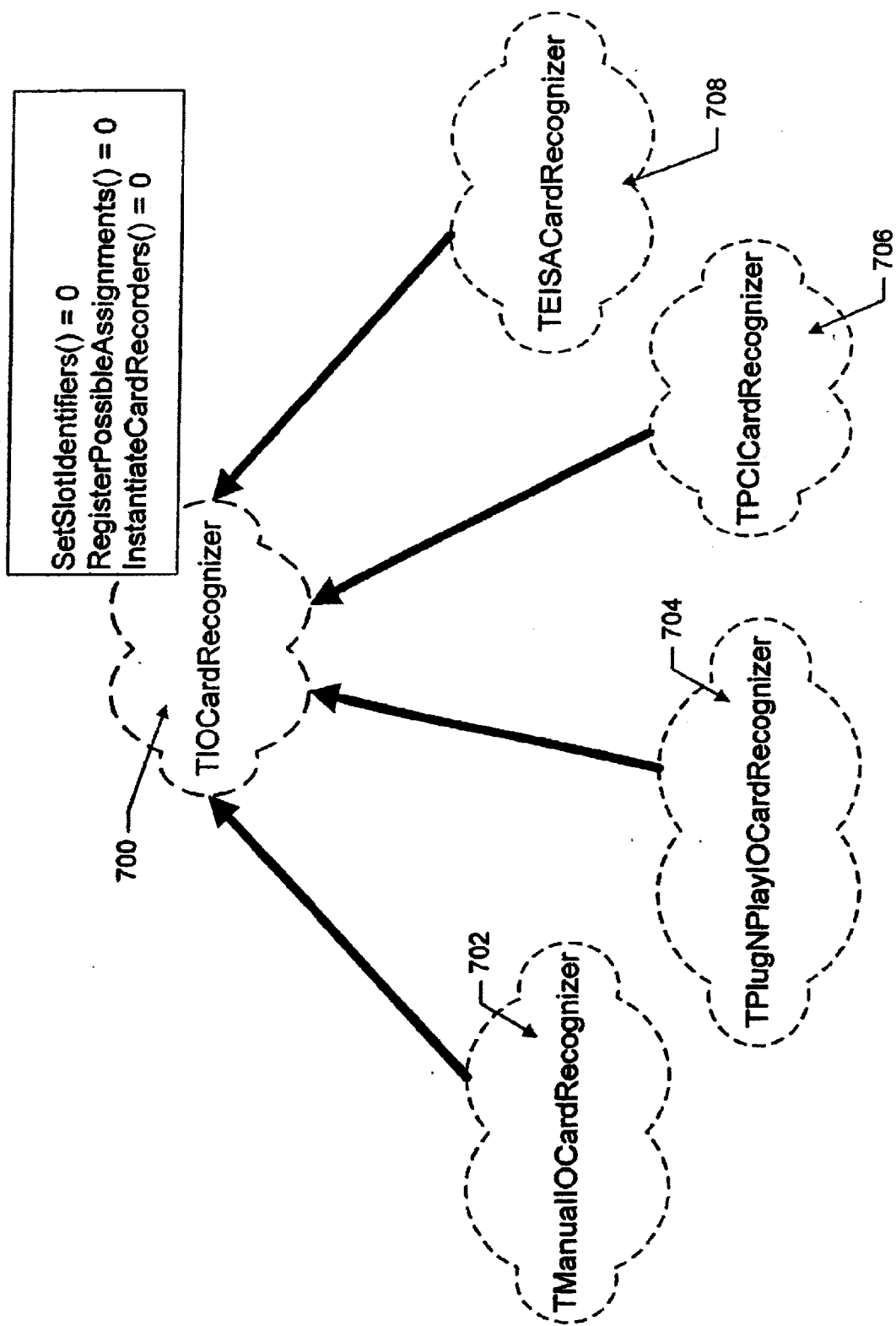
FIGS. 7–11 are a series of Booch diagrams illustrating the relationships between classes in an expansion bus framework which can be used to model expansion buses in a computer system.
Figure 8:
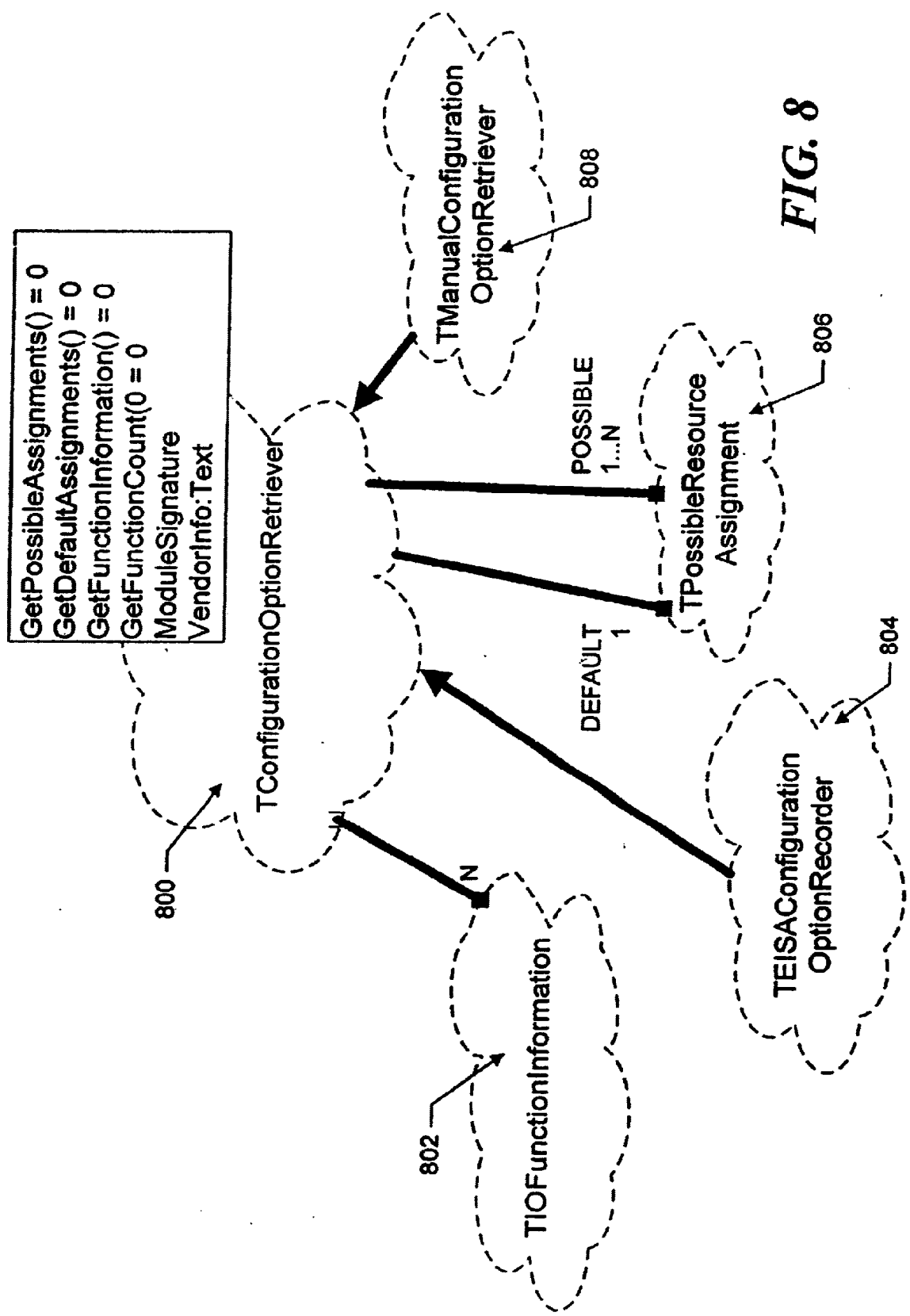
Figure 9:
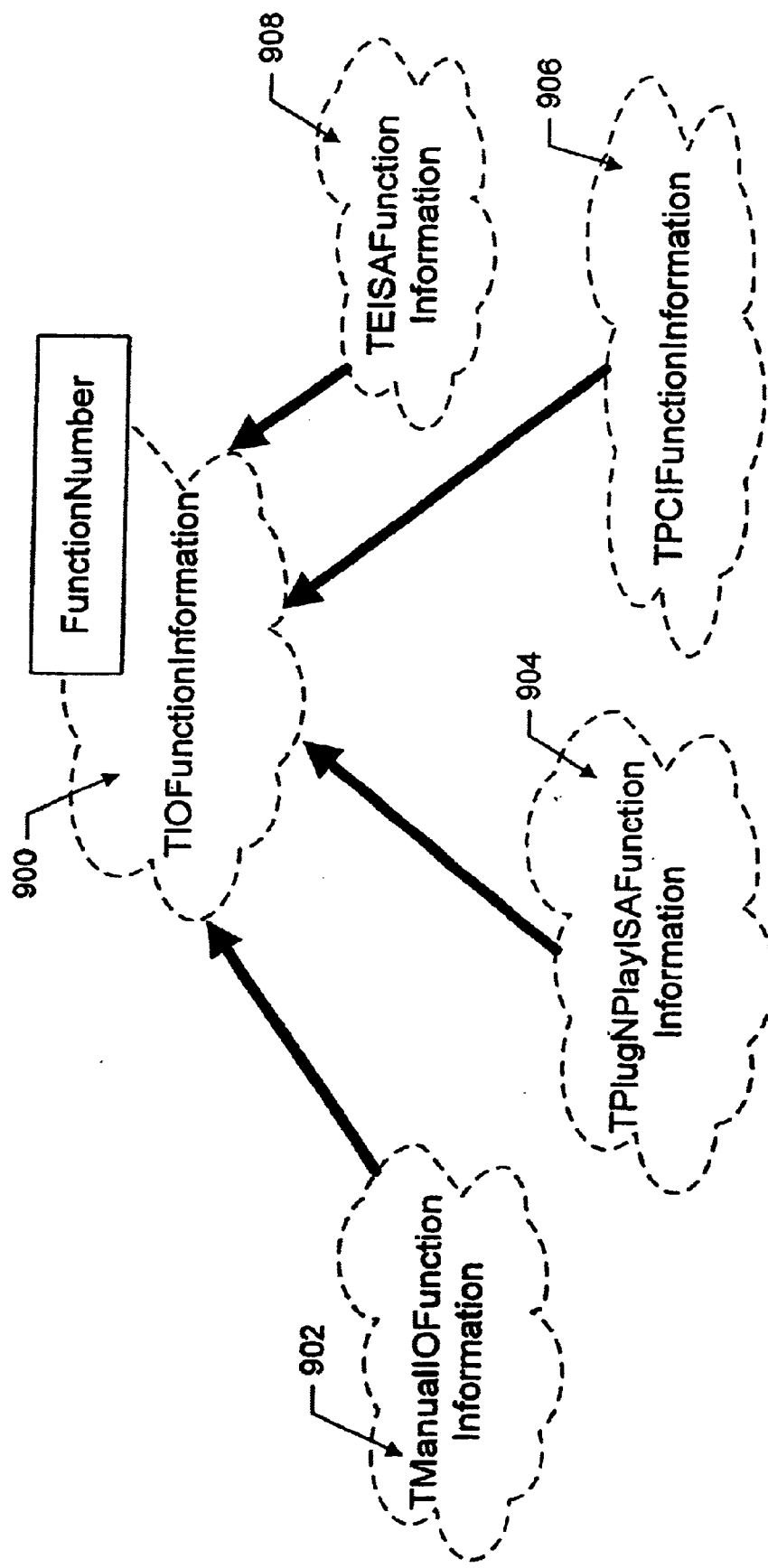

FIGS. 7–9 illustrate the composition and interrelations of a set of classes which form an expansion bus framework. The expansion bus framework is provided from a set of classes which represent the general behavior of a variety of different expansion buses. For a specific type of expansion bus, a specific set of subclasses are derived from the classes provided by the expansion bus framework. The expansion bus framework thus provides a common model for recognizing expansion cards, determining the I/O functions on expansion cards, registering the resource requirements of the I/O functions on the expansion cards and instantiating configuration recorder objects for each of the expansion cards on various expansion buses.

Referring now to FIG. 7, the expansion bus framework is shown to include a base class 700 named TIOCardRecognizer. The TIOCardRecognizer class 700 is an abstract base class which includes member functions (illustrated in the box shown next to object 700) which represent the general behavior of recognizer objects. The member functions are illustrated as pure virtual functions which means that they must be overridden in the derived subclasses. Thus, for each particular type of expansion bus, a particular recognizer subclass will be derived from the TIOCardRecognizer class 100 and a corresponding recognizer object for a specific expansion bus will be instantiated from the derived recognizer class. In the derived subclasses the pure virtual functions of the abstract base class will be overridden.

The TIOCardRecognizer class 700 includes the typical constructor and destructor member functions as well as a plurality of unique member functions. For example, the TIOCardRecognizer class 700 includes a method called SetSlotIdentifiers which can be called to create THardwareInterfaceIdentifier objects for each of the slots on the expansion bus for which a particular recognizer object is responsible. The method has the form:

void SetSlotIdentifiers (THardwareModuleMaker& parentDevice, const THardwareInterfaceIdentifier& parentInterface, const short baseSlotIndex, const short slotCount)=0;

The SetSlotidentifiers method also adds the THardwareInterfaceIdentifier objects to a THardwareModuleMaker object which describes the hardware on the bus. The SetSlotIdentifiers method is also called by a motherboard configuration recorder object during motherboard installation to identify slots on the motherboard.

The TIOCardRecognizer class 700 also includes a method called RegisterPossibleAssignments. This method is called to register default, or possible, resource requirements with the resource conflict resolver object. Such resource requirements include, but are not limited to, the possible resource assignments and constraints in resource assignments for multiple I/O functions on all expansion cards on a particular bus. For auto-configurable expansion cards, possible resource assignments are obtained from the expansion cards and constraints in resource assignments are obtained from an I/O function constraint registry. For manually-configured cards, resource requirements (both possible resource assignments and constraints in resource assignments) are obtained from a persistent hardware configuration database as described above. The method has the form:

void RegisterPossibleAssignments (const THardwareModuleHandle& parent, TIOResourceConflictResolverHandle& resolver)=0;

The TIOCardRecognizer class 700 also includes a method called InstantiateCardRecorders. This method is called by a card recognizer during a boot operation to instantiate an appropriate configuration recorder object for each auto-configurable expansion card in a computer system. It has the form:

void InstantiateCardRecorders (const THardwareModuleHandle& parent, const TIOResourceConflictResolverHandle& resolver, const THardwareInterfaceIdentifier& parentInterface, const TInterruptHandlerReference& parentHandler)=0;

For auto-configurable buses, the InstantiateCardRecorders method retrieves conflict-free resource assignments from the resource conflict resolver object for the I/O functions on each expansion card coupled to the bus and programs the expansion card accordingly. The method also resurrects and invokes the corresponding configuration recorder object for each recognized card on the bus.

The recognizer object creates an appropriate THardwareInterfaceIdentifier object for each edge electrical connector on the expansion card and passes the edge connector identifier object to the configuration recorder object. The InstantiateCardRecorders method also obtains a hardware card module from each configuration recorder object and registers the card module in the aforementioned computer hardware configuration database to represent the hardware on the bus. The recognizer retrieves the appropriate slot identifier from the card module and provides it to the appropriate configuration recorder object so that the configuration recorder object can modify the stored bus card module appropriately.

The InstantiateCardRecorders method also creates a THardwareModuleMaker object that represents "software-impaired" cards (cards which are not auto-configurable), registers such software-impaired cards with the computer hardware configuration database and spawns a new thread that waits for a corresponding configuration recorder object for a software-impaired card to become available in the system. For manually-configured buses the InstantiateCardRecorders method is not used.

Possible subclasses derived from the TIOCardRecognizer base class 700 include a ManualIOCardRecognizer class 702, a TPlugNPlayISACardRecognizer class 704, a TPCICardRecognizer class 706 and a TEISACardRecognizer class 708. From each of these subclasses, recognizer objects for corresponding types of expansion buses can be instantiated.

A recognizer object is an object having data attributes and member functions (SetSlotidentifiers) which allow the recognizer object to identify, for a particular type of expansion bus, the expansion slots into which expansion cards are coupled. The member functions also provide a means for registering possible resource assignments of the expansion cards with the I/O conflict resolver object (RegisterPossibleAssignments) and means for instantiating card recorder objects (InstantiateCardRecorders.)

The TPlugNPlayISACardRecognizer class 704 is one example of a subclass derived from the abstract TIOCardRecognizer base class 700. As explained above, an expansion card which conforms to the Plug-and-Play ISA standard is auto-configurable.

A recognizer object for an auto-configurable bus "walks" the corresponding bus, in order to recognize each auto-configurable expansion card coupled to the bus, retrieves the resource requirements for the I/O functions on each auto-configurable expansion card and registers the resource requirements with a resource conflict resolver. The actual functions performed during the search on the bus for auto-configurable cards is dependent on the bus hardware. However, the bus will be searched in a predetermined order to insure that all expansion cards on the bus are located and examined.

The recognizer object for an auto-configurable bus also instantiates an appropriate configuration recorder object for the auto-configurable expansion card, which configuration recorder object stores the respective conflict-free resource assignments computed by a resource conflict resolver coupled to the bus. The recognizer object is further responsible for creating THardwareInterfaceIdentifier objects which characterize each of the expansion bus slots and adding them to the motherboard module during the installation of the motherboard.

The TManualI/OCardRecognizer class 702 is another example of a possible subclass of the TIOCardRecognizer base class 700. An instance of the TManualI/OCardRecognizer class 702 is a ManualI/OCardRecognizer object which is a recognizer object for a manually-configured I/O expansion card. When a manually-configured I/O expansion card is coupled to a bus, the ManualI/OCardRecognizer object makes an entry for the manually-configured I/O expansion card in the hardware configuration database.

A recognizer object for a manually configurable bus also "walks" each expansion bus and retrieves the resource requirements for the I/O functions on the manually-configured I/O expansion cards on the bus from a persistent hardware configuration database and registers the resource requirements with a resource conflict resolver object. The recognizers for an individual expansion bus are monomorphic and normally will not be subclassed by developers.

Referring now to FIG. 8, the expansion bus framework also includes an object class 800 named TConfigurationOptionRetriever. The TConfigurationOptionRetriever class 800 is an abstract base class which defines a protocol for retrieving resource requirements from the aforementioned persistent configuration option database. Such resource requirements may include, but are not limited to, possible resource assignment sets and constraints in resource assignments for multiple I/O functions on expansion cards and the motherboard. Thus, for each particular type of expansion bus coupled to the computer system, a specific option retriever class will be derived from the TConfigurationOptionRetriever class and a corresponding retriever object will be instantiated from the derived class.

For example, in a computer system which includes both an EISA expansion bus and a manually-configured expansion bus, a TEISAConfigurationOptionRetriever class 804 and a TManualConfigurationOptionRetriever class 808 are derived from the TConfigurationOptionRetriever class 800. From these two derived classes 804, 808, corresponding retriever objects can be instantiated to retrieve function information on each I/O function on each of the respective cards as well as vendor specific information for respective EISA and manually-configured expansion cards.

The TConfigurationOptionRetriever class 800 includes the typical constructor and destructor member functions as well as a plurality of unique member functions which are pure virtual functions and, thus, will be overridden by derived classes. For example, the TConfigurationOptionRetriever class 800 includes a member function called GetPossibleAssignments( ) which interrogates the configuration option database and returns possible resource assignment sets for an individual I/O function on an expansion card. A second member function called GetDefaultAssignments( ) returns a default resource assignment for an individual I/O function which corresponds to a factory setting of the expansion card. A GetFunctionInformation( ) method returns the function information for an individual I/O function on the expansion card. A GetFunctionCount( ) method returns the number of I/O functions on the expansion card.

The class definition is as follows:
class TConfigurationOptionRetriever

```
{
public:
    virtual    ~TConfigurationOptionRetriever ();    // Destructor
    // Streaming operators
    //........................................................
    virtual TStream& operator >>= (TStream& toWhere) const;
    virtual TStream& operator <<= (TStream& fromWhere);
    typedef unsigned int FunctionCount;
    virtual FunctionCount GetFunctionCount() const = 0;
        virtual void GetFunctionInformation
            (const TIOFunctionHardwareInterfaceIdentifier::
                FunctionNumber functionNumber,
                TIOFunctionInformation& function) const = 0;
        virtual void GetPossibleAssignments
            (const TIOFunctionHardwareInterfaceIdentifier::
                FunctionNumber functionNumber,
                TCollectionOf <TPossibleIOResourceAssignment>&
            possibles) const = 0;
        virtual void GetDefaultAssignment
            (const TIOFunctionHardwareInterfaceIdentifier::
                FunctionNumber functionNumber,
                TCollectionOf <TPossibleIOResourceAssignment>&
            default) const = 0;
        virtual void GetVendorInformation (TText& vendor) const = 0;
        virtual void SetModuleSignature (const THardwareModuleHandle::
                        HardwareModuleSignature& card);
protected:
    TconfigurationOptionRetriever (const THardwareModuleHandle::
                        HardwareModuleSignature& card);
                        TConfigurationOptionRetriever ();
                        TConfigurationOptionRetriever (const
                    TConfigurationOptionRetriever&
            copy);
    TConfigurationOptionRetriever& operator = (const
        TConfigurationOptionRetriever& right);
private:
    TStandardText fModule;
};
```

A ConfigurationOptionRetriever object also contains a SetModuleSignature method which stores a module signature which is a unique hardware ID for the corresponding card in the corresponding hardware module object representing the card. Similarly, a GetVendorInfo method retrieves vendor specific information from the expansion card and writes it to a vendor text object referenced in the object.

A TIOFunctionInformation class 802 is associated with the TConfigurationOptionRetriever class 800. The TIOFunctionInformation class is a base class that encapsulates bus specific information about I/O functions on a card, such as function number, function type, etc. . . . For a particular type of card, a particular function information class can be derived from TIOFunctionInformation class 802.

For example, as shown in FIG. 9, a plurality of exemplary function information classes 902–908 are shown derived from the TIOFunctionInformation class 900. Each of the derived classes include information for I/O functions on one particular type of card. For example, a TPlugNPlay-ISAFunctionInformation class 904 is provided having bus specific information about a particular I/O function on an expansion card conforming to the Plug and Play ISA standard. Similarly, the TPCIFunctionInformation and TEISAFunctionInformation classes 906, 908 each include bus specific information about particular I/O functions on expansion cards conforming to the PCI and EISA standards, respectively. TManualIOFunctionInformation class 902 is also shown derived from the TIOFunctionInformation base class 900. The TManualIOFunctionInformation class 902 encapsulates I/O function information on manually-configurable boards.

Returning now to FIG. 8, a TPossibleResourceAssignment class 806 is also associated with the TConfigurationOptionRetriever class 800. The TPossibleResourceAssignment class 806 encapsulates both possible resource assignments and default (factory-assigned) resource assignments. As indicated in FIG. 8, for each instance of TConfigurationOptionRetriever there may be one or more TPossibleResourceAssignment objects instantiated, each containing a possible resource assignment set. A single default resource assignment set is associated with one instance.

Figure 10:
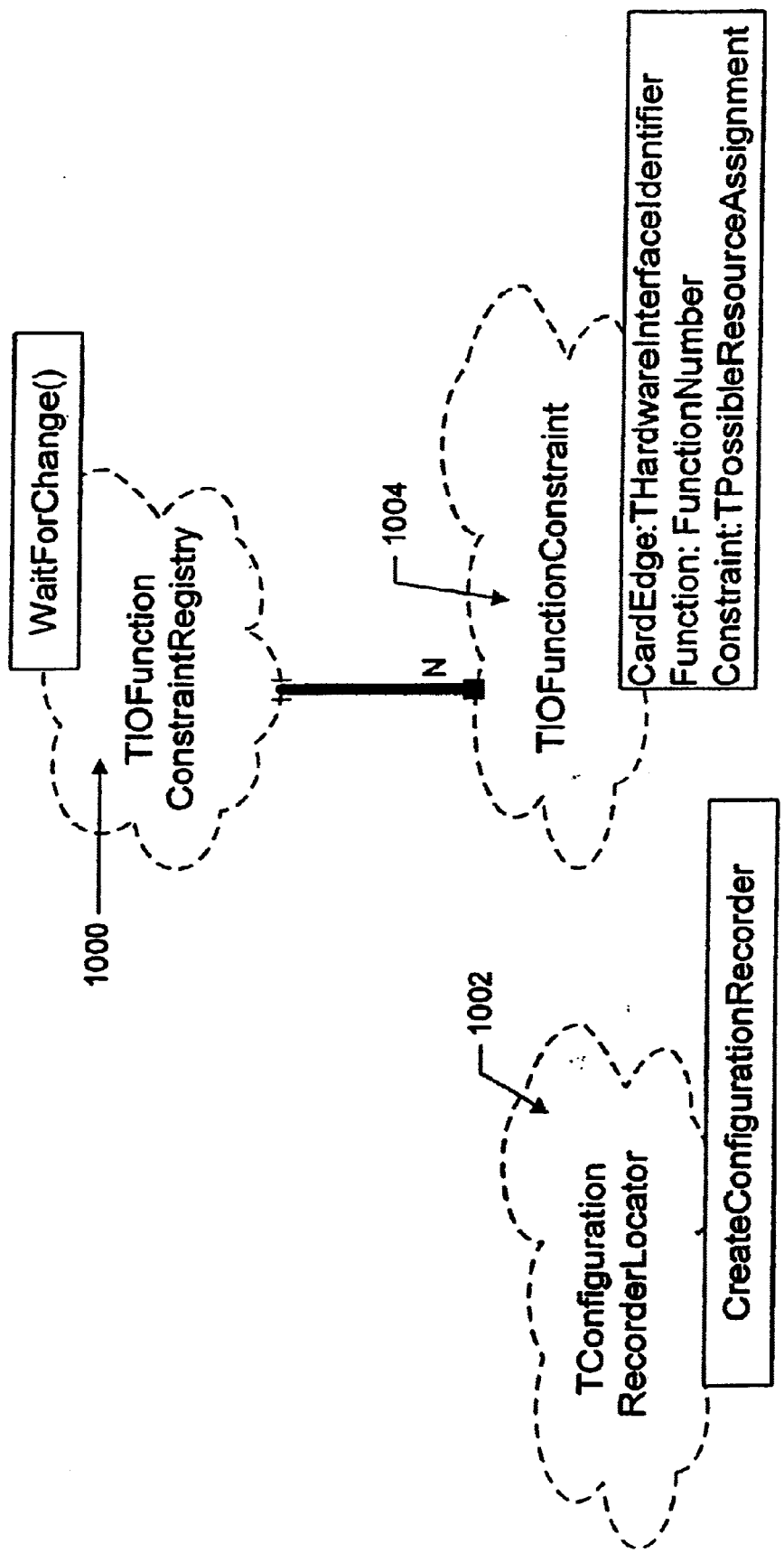

Referring now to FIG. 10, the expansion bus framework further includes a class 1000 named TIOFunctionConstraintRegistry. The TIOFunctionConstraintRegistry class 1000 encapsulates constraints on resource assignments for I/O functions on auto-configurable expansion cards, such as Plug & Play ISA and PCI expansion cards.

Constraints express limits on assigning resources. The TIOFUNCTIONCONSTRAINTREGISTRY object are stored in a persistent database (not shown). The TIOFunctionConstraintRegistry class 1000 includes typical construction and destructor member functions as well as a WaitForChange( ) member function which waits for any change in the I/O function constraints registered in the function constraint registry database.

A TIOFunctionConstraint class 1004 is associated with the TIOFunctionConstraintRegistry class 1000. The TIOFunctionConstraint class 1004 encapsulates information about a constraint on resource assignments for an I/O function. The information which is encapsulated depends on the I/O function.

The TIOFunctionConstraint class 1004 also includes typical constructor and destructor member functions as well as a plurality of attributes which encapsulate constraint information. For example, the TIOFunctionConstraint class 1004 includes a CardEdge attribute which holds a reference THardwareInterfaceIdentifier object that identifies a card edge connector. A Function attribute holds a FunctionNumber that uniquely identifies one among a number of functions on the board. Finally, a Constraint attribute holds a reference to a TPossibleResourceAssignment object which specifies that actual constraints. The class definition is as follows:

```
class TIOFunctionConstraint
{
public:
    TIOFunctionConstraint ();
    TIOFunctionConstraint (const TIOFunctionConstraint& copy);
    TIOFunctionConstraint& operator= (const TIOFunctionConstraint& right);
    virtual ~TIOFunctionConstraint ();      // Destructor
    // Streaming operators
    //.............................................................
    virtual TStream& operator >>=      (TStream& toWhere) const;
    virtual TStream& operator <<=      (TStream& fromWhere);
    virtual THardwareInterfaceIdentifier* CopyEdgeIdentifier () const;
    virtual void SetEdgeIdentifier (const THardwareInterfaceIdentifier& edgeID);
    virtual TIOFunctionHardwareInterfaceIdentifier::FunctionNumber
                        GetFunctionNumber () const;
    virtual void SetFunctionNumber
            (const TIOFunctionHardwareInterfaceIdentifier::
                FunctionNumber functionNumber);
    virtual void GetAssignmentConstraint
(TPossibleIOResourceAssignment& constraint) const;
        virtual void SetAssignmentConstraint (const
            TPossibleIOResourceAssignment& constraint);
        enum EGarbageCollect    {kGarbageCollection, kNoGarbageCollection};
        virtual EGarbageCollect  GetGarbageCollectionStatus () const;
        virtual void            SetGarbageCollectionStatus (const
                                    EGarbageCollect status);
private:
    THardwareInterfaceIdentifier*          fEdgeID;
    TPossibleIOResourceAssignment          fConstraint;
    TIOFunctionHardwareInterfaceIdentifier::FunctionNumber  fFunctionNumber;
    EGarbageCollect  fGarbageCollect;       // for PCMCIA=FALSE
};
```

The expansion bus framework also includes a TConfigurationRecorderLocator template class 1002. All individual bus frameworks use this class and an individual bus framework uses a CreateConfigurationRecorder( ) member function of this class to resurrect the appropriate configuration recorder object for an expansion card. The class definition is as follows:

```
template <class AConfigurationRecorder>
class TConfigurationRecorderLocator
{
```

-continued

```
public:
        TConfigurationRecorderLocator(const TText& theRecorderID);
    virtual ~TconfigurationRecorderLocator();
    virtual AConfigurationRecorder* CreateConfigurationRecorder
        (Boolean WaitForRecorder);
};
```

2. The Conflict Resolver Framework

Figure 11:
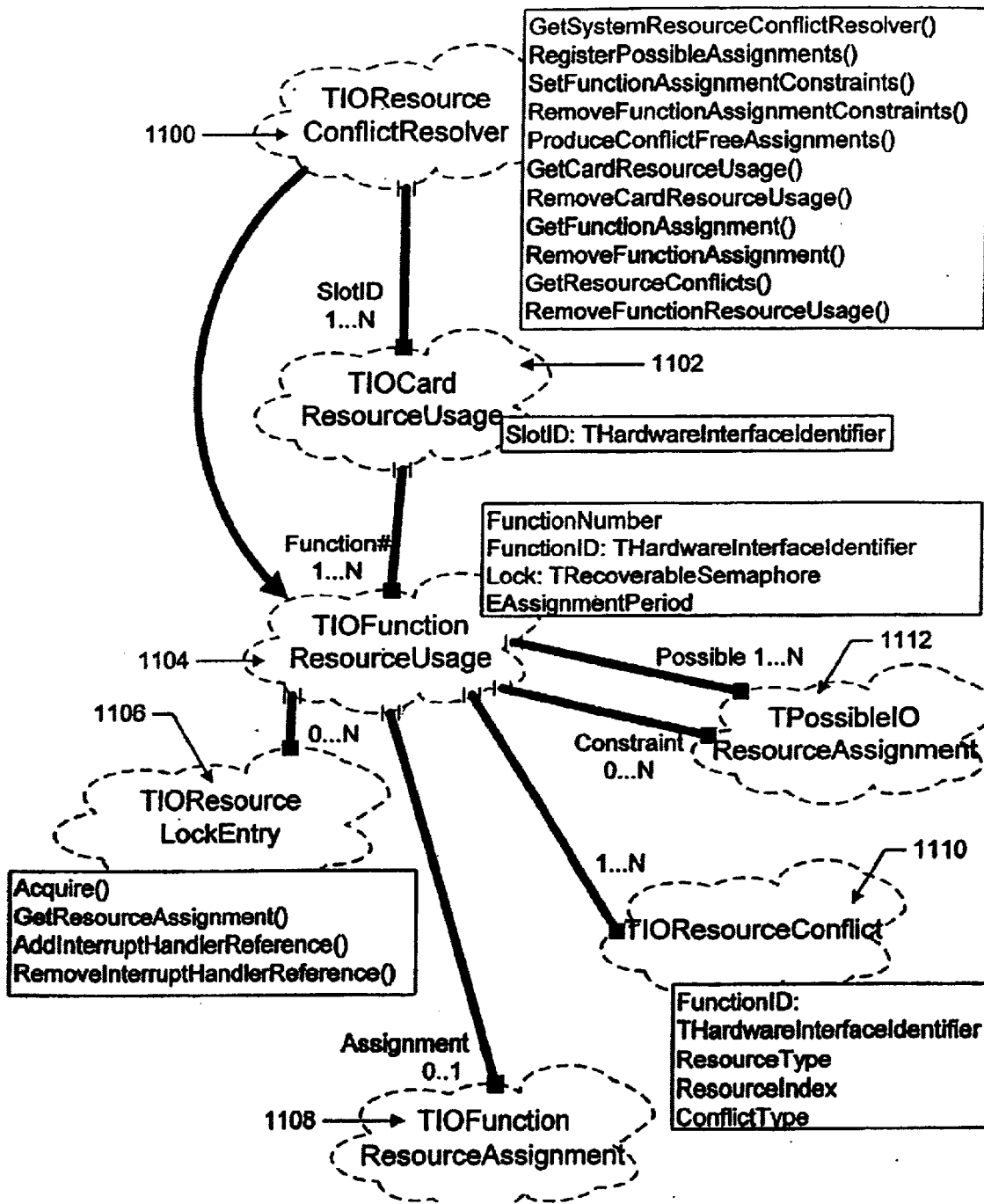
Figure 12:
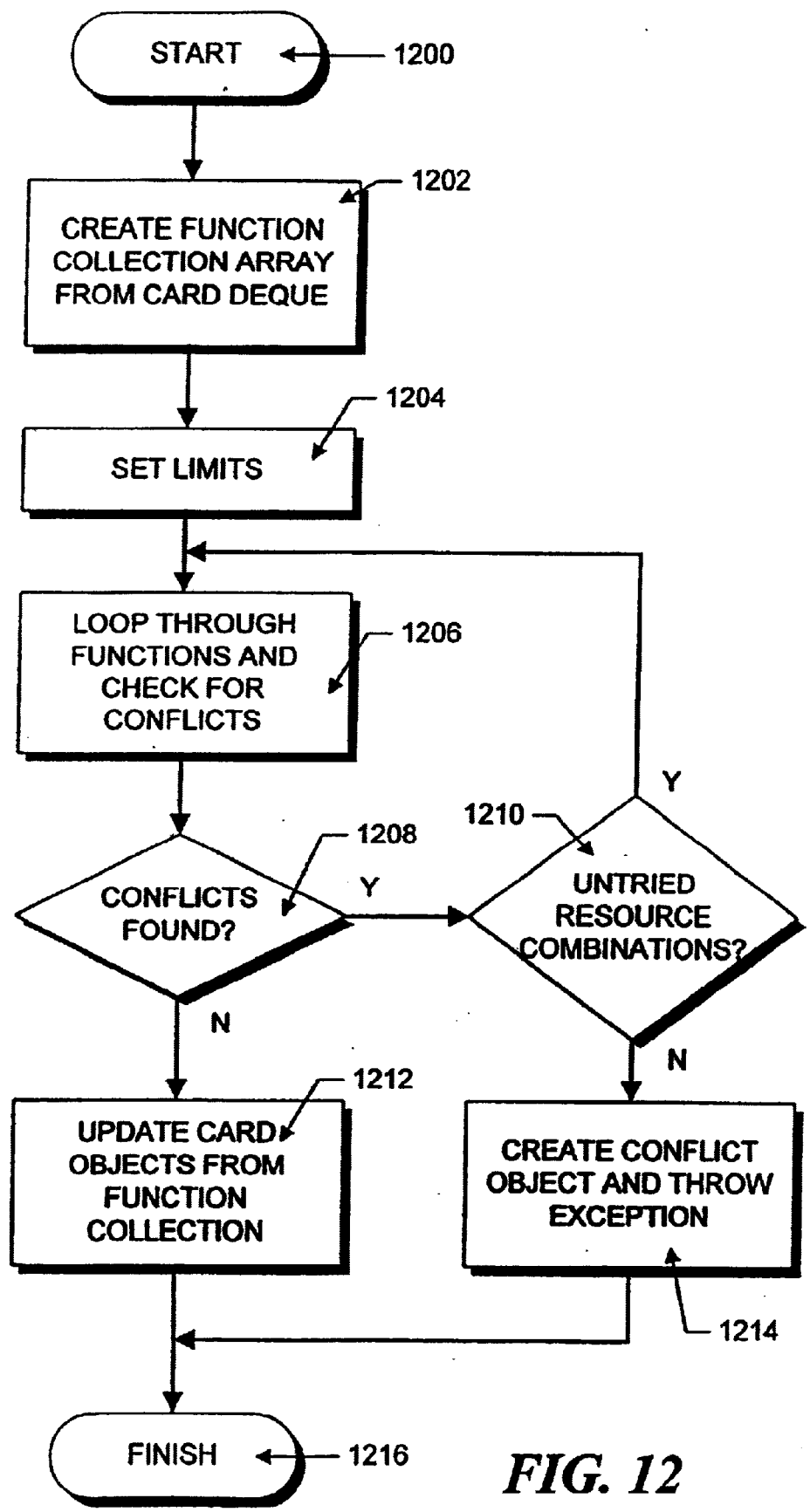
FIG. 12 is an illustrative flowchart showing an overview of the resource conflict resolution process.
Figure 13:
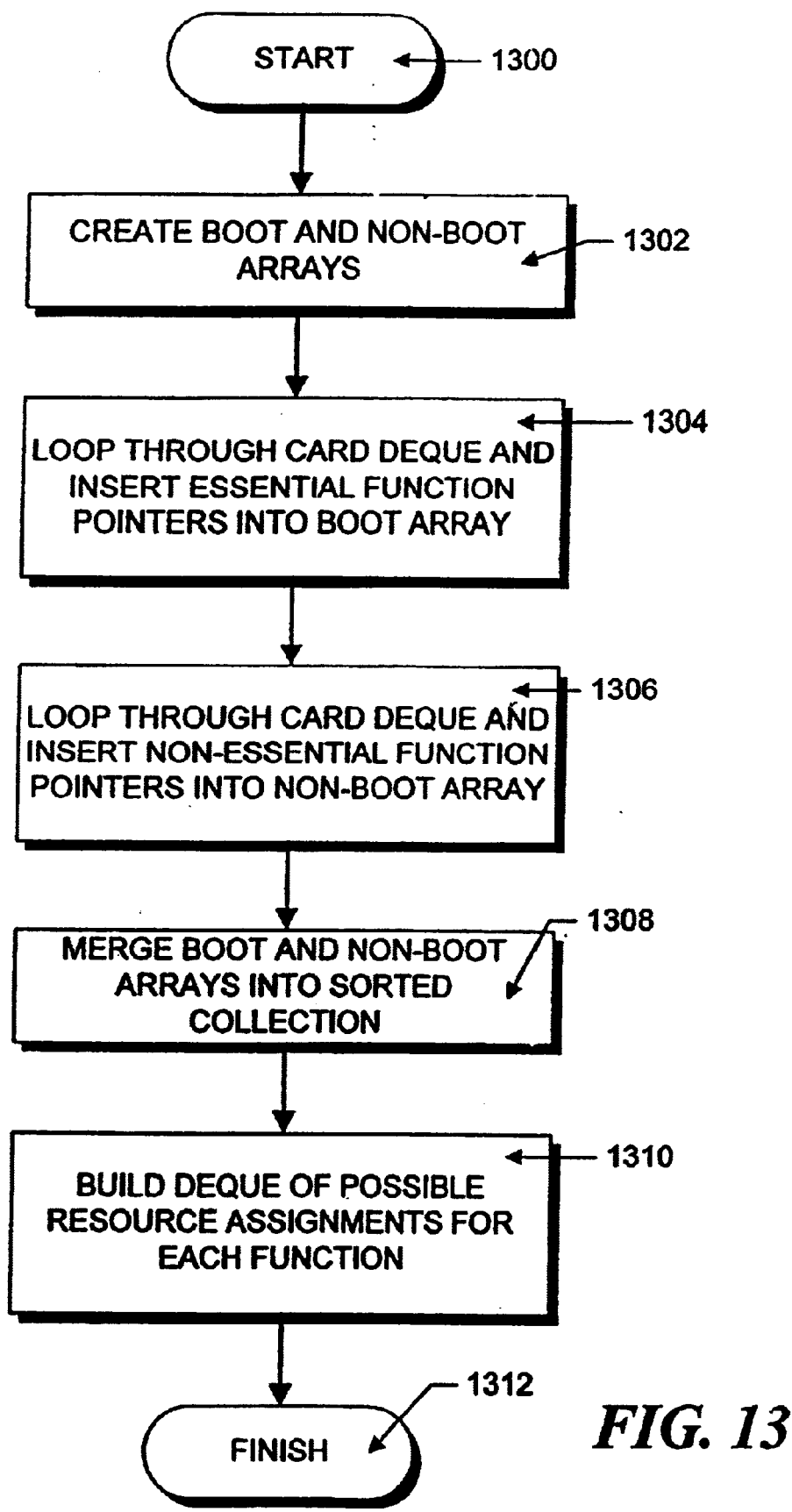
FIG. 13 is an illustrative flowchart showing the method by which a collection of possible resource assignments are built from the card objects.

FIGS. 11–13 illustrate a set of classes which form a conflict resolver framework. The conflict resolver framework is provided from a set of classes which provide a bus independent model for detecting and resolving conflicts in resource usage which arise between multiple I/O functions on the expansion cards and motherboard of the computer.

A plurality of classes in the I/O conflict resolver framework are discussed in detail in conjunction with FIGS. 11–13. In general overview, however, the conflict resolver framework includes an abstract class named TIOResourceConflictResolver which creates an object that manages the assignment of I/O resources (such as I/O registers, I/O memory, interrupt signal lines, interrupt levels and DMA channels) to I/O functions on the motherboard and expansion cards.

The resource conflict resolver object interacts with several card usage classes that are stored in the hardware configuration database and encapsulate resource information for a card and functions on the card. This resource information includes possible resource assignments sets, constraint information and conflict-free resource assignments made by the resource conflict resolver object Such resource assignments information may, for example correspond to possible resource assignments, constraints in resource assignment, conflict-free resource assignment and the resource conflict information (whenever a conflict is encountered). The TIOCardResourceUsage class encapsulates resource usage and conflict-free resource assignments made by the resource conflict resolver object for all I/O functions on a card. The resource conflict resolver class is also associated with a TIOFunctionResourceUsage class which encapsulates the resource usage information for an individual I/O function.

In general, the resource conflict resolver object deals with four resources: memory, I/O registers, DMA channels and interrupt sockets. A TIOMemoryUsageMode class encapsulates characteristics of the memory range; a TInterruptUsageMode class encapsulates characteristics of an interrupt socket and a TDMAUsageMode class encapsulates characteristics of a DMA channel.

In accordance with one aspect of the invention, the TIOFunctionResourceUsage class is associated with a TIOResourceLockEntry class which manages access to the system resources assigned to an I/O function and encapsulated in an IOFunctionResourceUsage object. As will hereinafter be explained, a IOResourceLockEntry object contains a semaphore which must be acquired by a client, such as a device driver, which wishes to obtain access to the resource assignments and then to the assigned resources.

The TIOFunctionResourceUsage class is also associated with a TIOResourceConflict class. The TIOResourceConflict class encapsulates the information about a resource conflict whenever a conflict is encountered in the resource assignment for a particular I/O function. Objects instantiated from the TIOResourceConflict class include information explaining why a particular I/O function could not be assigned the required resource and what other I/O functions are involved in the resource conflict.

Possible resource assignment sets and constraints on those assignments are encapsulated in several other objects. A TPossibleIOFunctionResourceAssignment class contains information representing choices and constraints in system resource assignment for an individual I/O function. A TIOMemoryConstraint is the representation of constraints on memory ranges required by an I/O function. A TIORegisterConstraint is the representation of a I/O register range required by an I/O function and the constraints on that range. A TInterruptConstraint is the representation of an interrupt socket required by an I/O function and the constraints on that socket. A TDMAConstraint is the representation of a DMA channel required by an I/O function and the constraints on that channel.

The TIOFunctionResourceUsage class is further associated with several classes which encapsulate the conflict-free resource assignments generated by the resource conflict resolver object and are referred to by the resource usage objects. For example, a TIOFunctionResourceAssignment class is used by the resource conflict resolver object to represent a conflict-free resource assignment for an individual I/O function. A TIOMemoryAssignment class contains information representing a memory range assigned to the I/O function. A TIORegisterAssignment class contains information representing an I/O register range assigned to an I/O function. A TInterruptAssignment class is the representation of interrupt sockets assigned to an I/O function. A TDMAAssignment class is the representation of a DMA channel assigned to an I/O function.

Referring now to FIG. 11, a conflict resolver framework includes a TIOResourceConflictResolver class 1100 which includes constructor and destructor member functions as well as a plurality of unique member functions. The constructor creates a single reference-counted master object by lazy evaluation (the first client to require the conflict resolver creates it by calling the constructor.) The destructor destroys the object if the reference count is zero. The TIOResourceConflictResolver class is a monomorphic class and is normally not subclassed by developers.

Clients of the resource conflict resolver object execute a GetSystemResourceConflictResolver( ) method which returns a handle to the system conflict resolver object so that they can communicate with the object. The handle provides a streamlined and simple representation of the resolver object which representation is easy to copy and stream.

The TIOResourceConflictResolver class 1100 also includes a RegisterPossibleAssignments( ) method which registers the possible resource assignments for all I/O functions on an expansion card or a motherboard. The possible resource assignments are encapsulated in a resource usage object generated by a recognizer or card object. Registration occurs by adding the card to a deque of card resource usage objects in the resource conflict resolver object. The code for the function follows:

```
void TIOResourceConflictResolver::RegisterPossibleAssignments
                                (const TIOCardResourceUsage & card)
{
    TIOCardResourceUsage            *cardToRegister;
    THardwareInterfaceIdentifier    *slotID;
    TDequeOf<TIOFunctionResourceUsage>  newUsage;
    slotID = card.CopySlotIdentifier();
    // Attempt to find the existing card
    if ((cardToRegister = FindCardByID(*slotID)) == NIL) {
        cardToRegister = new TIOCardResourceUsage(card);
        cardToRegister->SetSlotIdentifier(*slotID);
```

-continued

```
        fCard.Add(cardToRegister);
    }
    else {
        card.GetFunctionResourceUsage(newUsage);
        cardToRegister->SetFunctionResourceUsage(newUsage);
        newUsage.DeleteAll();
    }
}
```

Possible resource assignments for each I/O function must be determined prior to a call to this method. Clients of the resource conflict resolver such as the motherboard recorder, card recognizers and card viewers, register resource requirements such as possible resource assignments and constraints on the resource assignments for the I/O functions on the motherboard and expansion cards with the resource conflict resolver object by calling this method. Resource requirements are registered with the resource conflict resolver object on a card basis (TIOCardResourceUsage) using a slot identifier (SlotID) for the card as a key.

In response to a call to the method ProduceConflictFreeAssignments( ), the resource conflict resolver object creates a conflict-free resource assignment (encapsulated in a TIOFunctionResourceAssignment object) for each I/O function on each expansion card. In some instances, it may be preferable for an I/O resource assignment to take effect during the present boot operation. Alternatively, it may be preferable for an I/O resource assignment to take effect during the next subsequent boot operation. Thus, a boot period is specified by the client, which boot period indicates if a resource assignment for an I/O function is valid for the present boot operation or for the next subsequent boot operation.

If the resource conflict resolver object encounters a resource conflict while creating a resource assignment for a particular I/O function, then the resource conflict resolver also creates a TIOResourceConflict object for that particular I/O function and continues to try different resource combinations in order to obtain a conflict-free resource assignment. A TIOResourceConflict object encapsulates information, such as which system resource is involved in the conflict, the period of time during which the conflict exists, what the conflicting I/O functions are, etc. If a conflict-free resource assignment is subsequently produced for the I/O function, the resource conflict resolver object deletes the resource conflict object, otherwise an exception is thrown.

The resource conflict resolver object acts as a centralized source for resource allocation information for all I/O functions in the computer system. Clients of the resource conflict resolver object, such as card recognizers, access the resource allocation information for an I/O function using a THardwareInterfaceIdentifier for the I/O function as a key into the hardware configuration database where the information is stored. The resource conflict resolver object also includes access control mechanisms to synchronize access to the stored resource allocation information by multiple clients to the resource assignment computed by the resource conflict resolver object.

For example, in accordance with the principles of the invention, device driver clients of the resource conflict resolver object retrieve resource assignments for I/O functions through a semaphore lock encapsulated in an IOResourceLockEntry object which is instantiated from a TIOResourceLockEntry class 1106. The TIOResourceLockEntryClass 1106 will be discussed in detail further below. Suffice it here, however, to say that device driver clients must instantiate a TIOResourceLockEntry object and acquire the lock for the resources by invoking an Acquire( ) method of the IOResourceLockEntry object. After acquiring the lock, device drivers can access the actual resource assignments for the corresponding I/O function by calling a GetResourceAssignment( ) method of the IOResourceLockEntry object.

Since resource assignments can be entered into the hardware configuration database by means of the computer viewer, as described above, before a card is physically inserted into the computer system, the resource conflict resolver object can generate and return I/O function resource assignments for the I/O functions on the card even if the card is not physically installed. Consequently, the appropriate device driver must verify whether the device for which the resource assignment is made is in the computer system.

The TIOResourceConflictResolver class provides methods (RemoveCardResourceUsage( ); RemoveFunctionAssignment( ); RemoveFunctionResourceUsage( )) to remove the resource assignments on an I/O function basis as well as on an expansion card basis when the assignments are no longer valid (for example when a new card is added and a conflict-free resource assignment cannot be made.)

The TIOResourceConflictResolver class 1100 also includes a SetFunctionAssignmentConstraints( ) method which registers constraints in the resource assignment for an I/O function on an expansion card with the conflict resolver object. The SetFunctionAssignmentConstraints( ) method is used by clients of the resource conflict resolver object to force the resource assignment for a particular I/O function to a specific value. The constraints in resource assignment must not be in conflict with the possible resource assignments for the card. If there is any conflict between the constraints, this method throws an exception. This method also throws exception if the card or the function is not registered with the resolver.

A RemoveFunctionAssignmentConstraints( ) method removes the resource assignment constraints associated with an I/O function set with the aforementioned SetFunctionAssignmentConstraints( ) method. This method throws an exception if the card or the function is not registered with the conflict resolver object.

A GetCardResourceUsage( ) method of the TIOResourceConflictResolver is called to get conflict-free resource assignments for all I/O functions on an expansion card identified by the slotID. The conflict-free resource assignments are created by a prior call to the ProduceConflictFreeAssignments( ) method. The GetCardResourceUsage( ) method throws exception if an expansion card is not registered with the resource conflict resolver object. The code for this method is illustrated below:

```
void TIOResourceConflictResolver::GetCardResourceUsage (
                    const THardwareInterfaceIdentifier & slotID,
                    TIOCardResourceUsage & cardAssignments)
{
    TIOCardResourceUsage    *card;
    if ((card = FindCardByID(slotID)) == NIL){
        throw (TConflictResolverException
        (TConflictResolverException::kCardNotRegistered));
        return;
    }
    cardAssignments = *card; // Copy stuff over
```

```
}
TIOCardResourceUsage * TIOResourceConflictResolver::FindCardByID
                    (const THardwareInterfaceIdentifier & slotID) const
{
    TIOCardResourceUsage                *card;
    THardwareInterfaceIdentifier        *checkid;
    TIteratorOver<TIOCardResourceUsage> *iterator;
    iterator = fCard.CreateIterator();
    card = iterator->First();
    while (card != NIL) {
        checkid = card->CopySlotIdentifier();
        if (*checkid == slotID) {
            delete checkid;
            delete iterator;
            return card;
        }
        card = iterator->Next();
        delete checkid;
    }
    delete iterator;
    return NIL;
}
```

A RemoveCardResourceUsage method of the TIOResourceConlfictResolverClass 1100 is called to remove all resource assignments (TIOCardResourceUsage) for a particular expansion card. This method is typically called when an expansion card is removed from the computer system and generates an exception if the expansion card is using the resources when the card is being removed. The code for this method is as follows:

```
void TIOResourceConflictResolver::RemoveCardResourceUsage(const
                    THardwareInterfaceIdentifier & slotID)
{
    TIOCardResourceUsage                            *cardToRemove;
    TDequeOf<TIOFunctionResourceUsage>              funcDeque;
    TSequenceOfIterator<TIOFunctionResourceUsage>   *funcIterator;
    TIOFunctionResourceUsage                        *funcUsage;
    if ((cardToRemove = FindCardByID(slotID)) == NIL) {
        throw (TConflictResolverException
(TConflictResolverException::kCardNotRegistered));
        return;
    }
    fCard.Remove(*cardToRemove); // Remove card
}
```

A GetFunctionAssignment( ) method is called by the recognizers and computer viewer control panels only and returns a conflict-free resource assignment for a particular I/O function on a particular expansion card. The code for this method is given below:

```
void TIOResourceConflictResolver::GetFunctionAssignment(
            const TIOFunctionHardwareInterfaceIdentifier& functionID,
            TIOFunctionResourceAssignment& function) const
{
    TIOFunctionResourceUsage    *functionItem;
    if ((functionItem = FindFunctionByID (functionID)) == NIL) {
        throw (TConflictResolverException
(TConflictResolverException::kFunctionNotRegistered));
        return;
    }
    if (functionItem->GetAssignment(function) ==
                TIOFunctionResourceUsage::kNotAssigned) {
        TDequeOf <TIOResourceConflict> conflicts;
        functionItem->GetResourceConflicts(conflicts);
        if (conflicts.Count())
            throw (TconflictResolverException
                (TConflictResolverException::kConflictInResources));
        else
            throw (TConflictResolverException
                (TConflictResolverException::kNoAssignmentCreated));
        return;
    }
}
TIOFunctionResourceUsage * TIOResourceConflictResolver::FindFunctionByID(const
            TIOFunctionHardwareInterfaceIdentifier & functionID) const
{
    TSequenceOfIterator<TIOCardResourceUsage>      *cardIterator;
    TIOCardResourceUsage                           *card;
    TDequeOf<TIOFunctionResourceUsage>             functionDeque;
    TSequenceOfIterator<TIOFunctionResourceUsage>  *functionIterator;
    TIOFunctionResourceUsage                       *functionUsage;
    THardwareInterfaceIdentifier                   *slotID, *checkID, *edgeID;
    TIOFunctionHardwareInterfaceIdentifier::FunctionNumber    functionNumber;
    functionNumber = functionID.GetIOFunction();
    // Find the slot ID from the function ID by navigating through the HW Config DB
    if ((edgeID = functionID.CopyParent()) == NIL)
        return       NIL;
    THardwareConfigurationHandle myDB;
    myDB = THardwareConfigurationHandle::GetComputerDatabase();
    THardwareInterfaceHandle edgeHandle = myDB.GetInterface(*edgeID);
    TDequeOf <THardwareConnectionHandle> myConnections;
    edgeHandle.GetAllConnections(myConnections);
```

-continued

```
    THardwareConnectionHandle* edgeConnection = myConnections.First();
    THardwareInterfaceHandle slotHandle = edgeConnection->GetOtherEnd
                        (edgeHandle);
    slotID = slotHandle.CopyHardwareInterfaceIdentifier();
    myConnections.DeleteAll();
    if (slotID == NIL)
        return       NIL;
    cardIterator = fCard.CreateSequenceIterator();
    card = cardIterator->First();
    while (card != NIL) {
        checkID = card->CopySlotIdentifier();
        if (*checkID != *slotID) {
            delete checkID;
            card = cardIterator->Next();
            continue;
        }
        delete checkID;
        card->GetFunctionResourceUsage(functionDeque);
        functionIterator = functionDeque.CreateSequenceIterator();
        functionUsage = functionIterator->First();
        while (functionUsage != NIL) {
            if (functionNumber == functionUsage->GetFunctionNumber()) {
                delete cardIterator;
                delete functionIterator;
                delete slotID;
                TIOFunctionResourceUsage     *saveUsage;
                saveUsage = new TIOFunctionResourceUsage
                        (*functionUsage);
                functionDeque.DeleteAll();
                return saveUsage;
            }
            functionUsage = functionIterator->Next();
        }
        delete functionIterator;
        card = cardIterator->Next();
    }
    delete slotID;
    delete cardIterator;
    functionDeque.DeleteAll();
    return       NIL;
}
```

Each particular I/O function has a unique identifier (THardwareInterfaceIdentifier) which is passed as a key to the GetFunctionAssignment( ) method to obtain the resource assignment from the hardware configuration database for the particular I/O function located by the FindFunctionByID( ) method. The Configuration Recorder for each particular expansion card and the corresponding configuration recorder object creates the unique identifier for each I/O function on the expansion card by subclassing from the TIOFunctionHardwareInterfaceIdentifier class.

It should be noted that the GetFunctionAssignment( ) method returns the resource assignment for an expansion card even if the expansion card is not physically installed in the system as long as the card is registered in the hardware configuration database. The GetFunctionAssignment( ) method throws an exception if the resource assignment is not created, if there is any conflict in creating a resource assignment for a particular I/O function or if the I/O function is not registered with the conflict resolver.

The TIOResourceConflictResolver class 1100 includes GetResourceConflicts( ) method which is called only by the card recognizers and control panels and returns the conflicts in resource assignment for an I/O function. To obtain the resource conflicts for a particular I/O function, a unique THardwareInterfaceIdentifier for the I/O function is passed in as a key to the function. The conflicts are retrieved from the resource usage object in the hardware configuration database. The GetResourceConflicts( ) method throws exception if the I/O function is not registered with the resource conflict resolver. The code for the method is illustrated below:

```
void TIOresourceConflictResolver::GetResourceConflicts (const
    TIOFunctionHardwareInterfaceIdentifier& functionID,
            TCollectionOf <TIOResourceConflict>& conflicts) const
{
    TIOFunctionResourceUsage     *functionItem;
    TIOFunctionResourceAssignment function;
    if ((functionItem = FindFunctionByID (functionID)) == NIL) {
        throw (TconflictResolverException
                (TConflictResolverException::kFunctionNotRegistered));
        return;
    }
    if (functionItem->GetAssignment(function) ==
    TIOFunctionResourceUsage::kNotAssigned) {
        functionItem->GetResourceConflicts(conflicts);
    }
}
```

When an I/O function is removed from the system, a RemoveFunctionAssignment( ) method and a RemoveFunctionResourceUsage( ) method of the TIOResourceConflictResolver class 1100 are called to remove, respectively, the resource assignment (TIOFunctionResourceAssignment) assigned to the I/O function and the resource usage (TIOFunctionResourceUsage) associated with the I/O function. In the case of the RemoveFunctionAssignment method( ), the caller of the method asserts that the resources are not being responded to by the corresponding hardware. This method generates an exception if the resources are in use and also generates an exception if the I/O function is not registered with the resource conflict resolver. The code for the function is:

```
void TIOResourceConflictResolver::RemoveFunctionAssignment (const
            TIOFunctionHardwareInterfaceIdentifier & functionID) const
{
    TSequenceOfIterator<TIOCardResourceUsage>     *cardIterator;
    TIOCardResourceUsage                           *card;
    TDequeOf<TIOFunctionResourceUsage>             functionDeque;
    TSequenceOfIterator<TIOFunctionResourceUsage> *functionIterator;
    TIOFunctionResourceUsage                       *functionUsage;
    THardwareInterfaceIdentifier                   *checkID, *cardIdentifier;
    TIOFunctionHardwareInterfaceIdentifier::FunctionNumber    functionNumber;
    if ((cardIdentifier = functionID.CopyParent()) == NIL) {
        throw (TconflictResolverException
                (TConflictResolverException::kFunctionNotRegistered));
    }
    cardIterator = fCard.CreateSequenceIterator();
    card = cardIterator->First();
    functionNumber = functionID.GetIOFunction();
    while (card != NIL) {
        checkID = card->CopySlotIdentifier();
        if (*checkID != *cardIdentifier) {
            delete checkID;
            card = cardIterator->Next();
            continue;
        }
        delete checkID;
        card->GetFunctionResourceUsage(functionDeque);
        functionIterator = functionDeque.CreateSequenceIterator();
        functionUsage = functionIterator->First();
        while (functionUsage != NIL) {
            if (functionNumber == functionUsage->GetFunctionNumber()) {
                function Usage->ClearAssignment();
                card->SetFunctionResourceUsage (functionDeque);
                delete cardIterator;
                delete functionIterator;
                delete cardIdentifier;
                functionDeque.DeleteAll();
                return;
            }
            functionUsage = functionIterator->Next();
        }
        delete functionIterator;
        functionDeque.DeleteAll();
        card = cardIterator->Next();
    }
    delete cardIdentifier;
    delete cardIterator;
    throw (TconflictResolverException
            (TconflictResolverException::kFunctionNotRegistered));
}
```

In the case of the RemoveFunctionResourceUsage( ) method, the caller of the method asserts that the resources are not being responded to by the corresponding hardware. This method generates an exception if the resources are in use or if the I/O function is not registered with the resource conflict resolver. The code for this function is:

```
void TIOResourceConflictResolver::RemoveFunctionResourceUsage(const
            TIOFunctionHardwareInterfaceIdentifier & functionID) const
{
    TSequenceOfIterator<TIOCardResourceUsage>     *cardIterator;
    TIOCardResourceUsage                           *card;
    TDequeOf<TIOFunctionResourceUsage>             functionDeque;
    TSequenceOfIterator<TIOFunctionResourceUsage> *functionIterator;
    TIOFunctionResourceUsage                       *functionUsage;
    TIOFunctionHardwareInterfaceIdentifier         *functionIdentifier;
    cardIterator = fCard.CreateSequenceIterator();
    card = cardIterator->First();
    while (card != NIL) {
        card->GetFunctionResourceUsage(functionDeque);
        functionIterator = functionDeque.CreateSequenceIterator();
        functionUsage = functionIterator->First();
        while (functionUsage != NIL) {
```

-continued

```
            functionIdentifier = functionUsage->CopyFunctionIdentifier();
            if (*functionIdentifier == functionID) {
                functionIterator->Remove();
                card->SetFunctionResourceUsage(functionDeque);
                functionDeque.DeleteAll();
                delete cardIterator;
                delete functionIterator;
                return;
            }
            delete functionIdentifier;
            functionUsage = functionIterator->Next();
        }
        delete functionIterator;
        card = cardIterator->Next();
    }
    delete cardIterator;
    functionDeque.DeleteAll();
    throw (TConflictResolverException
            (TConflictResolverException::kFunctionNotRegistered));
}
```

The TIOResourceConflictResolver class 1100 is associated with a class 1102 named TIOCardResourceUsage and a class 1104 named TIOFunctionResourceUsage. The purpose of the TIOCardResourceUsage class 1102 is to encapsulate resource usage information for multiple I/O functions on a card. Clients of the resource conflict resolver object retrieve the resource usage information for an expansion card from the hardware configuration database using the THardwareInterfaceIdentifier for the expansion slot in which the expansion card is installed. The TIOCardResourceUsage class 1102 is a monomorphic class which is normally not subclassed by developers.

The TIOCardResourceUsage class 1102 includes the typical constructor and destructor member functions and also includes a plurality of unique member functions. For example, a GetFunctionResourceUsage member function returns the resource usage of multiple I/O functions on a particular expansion the card. This function has the form:

void GetFunctionResourceUsage
  (TCollectionOf<TIOFunctionResourceUsage>& function) const;

The TIOCardResourceUsage class 1102 also includes a SetFunctionResourceUsage( ) member function. The method implemented by this member function writes the resource usage of multiple I/O functions on an expansion card and has the form:

void SetFunctionResourceUsage (const
  TCollectionOf<TIOFunctionResourceUsage>& function);

The TIOCardResourceUsage class also includes a THardwareInterfaceIdentifier* CopySlotIdentifier( ) method and a SetSlotIdentifier( ) method. The THardwareInterfaceIdentifier* CopySlotIdentifier( ) method returns the THardwareInterfaceIdentifier for the expansion slot in which the expansion card is installed and the SetSlotIdentifier( ) method writes the THardwareInterfaceIdentifier for the expansion slot in which the expansion card is installed. These functions have the following form:

THardwareInterfaceIdentifier* CopySlotIdentifier( ) const; and void SetSlotIdentifier (const THardwareInterfaceIdentifier& slotID);

The purpose of the TIOFunctionResourceUsage class 1104 is to encapsulate resource requirements, such as possible resource assignments and resource assignment constraints, and conflict-free resource assignments for an individual I/O function. The TIOFunctionResourceUsage class 1104 also encapsulates an assignment period, for which the resource assignment is valid, and the information about resource conflicts if any resource conflict is encountered while producing the conflict-free resource assignment. Clients of the resource management system, such as recognizers retrieve an IOFunctionResourceUsage object for an I/O function from the hardware configuration database using the function number associated with the I/O function. The TIOFunctionResourceUsage class 1104 is a monomorphic class which is normally not subclassed by developers.

The TIOFunctionResourceUsage class 1104 includes the typical constructor and destructor member functions as well as a plurality of unique member functions. For example the TIOFunctionResourceUsage class includes a SetPossibleAssignments( ) method and a GetPossibleAssignments( ) method which respectively write and return the possible resource assignments for a particular I/O function. They have the form:

void GetPossibleAssignments
  (TCollectionOf<TPossibleIOResourceAssignment>& possibles) const; and void SetPossibleAssignments (const
  TCollectionOf<TPossibleIOResourceAssignment>& possibles);

The TIOFunctionResourceUsage class further includes a GetAssignmentConstraints( ) method and a SetAssignmentConstraints( ) method which respectively write and return the constraints in resource assignments for a particular I/O function. These functions have the following form:

void GetAssignmentConstraints
  (TCollectionOf<TPossibleIOResourceAssignment>& constraints) const; and void SetAssignmentConstraints (const
  TCollectionOf<TPossibleIOResourceAssignment>& constraints);

A GetAssignment( ) method of the TIOFunctionResourceUsage class 1104 returns a conflict-free resource assignment for an I/O function while a SetAssignment method( ) of class 11044 writes the conflict-free resource assignment for a particular I/O function into the corresponding IOFunctionResourceUsage object. It should be noted, however, that device drivers cannot use the GetAssignment( ) method to obtain the resource assignment for a particular I/O function. Rather, device drivers obtain the resource assignment for a particular I/O function via a IOResourceLockEntry object as explained below. The GetAssignment( ) method returns a first enumerated value (kAssigned) if the resource conflict resolver object has created a resource assignment and a second different value (kNotAssigned) if the resource conflict resolver object has not created a resource assignment. These function have the following form:

void EASSIGNMENTSTATUS GetAssignment
  (TIOFunctionResourceAssignment& assignment) const; and void SetAssignment (const TIOFunctionResourceAssignment& assignment);

A GetFunctionNumber( ) method returns the function number associated with an I/O function, which number identifies a particular function on an expansion board, and a SetFunctionNumber( ) method writes the function number associated with an I/O function. These functions have the following form:

TIOFunctionHardwareInterfaceIdentifier::FunctionNumber
  GetFunctionNumber const; and void SetFunctionNumber
  (TIOFunctionHardwareInterfaceIdentifier::FunctionNumber functionNumber);

A GetResourceConflicts( ) method returns a collection of resource conflict objects associated with the resource assignment for an I/O function and a SetResourceConflicts( ) method writes the resource conflicts associated with the resource assignment for an I/O function into the IOFunctionResourceUsage object. These functions have the form:

void GetResourceConflicts
  (TCollectionOf<TIOResourceConflict>& conflicts) const; and void SetResourceConflicts (const
  TCollectionOf<TIOResourceConflict>& conflicts);

A GetAssignmentPeriod( ) method returns a resource assignment period for a particular resource assignment and returns a first value (kThisBoot) if the resource assignment is valid for the current boot period and a second different value (kNextBoot) if the resource assignment is valid only for the next boot period. A SetAssignmentPeriod( ) writes the resource assignment period for the assignment into the IOFunctionResourceUsage Object. These functions have the following form:

EAssignmentPeriod GetAssignmentPeriod( ) const; and
void SetAssignmentPeriod (const EAssignmentPeriod period);

The TIOResourceConflictResolver class 1100 further includes ProduceConflictFreeAssignments method which produces a conflict-free resource assignment for the I/O functions on the motherboard and expansion cards in the system for a specified boot period. A boot period parameter takes on a value which indicates to the conflict resolver object whether the conflict resolve object should produce the resource assignment for this boot period (kThisBoot) or subsequent boot period (kNextBoot). A ProduceConflictFreeAssignments method of the TIOResourceConflictResolver class 1100 generates IOFunctionResourceAssignment objects for all I/O functions currently without resource assignments. If there are any conflicts in resource assignments, the ProduceConflictFreeAssignments( ) method creates an IOResourceConflict object. If any conflict in resource assignments is encountered while attempting to generate resource assignments, the ProduceConflictFreeAssignments( ) method throws an exception, but does not change any existing resource assignments.

Conflict Free Resource Assignment Methods

The operation of the ProduceConflictFreeAssignments( ) method is described in detail with reference to flowcharts 12, 13 and 14A, 14B. FIG. 12 is a flowchart which shows an illustrative routine for generating a set of conflict free resource assignments. The routine starts in the step 1200 and proceeds to step 1202 where a collection of all of the functions on the expansion cards in the system is created from the IOCardResourceUsage objects which have been registered with the conflict resolver object as previously described. In this step, the routine iterates through the IOCardResourceUsage objects and extracts all IOFunctionResourceUsage objects and places them into an array.

Next, in step 1204, limit counts are set for memory assignments, I/O register assignments, DMA Channel assignments and interrupt socket assignments. These limit counts are obtained from the appropriate memory, register, DMA and interrupt constraint objects which are nested in the PossibleIOResourceAssignment objects. These limits are used during the next step (1206) to determine when all resource combinations have been tried so that the conflict resolver can decide when a conflict resource allocation cannot be made.

Next in step 1206, the function collection created in step 1202 is examined and possible resource allocations are built using the PossibleIOResourceAssignment objects and their nested IOMemoryConstraint, IORegisterConstraint, DMAConstraint and InterruptConstraint objects. The set of possible assignments is then checked by looping through each function using the IOFunctionResourceUsage objects to determine whether that assignment conflicts with any other assignments. If a conflict is found, as indicated in step 1208, then a check is made to determine whether additional resource combinations remain to be tried as set forth in step 1210. If there are additional resource combinations that have not been tried, the routine returns to step 1206 where new possible resource assignments are constructed and tried.

If, in step 1210, there are no further untried resource combinations, then the routine proceeds to step 1214 and creates a conflict object and throws an exception indicating that a conflict free resource allocation cannot be achieved. In a preferred routine, the conflict object is generated the first time a conflict is detected. However, even though a conflict has been detected, the routine continues to try additional resource combinations until all resource combinations have been tried. If a conflict free resource allocation cannot be obtained, than the originally-created conflict object is returned to the user so that the user can determine why the conflict occurred and how to remove it. The routine then finishes in step 1216.

Alternatively, if in step 1208, no conflict is found with a particular resource allocation, then the routine proceeds to step 1212 where the IOResourceCardUsage objects are updated using the new resource allocations. The routine then finishes in step 1216.

FIG. 13 is an illustrative flowchart indicating a routine for creating a function collection array from the TIOCardResourceUsage objects as set forth in step 1202. In particular, in step 1302, two arrays are created to hold the function collections. These are designated as boot and non-boot arrays. The boot array holds the functions which are essential for the current boot operation whereas the non-boot array holds functions that are not essential for the current boot operation (for example, functions that are used on a subsequent boot.)

At step 1304, the routine loops through a deque containing the TIOCardResourceUsage objects and inserts pointers to essential functions into the boot array. Next in step 1306, the routine loops through the IOCardResourceUsage objects and inserts function pointers to the non-essential functions into the non boot array. In step 1308, the boot and non boot arrays are urged to form a sorted function collection.

Next, in step 1310, the possible IOResourceAssignment objects for each of the functions are retrieved to build a deque of possible resource assignments for each function. The routine then finishes in step 1312. A code fragment which illustrates an actual routine for performing this routine is as follows:

```
void TIOResourceConflictResolver::CreateFunctionCollectionFromCards()
{
    TDequeOf<TIOFunctionResourceUsage>           functionDeque;
    TIOFunctionResourceUsage                     *function;
    TSequenceOfIterator<TIOFunctionResourceUsage>  *functionIterator;
    TIOCardResourceUsage                         *card;
    TSequenceOfIterator<TIOCardResourceUsage>    *cardIterator;
    int index, bootIndex = 0, nonBootIndex = 0, indexCollection = 0;
    TArrayOf<TIOFunctionResourceUsage>           functionForBoot,
                                                 functionNonBoot;
    ConflictResolverFunctionIndex                *whichCollection;
    TArrayOf<struct ConflictResolverFunctionIndex>  bootIndexes,
                                                    nonBootIndexes;

cardIterator = fCard.CreateSequenceIterator();
    functionForBoot.SetAutoGrowFlag(TRUE);
    functionNonBoot.SetAutoGrowFlag(TRUE);
    bootIndexes.SetAutoGrowFlag(TRUE);
```

-continued

```
        nonBootIndexes.SetAutoGrowFlag(TRUE);
        for (card = cardIterator->First(); card != NIL; card = cardIterator->Next()) {
            card->GetFunctionResourceUsage(functionDeque);
            functionIterator = functionDeque.CreateSequenceIterator();
            for (function = functionIterator->First(); function != NIL; function =
                        functionIterator->Next()) {
                whichCollection = new struct ConflictResolverFunctionIndex;
                whichCollection->indexPriority = function->GetFunctionPriority();
                whichCollection->indexIntoCollection = indexCollection++;
                if (function->GetFunctionPriority() ==
                        TIOFunctionResourceUsage::kEssentialForBoot) {
                    functionForBoot.AtPut(bootIndex, function);
                    bootIndexes.AtPut(bootIndex, whichCollection);
                    bootIndex++;
                } else {
                    functionNonBoot.AtPut(nonBootIndex, function);
                    nonBootIndexes.AtPut(nonBootIndex, whichCollection);
                    nonBootIndex++;
                }
            }
            delete functionIterator;
            functionDeque.RemoveAll();
        }
        fFunctionCount = bootIndex + nonBootIndex;
        fFunctions = new Function PossibleAssignment[fFunctionCount];
        //
        // Merge Boot and Non-Boot function collection into one as a sorted collection
        //
        indexCollection = 0;
        for (index = 0; index <bootIndex; index++) {
            BuildFunctionPossible(fFunctions[indexCollection],
 *functionForBoot.At(index), *bootIndexes.At(index));
            indexCollection++;
        }
        for (index = 0; index <nonBootIndex; index++) {
            BuildFunctionPossible(fFunctions[indexCollection],
                *functionNonBoot.At(index), *nonBootIndexes.At(index));
            indexCollection++;
        }
        functionForBoot.DeleteAll();
        functionNonBoot.DeleteAll();
        bootIndexes.DeleteAll();
        nonBootIndexes.DeleteAll();
        delete cardIterator;
        return;
}
void TIOResourceConflictResolver::BuildFunctionPossible(
        TIOResourceConflictResolverDoer::FunctionPossibleAssignment & function,
        TIOFunctionResourceUsage & functionUsage,
        ConflictResolverFunctionIndex & index)
{
        TIOFunctionResourceAssignment                           assignment;
        TSequenceOfIterator<TPossibleIOResourceAssignment>      *iterator;
        TDequeOf<TPossibleIOResourceAssignment>                 possibleDeque;
        TPossibleIOResourceAssignment                           *possible;
        int     maxRegisterCount = 0, maxMemoryCount = 0, maxInterruptCount = 0,
                        maxDMACount = 0;
        functionUsage.GetAssignmentConstraints(possibleDeque);
        if (possibleDeque.Count() == 0)
            functionUsage.GetPossibleAssignments(possibleDeque);
            function.fPossibleCount = possibleDeque.Count();
            iterator = possibleDeque.CreateSequenceIterator();
            function.fPossibles = new PossibleResources[function.fPossibleCount];
            possible = iterator->First();
            for (int i = 0; i < function.fPossibleCount; i++, possible = iterator->Next()) {
                CreateMemoryPossible(function.fPossibles[i], *possible,
                                maxMemoryCount);
                CreateRegisterPossible(function.fPossibles[i], *possible,
                                maxRegisterCount);
                CreateDMAPossible(function.fPossibles[i], *possible, maxDMACount);
                CreateInterruptPossible(function.fPossibles[i], *possible,
                                maxInterruptCount);
            }
        if (maxMemoryCount) {
            function.fMemoryBaseAddresses = new
                TPossibleIOResourceAssignment::TIOMemoryConstraint::
                BaseAddress[maxMemoryCount];
            function.fMemoryUseBoolean = new Boolean[maxMemoryCount];
        } else {
```

```
        function.fMemoryBaseAddresses = NIL;
        function.fMemoryUseBoolean = NIL;
}
if (maxRegisterCount)
    function.fRegisterBaseAddresses = new
        TPossibleIOResourceAssignment::TIORegisterConstraint::
        BaseAddress[maxRegisterCount];
else
    function.fRegisterBaseAddresses = NIL;
if (maxDMACount)
    function.fDMAChannelNumbers = new
        TDMAChannelInformation::DMAChannelNumber
        [maxDMACount];
else
    function.fDMAChannelNumbers = NIL;
if (maxInterruptCount)
    function.fInterruptSocketNumbers = new
        InterruptSocketNumber[maxInterruptCount];
else function.fInterruptSocketNumbers = NIL;
delete iterator;
possibleDeque.DeleteAll();
function.fConflicts = NIL;
function.fConstructedAssignment = NIL;
function.fHaveAssignment = FALSE;
function.fMemoryCount = 0;
function.fRegisterCount = 0;
function.fInterruptCount = 0;
function.fDMACount = 0;
function.fFunctionIndex = index.indexIntoCollection;
function.fFunctionIdentifier = functionUsage.CopyFunctionIdentifier();
//
// A constructed assignment is not created if the Resolve Period is
// for the Next Boot, OR if there is no existing assignment.
//
if (fResolvePeriod == TIOFunctionResourceUsage::kNextBoot ||
    functionUsage.GetAssignment(assignment) ==
        TIOFunctionResourceUsage::kNotAssigned) {
    //
    // Construct Assignments
    //
    if (maxInterruptCount)
        function.fInterruptAssignments = new
            InterruptAssignment[maxInterruptCount];
    else function.fInterruptAssignments = NIL;
    if (maxDMACount)
        function.fDMAAssignments = new
            DMAAssignment[maxDMACount];
    else function.fDMAAssignments = NIL;
    if (maxMemoryCount)
        function.fMemoryAssignments = new
            MemoryAssignment[maxMemoryCount];
    else function.fMemoryAssignments = NIL;
    if (maxRegisterCount)
        function.fRegisterAssignments = new
            RegisterAssignment[maxRegisterCount];
    else function.fRegisterAssignments = NIL;
    return;
}
function.fHaveAssignment = TRUE;
TDequeOf<TIOFunctionResourceAssignment::TIOMemoryAssignment>
        memoryDeque;
TIOFunctionResourceAssignment::TIOMemoryAssignment
        *memory;
TDequeOf<TIOFunctionResourceAssignment::TIORegisterAssignment>
        registerDeque;
TIOFunctionResourceAssignment::TIORegisterAssignment *io;
TDequeOf<TIOFunctionResourceAssignment::TDMAAssignment> dmaDeque;
TIOFunctionResourceAssignment::TDMAAssignment      *dma;
TDequeOf<TIOFunctionResourceAssignment::TInterruptAssignment>
        interruptDeque;
TIOFunctionResourceAssignment::TInterruptAssignment     *interrupt;
assignment.GetMemoryAssignment(memoryDeque);
if (memoryDeque.Count()) {
    TDequeOfIterator<TIOFunctionResourceAssignment::
        TIOMemoryAssignment> memoryIterator(&memoryDeque);
        MemoryAssignment        *memoryAssignment;
        function.fMemoryCount = memoryDeque.Count();
        function.fMemoryAssignments = memoryAssignment = new
            MemoryAssignment[function.fMemoryCount];
```

```
            for (memory = memoryIterator.First(); memory; memory =
                    memoryIterator.Next(), memoryAssignment++) {
                memoryAssignment->fCanShare = memory->IsSharable();
                memoryAssignment->fBaseAddress =
                            memory->GetBaseAddress();
                memoryAssignment->fLength = memory->GetLength();
            }
        }
        assignment.GetIOAssignment(registerDeque);
        if (registerDeque.Count()) {
            TDequeOfIterator<TIOFunctionResourceAssignment::
                    TIORegisterAssignment> registerIterator(&registerDeque);
            RegisterAssignment          *registerAssignment;
            function.fRegisterCount = registerDeque.Count();
            function.fRegisterAssignments = registerAssignment = new
                        RegisterAssignment[registerDeque.Count()];
            for (io = registerIterator.First(); io; io= registerIterator.Next(),
                        registerAssignment++) {
                registerAssignment->fCanShare = io->IsSharable();
                registerAssignment->fBaseAddress = io->GetBaseAddress();
                registerAssignment->fLength = io->GetLength();
            }
        }
        assignment.GetDMAAssignment(dmaDeque);
        if ((function.fDMACount = dmaDeque.Count()) != 0) {
            TDequeOfIterator<TIOFunctionResourceAssignment::
                    TDMAAssignment> dmaIterator(&dmaDeque);
            DMAAssignment    *dmaAssignment;
            function.fDMAAssignments = dmaAssignment =
                        new DMAAssignment[function.fDMACount];
            for (dma = dmaIterator.First(); dma; dma = dmaIterator.Next(),
                        dmaAssignment++) {
                dmaAssignment->fCanShare = dma->IsSharable();
                dmaAssignment->fDMAChannel = dma->GetChannelNumber();
            }
        }
        assignment.GetInterruptAssignment(interruptDeque);
        if ((function.fInterruptCount = interruptDeque.Count()) != 0) {
            TDequeOfIterator<TIOFunctionResourceAssignment::
            TInterruptAssignment> interruptIterator(&interruptDeque);
            InterruptAssignment        *interruptAssignment;
            function.fInterruptAssignments = interruptAssignment
                        = new InterruptAssignment[function.fInterruptCount];
            for (interrupt = interruptIterator.First(); interrupt; interrupt =
                        interruptIterator.Next(), interruptAssignment++) {
                interruptAssignment->fCanShare = interrupt->IsSharable();
                interruptAssignment->fInterruptSocket =
                            interrupt->GetInterruptSocket();
            }
        }
    }
}
void TIOResourceConflictResolver::CreateMemoryPossible(
    TIOResourceConflictResolverDoer::PossibleResources & function,
    TPossibleIOResourceAssignment & possible,
    int    & maxCount)
{
TDequeOf<TDequeOf<TPossibleIOResourceAssignment::TIOMemoryConstraint>>
                                                            masterDeque;
TDequeOf<TPossibleIOResourceAssignment::TIOMemoryConstraint>
                                                            *memoryDeque;
TSequenceOfIterator<TPossibleIOResourceAssignment::TIOMemoryConstraint>
                                                            *iterator;
    TSequenceOfIterator<TDequeOf<TPossibleIOResourceAssignment::
                        TIOMemoryConstraint> >        *collectionIterator;
    TPossibleIOResourceAssignment::TIOMemoryConstraint *memory;
    MemoryPossible                                  *memoryResource;
    MemoryCollection                                *memoryCollection;
    possible.GetMemoryConstraints(masterDeque);
    if ((function.fMemoryCollectionCount = masterDeque.Count()) == 0) {
        function.fMemoryPossible = NIL;
        return;
    }
    memoryCollection = function.fMemoryPossible = new
                MemoryCollection[function.fMemoryCollectionCount];
    collectionIterator = masterDeque.CreateSequenceIterator();
    for (memoryDeque = collectionIterator->First(); memoryDeque; memoryDeque =
                    collectionIterator->Next(), memoryCollection++) {
        iterator = memoryDeque->CreateSequenceIterator();
        memoryCollection->fMemoryCount = memoryDeque->Count();
```

-continued

```
            if (memoryCollection->fMemoryCount> maxCount)
                maxCount = memoryCollection->fMemoryCount;
            memoryResource = memoryCollection->fMemoryPossible =
                    new MemoryPossible[memoryCollection->fMemoryCount];
            for (memory = iterator->First(); memory; memory = iterator->Next(),
                                    memoryResource++) {
                memoryResource->fLowerBaseAddress =
                                        memory->GetLowerBaseAddress();
                memoryResource->fUpperBaseAddress =
                                        memory->GetUpperBaseAddress();
                memoryResource->fLength = memory->GetLength();
                memoryResource->fIncrement = memory->GetBaseIncrement();
                memoryResource->fConstraint =
                                        memory->GetConstraintNumber();
                memoryResource->fCanShare = memory->IsSharable();
memory->GetMemoryUsageMode(memoryResource>fMemoryMode);
            }
            delete iterator;
        }
        delete collectionIterator;
        ::DeepDelete(masterDeque);
}
void TIOResourceConflictResolver::CreateRegisterPossible(
        TIOResourceConflictResolverDoer::PossibleResources&    function,
        TPossibleIOResourceAssignment&                         possible,
        int&  maxCount)
{
TDequeOf<TDequeOf<TPossibleIOResourceAssignment::TIORegisterConstraint> >
                                                             masterDeque;
        TDequeOf<TPossibleIOResourceAssignment::TIORegisterConstraint>
                                                             *registerDeque;
        TSequenceOfIterator<TDequeOf<TPossibleIOResourceAssignment::
                        TIORegisterConstraint> >             *collectionIterator;
        TSequenceOfIterator<TPossibleIOResourceAssignment::
                        TIORegisterConstraint>               *iterator;
        TPossibleIOResourceAssignment::TIORegisterConstraint *io;
        RegisterPossible                                     *registerResource;
        RegisterCollection                                   *registerCollection;
        possible.GetIOConstraints(masterDeque);
        if ((function.fRegisterCollectionCount = masterDeque.Count()) == 0) {
            function.fRegisterPossible = NIL;
            return;
        }
        collectionIterator = masterDeque.CreateSequenceIterator();
        registerCollection = function.fRegisterPossible = new
                        RegisterCollection[function.fRegisterCollectionCount];
        for (registerDeque = collectionIterator->First(); registerDeque;
                registerDeque = collectionIterator->Next(), registerCollection++) {
            registerCollection->fRegisterCount = registerDeque->Count();
            registerResource = registerCollection->fRegisterPossible = new
                        RegisterPossible[registerCollection->fRegisterCount];
            if (registerCollection->fRegisterCount> maxCount)
                maxCount = registerCollection->fRegisterCount;
            iterator = registerDeque->CreateSequenceIterator();
            for (io = iterator->First(); io; io = iterator->Next(), registerResource++) {
                registerResource->fLowerBaseAddress =
                        io->GetLowerBaseAddress();
                registerResource->fUpperBaseAddress =
                        io->GetUpperBaseAddress();
                registerResource->fLength = io->GetLength();
                registerResource->fIncrement = io->GetBaseIncrement();
                registerResource->fConstraint = io->GetConstraintNumber();
                registerResource->fCanShare = io->IsSharable();
                io->GetRegisterUsageMode(registerResource->fRegisterMode);
            }
            delete iterator;
        }
        delete collectionIterator;
        ::DeepDelete(masterDeque);
}
void TIOResourceConflictResolverDoer::CreateDMAPossible(
            TIOResourceConflictResolverDoer::PossibleResources & function,
            TPossibleIOResourceAssignment & possible,
            int&   maxCount)
{
        TDequeOf<TDequeOf<TPossibleIOResourceAssignment::TDMAConstraint> >
                                                             masterDeque;
        TDequeOf<TPossibleIOResourceAssignment::TDMAConstraint>*dmaDeque;
        TSequenceOfIterator<TDequeOf<TPossibleIOResourceAssignment::
```

```
                    TDMAConstraint> >            *collectionIterator;
    TSequenceOfIterator<TPossibleIOResourceAssignment::TDMAConstraint>
                                                 *iterator;
    TPossibleIOResourceAssignment::TDMAConstraint *dma;
    DMAPossible                                  *dmaResource;
    DMACollection                                *dmaCollection;
    possible.GetDMAConstraints(masterDeque);
    if ((function.fDMACollectionCount = masterDeque.Count()) == 0) {
        function.fDMAPossible = NIL;
        return;
    }
    dmaCollection = function.fDMAPossible = new
                    DMACollection[function.fDMACollectionCount];
    collectionIterator = masterDeque.CreateSequenceIterator();
    for (dmaDeque = collectionIterator->First(); dmaDeque; dmaDeque =
                    collectionIterator->Next(), dmaCollection++) {
        dmaCollection->fDMACount = dmaDeque->Count();
        dmaResource = dmaCollection->fDMAPossible = new
                    DMAPossible[dmaCollection->fDMACount];
        if (dmaCollection->fDMACount> maxCount)
            maxCount = dmaCollection->fDMACount;
        iterator = dmaDeque->CreateSequenceIterator();
        for (dma = iterator->First(); dma; dma = iterator->Next(), dmaResource++)
{
            dmaResource->fLowerDMAChannel =
                    dma->GetLowerChannelNumber();
            dmaResource->fUpperDMAChannel =
                    dma->GetUpperChannelNumber();
            dmaResource->fConstraint = dma->GetConstraintNumber();
            dmaResource->fCanShare = dma->IsSharable();
            dma->GetDMAUsageMode(dmaResource->fDMAMode);
        }
        delete iterator;
    }
    ::DeepDelete(masterDeque);
    delete collectionIterator;
}
void TIOResourceConflictResolverDoer::CreateInterruptPossible(
    TIOResourceConflictResolverDoer::PossibleResources & function,
    TPossibleIOResourceAssignment & possible,
    int&        maxCount)
{
    TDequeOf<TDequeOf<TPossibleIOResourceAssignment::
                    TInterruptConstraint> >           masterDeque;
    TDequeOf<TPossibleIOResourceAssignment::
                    TInterruptConstraint>*interruptDeque;
    TSequenceOfIterator<TDequeOf<TPossibleIOResourceAssignment::
                    TInterruptConstraint> >           *collectionIterator;
    TSequenceOfIterator<TPossibleIOResourceAssignment::TInterruptConstraint>
                                                 *iterator;
    TPossibleIOResourceAssignment::TInterruptConstraint *interrupt;
    InterruptPossible    *interruptResource;
    InterruptCollection  *interruptCollection;
    possible.GetInterruptConstraints(masterDeque);
    if ((function.fInterruptCollectionCount = masterDeque.Count()) == 0) {
        function.fInterruptPossible = NIL;
        return;
    }
    function.fInterruptPossible = interruptCollection = new
                    InterruptCollection[function.fInterruptCollectionCount];
    collectionIterator = masterDeque.CreateSequenceIterator();
    for (interruptDeque = collectionIterator->First(); interruptDeque;
            interruptDeque = collectionIterator->Next(), interruptCollection++) {
        interruptCollection->fInterruptCount = interruptDeque->Count();
        if (interruptCollection->fInterruptCount> maxCount)
            maxCount = interruptCollection->fInterruptCount;
            interruptResource = interruptCollection->fInterruptPossible = new
                InterruptPossible[interruptCollection->fInterruptCount];
            iterator = interruptDeque->CreateSequenceIterator();
        for (interrupt = iterator->First(); interrupt; interrupt = iterator->Next(),
                    interruptResource++) {
            interruptResource->fLowerInterruptSocket =
                interrupt->GetLowerInterruptSocket();
            interruptResource->fUpperInterruptSocket =
                interrupt->GetUpperInterruptSocket();
            interruptResource->fConstraint =
                interrupt->GetConstraintNumber();
            interruptResource->fCanShare = interrupt->IsSharable();
        interrupt->GetInterruptUsageMode(
```

```
                interruptResource->fInterruptMode);
        }
        delete iterator;
    }
    delete collectionIterator;
    ::DeepDelete(masterDeque);
}
```

Figure 14A:
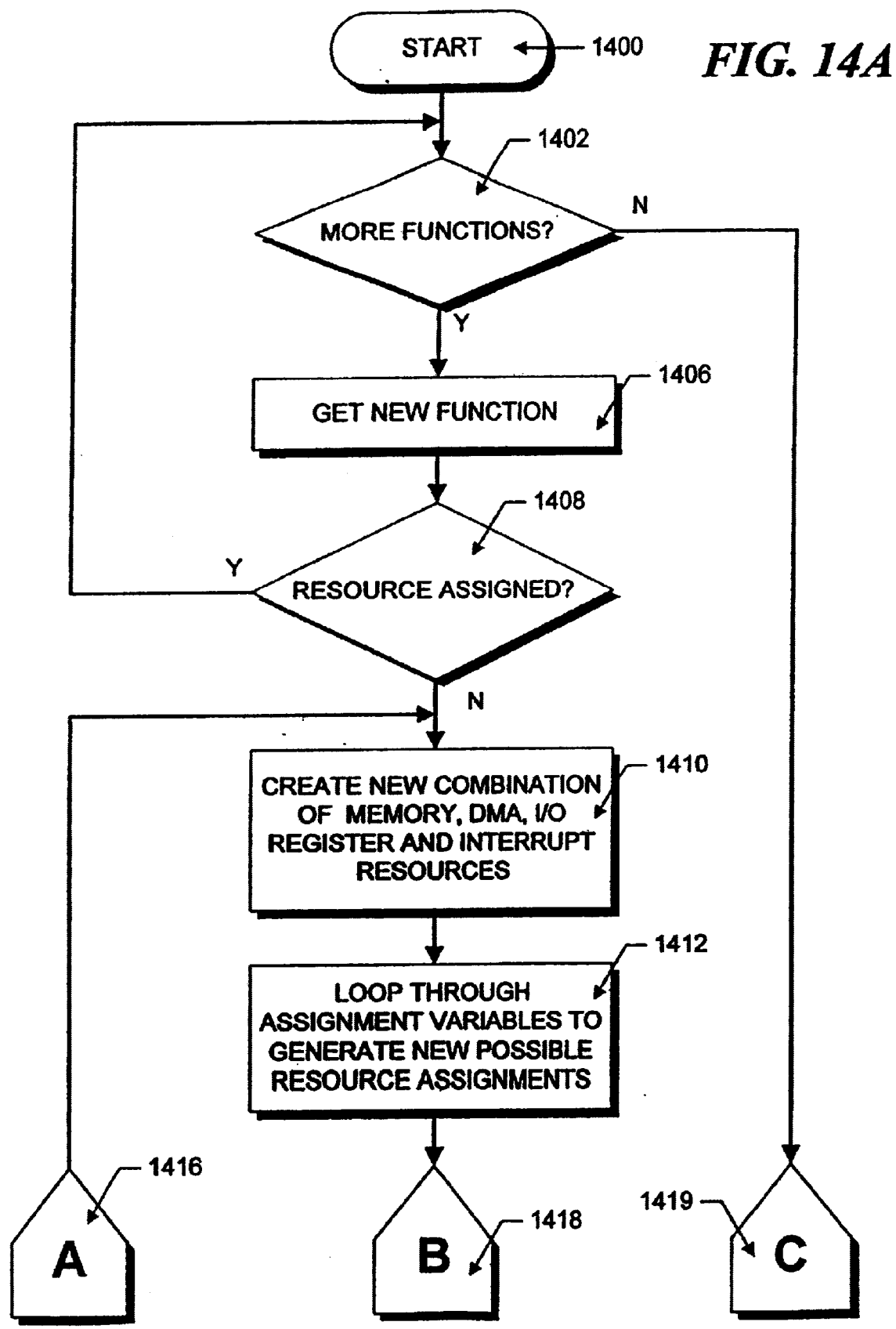
FIGS. 14A and 14B, when placed together form an illustrative flowchart showing the method by which conflicts are resolved.
Figure 14B:
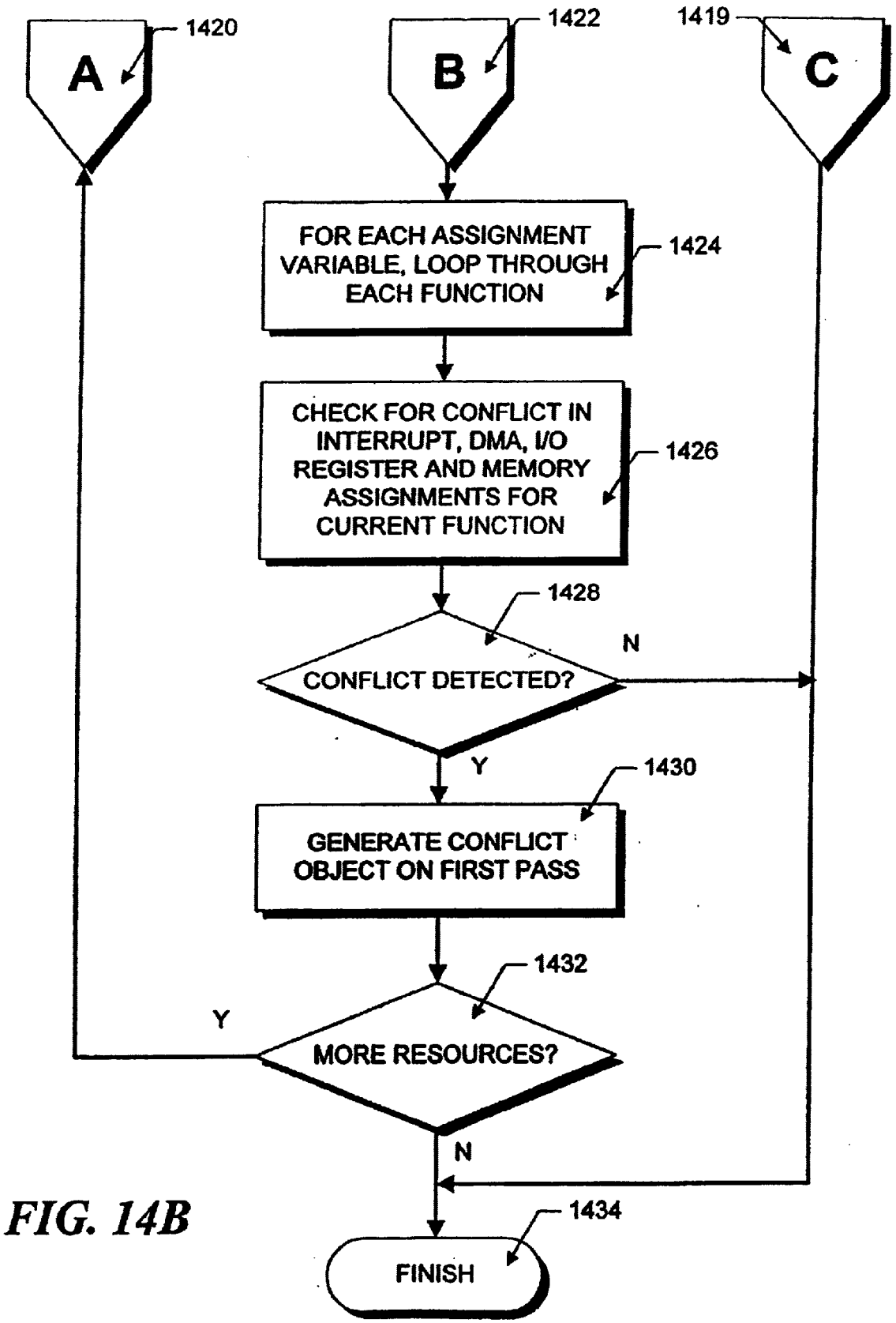

FIGS. 14A and 14B, when placed together, form a flowchart that illustrates a routine which loops through the functions and checks for conflicts as set forth in step 1206. This routine starts in step 1400 and proceeds to step 1402, where is determined whether any additional functions remain for which resources must be assigned. If not, the routine proceeds, via off-page connectors 1419 and 1421, to finish in step 1434. If more functions remain, the routine proceeds to step 1406 where a new function is obtained from the function collection assembled by the routine shown in FIG. 13. The function is checked to see whether resources have already been assigned. If they have, the routine proceeds back to step 1402 to check for additional functions. If not, the routine proceeds to step 1410 where a new combination of memory, DMA, I/O Register and Interrupt resources is created.

Next, the routine proceeds to step 1412, where it loops through assignment variables to generate new possible resource assignments. The routine then proceeds via off-page connectors 1418 and 1422 to step 1424 where, for each assignment variable, each function is looped through to check for conflicts. In step 1426, the routine checks for conflicts in the Interrupt, DMA, I/O register and memory assignments for the current functions.

If a conflict is not detected in step 1428, then the routine finishes in step 1434. Alternatively, if a conflict is detected, the routine proceeds to step 1430 where a conflict object is generated on the first "pass through the loop" as described previously. Next, in step 1432, a check is made to determine whether there are any additional resources that can be assigned. If so, the routine proceeds via off-page connectors 1420 and 1416 back to step 1410 where a new combination of resources is created and the process is repeated.

Alternatively, if in step 1432, there are no more resources to be assigned, the routine finishes in step 1434. As previously mentioned, if a conflict object has been generated, an exception will be thrown to alert the user of the conflict situation. An illustrative code fragment which performs the steps shown in FIGS. 14A and 14B is as follows:

```
Boolean TIOResourceConflictResolver::LoopThroughFunction (
            int currentIndex)
{
    FunctionPossibleAssignment       *thisFunction;
    if (currentIndex >= fFunctionCount)
        return      FALSE;
    thisFunction = &fFunctions[currentIndex];
    //
    // If the function already has an assignment, then skip it.
    //
    if (thisFunction->fHaveAssignment == TRUE) {
        currentIndex++;
        if (currentIndex < fFunctionCount)
            return      LoopThroughFunction(currentIndex);
        else
            return      FALSE;
    } else {
        PossibleResources       *thisPossible;
        int                     possibleIndex;
        thisPossible = thisFunction->fPossibles;
        for (possibleIndex = 0; possibleIndex < thisFunction->fPossibleCount;
                    possibleIndex++, thisPossible++) {
            if (LoopThroughPossibleResources(*thisPossible, *thisFunction,
                        currentIndex)) {
                fFirstPass = FALSE;
            } else {
                return FALSE;
            }
        }
        return      TRUE;
    }
}
Boolean TIOResourceConflictResolver::LoopThroughPossibleResources(
        TIOResourceConflictResolver::PossibleResources & thisPossible,
        TIOResourceConflictResolver::FunctionPossibleAssignment & thisFunction,
        int         currentIndex)
{
    MemoryCollection        *memoryItem;
    RegisterCollection      *registerItem;
    InterruptCollection     *interruptItem;
```

-continued

```
        DMACollection           *dmaItem;
        int                     memoryIndex, registerIndex, interruptIndex, dmaIndex;
        Boolean                 interruptLooppedOnce, dmaLooppedOnce,
                                    registerLooppedOnce, memoryLooppedOnce;
    //
    // The program has make at least one iteration at each resource,
    // even if the thisPossible does not use a
    // particular hardware resource. If a resource is not to be used,
    // then it's skipped - But the other resources (used or not)
    // are looped through.
    //
    interruptItem = thisPossible.fInterruptPossible;
    interruptLooppedOnce = FALSE;
    interruptIndex = 0;
    while(interruptIndex < thisPossible.fInterruptCollectionCount ||
                    interruptLooppedOnce == FALSE) {
        interruptLooppedOnce = TRUE;
        interruptIndex++;
        dmaItem = thisPossible.fDMAPossible;
        dmaLooppedOnce = FALSE;
        dmaIndex = 0;
        while (dmaIndex < thisPossible.fDMACollectionCount ||
                    dmaLooppedOnce == FALSE) {
            dmaLooppedOnce = TRUE;
            dmaIndex++;
            registerItem = thisPossible.fRegisterPossible;
            registerLooppedOnce = FALSE;
            registerIndex = 0
            while (registerIndex < thisPossible.fRegisterCollectionCount ||
                    registerLooppedOnce == FALSE) {
                registerIndex++;
                registerLooppedOnce = TRUE;
                memoryItem = thisPossible.fMemoryPossible;
                memoryLooppedOnce = FALSE;
                memoryIndex = 0;
                while (memoryIndex < thisPossible.fMemoryCollectionCount
                        || memoryLooppedOnce == FALSE) {
                    memoryLooppedOnce = TRUE;
                    memoryIndex++;
                    if (LoopThroughAssignmentVariables(
                            thisPossible, thisFunction,
                            currentIndex, interruptItem, dmaItem,
                            registerItem,
                            memoryItem) == FALSE) {
                        ConstructNewAssignment(thisFunction,
                            interruptItem, dmaItem, registerItem,
                            memoryItem);
                        return FALSE;
                    }
                    fFirstPass = FALSE;
                    if (memoryItem)
                        memoryItem++;
                }
                if (registerItem)
                    registerItem++;
            }
            if (dmaItem)
                dmaItem++;
        }
        if (interruptItem)
            interruptItem++;
    }
    thisFunction.fHaveAssignment = FALSE;
    return      TRUE;
}
Boolean TIOResourceConflictResolverDoer::LoopThroughAssignmentVariables (
    TIOResourceConflictResolverDoer::PossibleResources & thisPossible,
    TIOResourceConflictResolverDoer:FunctionPossibleAssignment & thisFunction,
    int currentIndex,
    TIOResourceConflictResolverDoer::InterruptCollection    *interruptItem,
    TIOResourceConflictResolverDoer::DMACollection          *dmaItem
    TIOResourceConflictResolverDoer::RegisterCollection     *registerItem,
    TIOResourceConflictResolverDoer::MemoryCollection       *memoryItem)
{
    InterruptSocketNumber                           *interruptCurrent;
    TDMAChannelInformation::DMAChannelNumber        *dmaCurrent;
    TPossibleIOResourceAssignment::TIORegisterConstraint:BaseAddress
                                                    *lowerIOAddress;
    TPossibleIOResourceAssignment::TIOMemoryConstraint::BaseAddress
```

-continued

```
Boolean                                      *lowerMemAddress;
                                             *useMemoryItem;
InterruptAssignment                          *interruptAssignment;
MemoryAssignment                             *memoryAssignment;
RegisterAssignment                           *registerAssignment;
DMAAssignment                                *dmaAssignment;
int i;
//RemoveConstructedAssignments(thisFunction);
thisFunction.fMemoryCount = 0;
thisFunction.fRegisterCount = 0;
thisFunction.fDMACount = 0;
thisFunction.fInterruptCount = 0;
thisFunction.fHaveAssignment = TRUE;
//
// Loop Through Each of the Variables Assignments
//
if (interruptItem) {
    interruptAssignment = thisFunction.fInterruptAssignments;
    thisFunction.fInterruptCount = interruptItem->fInterruptCount;
    interruptCurrent = thisFunction.fInterruptSocketNumbers;
    for (i = 0; i < thisFunction.fInterruptCount; i++) {
                interruptAssignment->fCanShare =
                interruptItem->fInterruptPossible[i].fCanShare;
        interruptCurrent[i] =
            interruptItem->fInterruptPossible[i].fLowerInterruptSocket;
    }
}
if (dmaItem) {
    dmaAssignment = thisFunction.fDMAAssignments;
    thisFunction.fDMACount = dmaItem->fDMACount;
    dmaCurrent = thisFunction.fDMAChannelNumbers;
    for (i = 0; i < dmaItem->fDMACount; i++) {
        dmaCurrent[i] = dmaItem->fDMAPossible[i].fLowerDMAChannel;
        dmaAssignment[i].fCanShare =
                dmaItem->fDMAPossible[i].fCanShare;
    }
}
if (registerItem) {
    registerAssignment = thisFunction.fRegisterAssignments;
    thisFunction.fRegisterCount = registerItem->fRegisterCount;
    lowerIOAddress = thisFunction.fRegisterBaseAddresses;
    for (i = 0; i < registerItem->fRegisterCount; i++) {
        registerAssignment[i].fCanShare =
            registerItem->fRegisterPossible[i].fCanShare;
        registerAssignment[i].fLength =
            registerItem->fRegisterPossible[i].fLength;
        lowerIOAddress[i] =
            registerItem->fRegisterPossible[i].fLowerBaseAddress;
    }
}
if (memoryItem) {
    memoryAssignment = thisFunction.fMemoryAssignments;
    thisFunction.fMemoryCount = memoryItem->fMemoryCount;
    useMemoryItem = thisFunction.fMemoryUseBoolean;
    lowerMemAddress = thisFunction.fMemoryBaseAddresses;
    for (i = 0; i <memoryItem->fMemoryCount; i++) {
        if (memoryItem->fMemoryPossible[i].fMemoryMode.
            GetMemoryType() == TIOMemoryReference::kCardMemory)
        {
            useMemoryItem[i]= TRUE;
            memoryAssignment[i].fCanShare =
                    memoryItem->fMemoryPossible[i].fCanShare;
            memoryAssignment[i].fLength =
                    memoryItem->fMemoryPossible[i].fLength;
            lowerMemAddress[i] =
            memoryItem->fMemoryPossible[i].fLowerBaseAddress;
            memoryAssignment[i].fIsCardMemory = TRUE;
        } else {
            useMemoryItem[i] = FALSE;
            memoryAssignment[i].fIsCardMemory = FALSE;
        }
    }
}
for (Boolean processInterrupt = TRUE; processInterrupt;) {
    if (interruptItem) {
        for (i = 0; i < interruptItem->fInterruptCount; i++) {
            interruptAssignment[i].fInterruptSocket = interruptCurrent[i];
        }
    }
```

-continued

```
if (dmaItem) {
    for (i = 0; i < dmaItem->fDMACount; i++)
        dmaCurrent[i] =
            dmaItem->fDMAPossible[i].fLowerDMAChannel;
}
for (Boolean processDMA = TRUE; processDMA;) {
    if (dmaItem) {
        for (i = 0; i < dmaItem->fDMACount; i++) {
            dmaAssignment[i].fDMAChannel = dmaCurrent[i];
        }
    }
    if (registerItem) {
        for (i = 0; i < registerItem->fRegisterCount; i++)
            lowerIOAddress[i] =
                registerItem->fRegisterPossible[i].
                fLowerBaseAddress;
    }
    for (Boolean processRegister = TRUE; processRegister;) {
        if (registerItem) {
            for (i = 0; i < registerItem->fRegisterCount; i++) {
                registerAssignment[i].fBaseAddress =
                lowerIOAddress[i];
            }
        }
        //
        // Only look at memory if there is item, AND the item
        // represents actual card memory (as opposed to a card with
        //no on-board memory that uses Host Memory
        // for I/O)
        //
        if (memoryItem) {
            for (i = 0; i < memoryItem->fMemoryCount; i++)
                if (useMemoryItem[i])
                    lowerMemAddress[i] =
            memoryItem->fMemoryPossible[i].fLowerBaseAddress;
        }
        for (Boolean processMemory = TRUE; processMemory;) {
            if (memoryItem) {
                for (i = 0; i < memoryItem->fMemoryCount;
                            i++)
                    if (useMemoryItem[i]) {
                    memoryAssignment[i].fBaseAddress =
                        lowerMemAddress[i];
                    }
            }
            if (IsAssignmentWithinPlatformLimits(thisFunction)) {
                if (CheckAssignmentForConflict(thisFunction,
                    currentIndex) == FALSE) {
                    return        FALSE;
                }
            }
            fFirstPass = FALSE;
            if (memoryItem == NIL)
                break;
            for (i = 0; i < memoryItem->fMemoryCount; i++) {
                lowerMemAddress[i] +=
                memoryItem->fMemoryPossible[i].fIncrement;
                if (useMemoryItem[i]) {
                    if (lowerMemAddress[i] >
                memoryItem->fMemoryPossible[i].
                            fUpperBaseAddress) {
                        processMemory = FALSE;
                        break;
                    } else processMemory = TRUE;
                }
            }
        }
        if (registerItem == NIL)
            break;
        for (i = 0; i <registerItem->fRegisterCount; i++) {
            lowerIOAddress[i] +=
                registerItem->fRegisterPossible[i].fIncrement;
            if (lowerIOAddress[i] >
            registerItem->fRegisterPossible[i].
                    fUpperBaseAddress) {
                processRegister = FALSE;
                break;
            } else processRegister = TRUE;
        }
```

```
                    }
                    if (dmaItem == NIL)
                        break;
                    for (i = 0; i <dmaItem->fDMACount; i++) {
                        dmaCurrent[i]++;
                        if (dmaCurrent[i] >
                            dmaItem->fDMAPossible[i].fUpperDMAChannel) {
                                processDMA = FALSE;
                                break;
                        } else processDMA = TRUE;
                    }
                }
                if (interruptItem == NIL)
                    break;
                for (i = 0; i < interruptItem->fInterruptCount; i++) {
                    interruptCurrent[i]++;
                    if (interruptCurrent[i] >
                        interruptItem->fInterruptPossible[i].fUpperInterruptSocket) {
                            processInterrupt = FALSE;
                            break;
                    } else processInterrupt = TRUE;
                }
            }
        }
        thisFunction.fHaveAssignment = FALSE;
        return TRUE;
}
Boolean TIOResourceConflictResolver::CheckAssignmentForConflict (
        TIOResourceConflictResolver::FunctionPossibleAssignment & thisFunction,
        int currentIndex)
{
        FunctionPossibleAssignment      *function;
        Boolean                          doesConflict = FALSE;
        int     i, count;
        //
        // Loop through each function, and check it against the current
        // function. Only those functions with assignments are checked.
        //
        // NOTE - on the first pass through, the Resolver is building
        // a list of conflicts, however, on subsequent passes, the scanning is
        // stopped earily when a conflict is found. This allows an early return
        // back to the previous routines to try another sequence.
        //
        function = &fFunctions[0];
        for (i = 0; i < fFunctionCount; i++, function++) {
            if (i == currentIndex)
                continue;
            if (function->fHaveAssignment == FALSE)
                continue;
            if (CheckMemoryAssignmentConflict(*function, thisFunction)) {
                if (fFirstPass == FALSE)
                    return TRUE;
                doesConflict = TRUE;
            }
            if (CheckRegisterAssignmentConflict(*function, thisFunction)){
                if (fFirstPass == FALSE)
                    return TRUE;
                doesConflict = TRUE;
            }
            if (CheckDMAAssignmentConflict(*function, thisFunction)) {
                if (fFirstPass == FALSE)
                    return TRUE;
                doesConflict = TRUE;
            }
            if (CheckInterruptAssignmentConflict(*function, thisFunction)) {
                if (fFirstPass == FALSE)
                    return TRUE;
                doesConflict = TRUE;
            }
        }
        //
        // Go to the next function, if possible
        //
        currentIndex++;
        if (currentIndex < fFunctionCount) {
            if (LoopThroughFunction(currentIndex) == TRUE)
                return        TRUE;
        }
        return doesConflict;
}
```

-continued

```
Boolean TIOResourceConflictResolver::CheckMemoryAssignmentConflict (
    TIOResourceConflictResolver::FunctionPossibleAssignment & checkFunction,
    TIOResourceConflictResolver::FunctionPossibleAssignment & thisFunction)
{
    TIOFunctionResourceAssignment::TIOMemoryAssignment::BaseAddress
                    thisMemoryAddress, memoryToCheckAddress;
    TIOFunctionResourceAssignment::TIOMemoryAssignment::BlockLength
                    thisMemoryLength, memoryToCheckLength;
    MemoryAssignment   *thisMemory, *checkMemory;
    int                thisIndex, checkIndex;
    if (thisFunction.fMemoryCount == 0 || checkFunction.fMemoryCount == 0)
        return FALSE;
    Boolean         doesConflict = FALSE;
    thisMemory = thisFunction.fMemoryAssignments;
    for (thisIndex = 0; thisIndex < thisFunction.fMemoryCount; thisIndex++,
                    thisMemory++) {
        if (thisMemory->fIsCardMemory == FALSE)
            continue;
        thisMemoryAddress = thisMemory->fBaseAddress;
        thisMemoryLength = thisMemory->fLength;
        checkMemory = checkFunction.fMemoryAssignments;
        for (checkIndex = 0; checkIndex < checkFunction.fMemoryCount;
                checkIndex++, checkMemory++) {
            if (checkMemory->fIsCardMemory == FALSE)
                continue;
            memoryToCheckAddress = checkMemory->fBaseAddress;
            memoryToCheckLength = checkMemory->fLength;
            if (thisMemory->fCanShare == FALSE ||
                    checkMemory->fCanShare == FALSE) {
                if ((thisMemoryAddress >= memoryToCheckAddress
                            && thisMemoryAddress <
                                memoryToCheckAddress+
                                memoryToCheckLength)
                        || (memoryToCheckAddress >=
                                thisMemoryAddress
                            && memoryToCheckAddress <
                                thisMemoryAddress+
                                    thisMemoryLength)) {
                    //
                    // Only Create Conflicts on the first pass
                    //
                    if (fFirstPass)
                        CreateResourceConflict(checkFunction,
                            TIOResourceConflict::kMemoryRange);
                    else return TRUE;
                    doesConflict = TRUE;
                }
            }
        }
    }
    return        doesConflict;
}
Boolean TIOResourceConflictResolver::CheckRegisterAssignmentConflict (
    TIOResourceConflictResolver::FunctionPossibleAssignment & checkFunction,
    TIOResourceConflictResolver::FunctionPossibleAssignment & thisFunction)
{
    TIOFunctionResourceAssignment::TIORegisterAssignment::BaseAddress
                    thisRegisterAddress, registerToCheckAddress;
    TIOFunctionResourceAssignment::TIORegisterAssignment::BlockLength
                    thisRegisterLength, registerToCheckLength;
    RegisterAssignment   *thisRegister, *checkRegister;
    int                  thisIndex, checkIndex;
    if (thisFunction.fRegisterCount == 0 || checkFunction.fRegisterCount == 0)
        return FALSE;
    Boolean         doesConflict = FALSE;
    thisRegister = thisFunction.fRegisterAssignments;
    for (thisIndex = 0; thisIndex < thisFunction.fRegisterCount; thisIndex++,
                        thisRegister++) {
        checkRegister = checkFunction.fRegisterAssignments;
        thisRegisterAddress = thisRegister->fBaseAddress;
        thisRegisterLength = thisRegister->fLength;
        for (checkIndex = 0; checkIndex < checkFunction.fRegisterCount;
                        checkIndex++, checkRegister++) {
            registerToCheckAddress = checkRegister->fBaseAddress;
            registerToCheckLength = checkRegister->fLength;
            if (thisRegister->fCanShare == FALSE ||
                    checkRegister->fCanShare == FALSE) {
                if ((thisRegisterAddress >=
                            registerToCheckAddress
```

-continued

```
                        && thisRegisterAddress <
                    registerToCheckAddress+
                        registerToCheckLength)
                    || (registerToCheckAddress >=
                        thisRegisterAddress
                    && registerToCheckAddress <
                        thisRegisterAddress+
                        thisRegisterLength)) {
                //
                // Only Create Conflicts on the first pass
                //
                if (fFirstPass == FALSE)
                    return      TRUE;
                CreateResourceConflict(checkFunction,
                    TIOResourceConflict::kIORange);
                doesConflict = TRUE;
            }
        }
    }
    return doesConflict;
}
Boolean TIOResourceConflictResolver::CheckDMAAssignmentConflict (
    TIOResourceConflictResolver::FunctionPossibleAssignment & checkFunction,
    TIOResourceConflictResolver::FunctionPossibleAssignment & thisFunction)
{
    Boolean         doesConflict = FALSE;
    int             checkIndex, thisIndex;
    DMAAssignment    *checkDMA, *thisDMA;
    if (checkFunction.fDMACount == 0 || thisFunction.fDMACount == 0)
        return      FALSE;
    thisDMA = thisFunction.fDMAAssignments;
    for (thisIndex = 0; thisIndex < thisFunction.fDMACount; thisIndex++, thisDMA++)
    {
        checkDMA = checkFunction.fDMAAssignments;
        for (checkIndex = 0; checkIndex < checkFunction.fDMACount;
                    checkIndex++, checkDMA++) {
            if (checkDMA->fCanShare == TRUE && thisDMA->fCanShare ==
                        TRUE)
                continue;
            if (thisDMA->fDMAChannel == checkDMA->fDMAChannel) {
                if (fFirstPass == FALSE)
                    return TRUE;
                CreateResourceConflict(checkFunction,
                    TIOResourceConflict::kDMA);
                doesConflict = TRUE;
            }
        }
    }
    return doesConflict;
}
Boolean TIOResourceConflictResolver::CheckInterruptAssignmentConflict(
    TIOResourceConflictResolver::FunctionPossibleAssignment & checkFunction,
    TIOResourceConflictResolver::FunctionPossibleAssignment & thisFunction)
{
    Boolean             doesConflict = FALSE;
    int                 thisIndex, checkIndex;
    InterruptAssignment  *thisInterrupt *checkInterrupt;
    if (checkFunction.fInterruptCount == 0 || thisFunction.fInterruptCount == 0) {
        return FALSE;
    }
    thisInterrupt = thisFunction.fInterruptAssignments;
    for (thisIndex = 0; thisIndex < thisFunction.fInterruptCount; thisIndex++,
                thisInterrupt++) {
        checkinterrupt = checkFunction.fInterruptAssignments;
        for (checkIndex = 0; checkIndex < checkFunction.fInterruptCount;
                checkIndex++, checkInterrupt++) {
            if (thisInterrupt->fCanShare == TRUE &&
                    checkInterrupt->fCanShare == TRUE) {
                continue;
            }
            if (thisInterrupt->fInterruptSocket ==
                    checkInterrupt->fInterruptSocket) {
                if (fFirstPass == FALSE)
                    return      TRUE;
                CreateResourceConflict
                    (checkFunction,
                    IOResourceConflict::kInterrupt);
                doesConflict = TRUE;
```

-continued

```
                }
            }
        }
        return doesConflict;
}
void TIOResourceConflictResolver::CreateResourceConflict (
    TIOResourceConflictResolver::FunctionPossibleAssignment & functionInConflict,
    TIOResourceConflict::EResourceType resourceConflicting)
{
    TIOResourceConflict                    *newResourceInConflict;
    TIOFunctionHardwareInterfaceIdentifier *id =
                   :Copy(functionInConflict.fFunctionIdentifier);
    newResourceInConflict = new TIOResourceConflict;
    newResourceInConflict->SetResourceType(resourceConflicting);
    newResouroeInConflict->SetConflictType(fConflictType);
    newResourceInConflict->SetResourceIndex(0);
    newResourceInConflict->SetFunctionIdentifier(*id);
    if (functionInConflict.fConflicts == NIL)
        functionInConflict.fConflicts = new TDequeOf<TIOResourceConflict>;
        functionInConflict.fConflicts->Add(newResourceInConflict);
}
void TIOResourceConflictResolver::ConstructNewAssignment(
    TIOResourceConflictResolver::FunctionPossibleAssignment & thisFunction,
    TIOResourceConflictResolver::InterruptCollection *interruptItem,
    TIOResourceConflictResolver::DMACollection *dmaItem,
    TIOResourceConflictResolver::RegisterCollection *registerItem,
    TIOResourceConflictResolver::MemoryCollection *memoryItem)
{
    // Construct an assignment
    // based on the current possible, and values
    //
    TIOFunctionResourceAssignment *newAssignment = new
                 TIOFunctionResourceAssignment;
    int i;
    thisFunction.fConstructedAssignment = newAssignment;
    if (interruptItem) {
        TDequeOf<TIOFunctionResourceAssignment::TInterruptAssignment>
                          interruptDeque;
        TIOFunctionResourceAssignment::TInterruptAssignment
                          *interruptAssignment;
        for (i = 0; i < interruptItem->fInterruptCount; i++) {
                 interruptAssignment = new
                     TIOFunctionResourceAssignment::TInterruptAssignment;
                     interruptAssignment->SetSharability(interruptItem->
                         InterruptPossible[i].fCanShare);
                     interruptAssigment->SetInterruptSocket(thisFunction.
                         fInterruptAssignments[i].fInterruptSocket);
                     interruptAssignment->SetInterruptUsageMode(
                         interruptItem->fInterruptPossible[i].fInterruptMode);
                     interruptAssignment->SetConstraintNumber(
                         interruptItem->fInterruptPossible[i].fConstraint);
            interruptDeque.Add(interruptAssignment);
        }
        newAssignment->SetInterruptAssignment(interruptDeque);
        interruptDeque.DeleteAll();
    }
    if (dmaItem) {
        TDequeOf<TIOFunctionResourceAssignment::TDMAAssignment>
                              dmaDeque;
        TIOFunctionResourceAssignment::TDMAAssignment *dmaAssignment;
        for (i = 0; i < dmaItem->fDMACount; i++) {
            dmaAssignment = new
                     TIOFunctionResourceAssignment::TDMAAssignment;
            dmaAssignment->SetSharability(dmaItem->
                     fDMAPossible[i].fCanShare);
            dmaAssignment->SetChannelNumber(thisFunction.
                     fDMAAssignments[i].fDMAChannel);
            dmaAssignment->SetDMAUsageMode(dmaItem->
                     fDMAPossible[i].fDMAMode);
            dmaAssignment->SetConstraintNumber(dmaItem->
                     fDMAPossible[i].fConstraint);
            dmaDeque.Add(dmaAssignment);
        }
        newAssignment->SetDMAAssignment(dmaDeque);
        dmaDeque.DeleteAll();
    }
    if (memoryItem) {
        TDequeOf<TIOFunctionResourceAssignment::TIOMemoryAssignment>
        memoryDeque;
```

-continued

```
            TIOFunctionResourceAssignment::TIOMemoryAssignment
                    *memoryAssignment;
            for (i = 0; i < memoryItem->fMemoryCount; i++) {
                memoryAssignment = new
                    TIOFunctionResourceAssignment::TIOMemoryAssignment;
                memoryAssignment->SetSharability(memoryItem->
                    fMemoryPossible[i].fCanShare);
                memoryAssignment->SetBaseAddress(thisFunction.
                    fMemoryAssignments[i].fBaseAddress);
                memoryAssignment->SetLength(memoryItem->
                    fMemoryPossible[i].fLength);
                memoryAssignment->SetMemoryUsageMode(memoryItem->
                    fMemoryPossible[i].fMemoryMode);
                memoryAssignment->SetConstraintNumber(memoryItem->
                    fMemoryPossible[i].fConstraint);
                memoryDeque.Add(memoryAssignment);
            }
            newAssignment->SetMemoryAssignment(memoryDeque);
            memoryDeque.DeleteAll();
        }
        if (registerItem) {
            TDequeOf<TIOFunctionResourceAssignment::TIORegisterAssignment>
                    registerDeque;
            TIOFunctionResourceAssignment::TIORegisterAssignment
                    *registerAssignment;
            for (i = 0; i < registerItem->fRegisterCount; i++) {
                registerAssignment = new
                    TIOFunctionResourceAssignment::TIORegisterAssignment;
                registerAssignment->SetSharability(registerItem->
                    fRegisterPossible[i].fCanShare);
                registerAssignment->SetBaseAddress(thisFunction.
                    fRegisterAssignments[i].fBaseAddress);
                registerAssignment->SetLength(registerItem->
                    fRegisterPossible[i].fLength);
                registerAssignment->SetConstraintNumber(registerItem->
                    fRegisterPossible[i].fConstraint);
                registerAssignment->SetRegisterUsageMode(registerItem->
                    fRegisterPossible[i].fRegisterMode);
                registerDeque.Add(registerAssignment);
            }
            newAssignment->SetIOAssignment(registerDeque);
            registerDeque.DeleteAll();
        }
        return;
    }
    Boolean TIOResourceConflictResolver::IsAssignmentWithinPlatformLimits(
        TIOResourceConflictResolverDoer::FunctionPossibleAssignment & function)
    {
        return (IsMemoryAssignmentWithinLimits(function))
            && (IsRegisterAssignmentWithinLimits(function))
            && (IsDMAAssignmentWithinLimits(function))
            && (IsInterruptAssignmentWithinLimits(function));
    }
    Boolean TIOResourceConflictResolverDoer::IsMemoryAssignmentWithinLimits(
        TIOResourceConflictResolverDoer::FunctionPossibleAssignment & function)
    {
        TIOFunctionResourceAssignment::TIOMemoryAssignment::BaseAddress
                    thisMemoryAddress, memoryToCheckAddress;
        TIOFunctionResourceAssignment::TIOMemoryAssignment::BlockLength
                    thisMemoryLength, memoryToCheckLength;
        MemoryAssignment   *thisMemory, *checkMemory;
        int                thisIndex, checkIndex;
        if (function.fMemoryCount == 0 || fMemoryLimitCount == 0) {
            return TRUE;
        }
        thisMemory = function.fMemoryAssignments;
        for (thisIndex = 0; thisIndex < function.fMemoryCount; thisIndex++,
                    thisMemory++) {
            if (thisMemory->fIsCardMemory == FALSE)
                continue;
            thisMemoryAddress = thisMemory->fBaseAddress;
            thisMemoryLength = thisMemory->fLength;
            checkMemory = fMemoryLimit;
            for (checkIndex = 0; checkIndex < fMemoryLimitCount; checkIndex++,
                    checkMemory++) {
                if (checkMemory->fIsCardMemory == FALSE)
                    continue;
                memoryToCheckAddress = checkMemory->fBaseAddress;
                memoryToCheckLength = checkMemory->fLength;
```

-continued

```
            if ((thisMemoryAddress >= memoryToCheckAddress
                && thisMemoryAddress <
                    memoryToCheckAddress+memoryToCheckLength)
                && (memoryToCheckAddress >= thisMemoryAddress
                && memoryToCheckAddress <
                    thisMemoryAddress+thisMemoryLength)) {
                return TRUE;
            }
        }
    }
    return FALSE;
}
Boolean TIOResourceConflictResolver::IsRegisterAssignmentWithinLimits(
    TIOResourceConflictResolver::FunctionPossibleAssignment & function)
{
    TIOFunctionResourceAssignment::TIORegisterAssignment::BaseAddress
                    thisRegisterAddress, registerToCheckAddress;
    TIOFunctionResourceAssignment::TIORegisterAssignment::BlockLength
                    thisRegisterLength, registerToCheckLength;
    RegisterAssignment   *thisRegister, *checkRegister;
    int                  thisIndex, checkIndex;
    if (function.fRegisterCount == 0 || fRegisterLimitCount == 0) {
        return TRUE;
    }
    thisRegister = function.fRegisterAssignments;
    for (thisIndex = 0; thisIndex < function.fRegisterCount; thisIndex++,
            thisRegister++) {
        thisRegisterAddress = thisRegister->fBaseAddress;
        thisRegisterLength = thisRegister->fLength;
        checkRegister = fRegisterLimit;
        for (checkIndex = 0; checkIndex <fRegisterLimitCount; checkIndex++,
                checkRegister++) {
            registerToCheckAddress = checkRegister->fBaseAddress;
            registerToCheckLength = checkRegister->fLength;
            if ((thisRegisterAddress >= registerToCheckAddress
                && thisRegisterAddress <
                    registerToCheckAddress+registerToCheckLength)
                && (registerToCheckAddress >= thisRegisterAddress
                && registerToCheckAddress <
                    thisRegisterAddress+thisRegisterLength)) {
                return TRUE;
            }
        }
    }
    return FALSE;
}
Boolean TIOResourceConflictResolver::IsDMAAssignmentWithinLimits(
    TIOResourceConflictResolver::FunctionPossibleAssignment & function)
{
    int              thisindex, checkIndex;
    DMAAssignment    *thisDMA;
    DMAPossible      *checkDMA;
    if (function.fDMACount == 0 || fDMALimitCount == 0) {
        return     TRUE;
    }
    thisDMA = function.fDMAAssignments;
    for (thisIndex = 0; thisIndex < function.fDMACount; thisIndex++, thisDMA++) {
        checkDMA = fDMALimit;
        for (checkIndex = 0; checkIndex < fDMALimitCount; checkIndex++,
                checkDMA++) {
            if (thisDMA->fDMAChannel <= checkDMA->fLowerDMAChannel
                && thisDMA->fDMAChannel >= checkDMA->fUpperDMAChannel) {
                return TRUE;
            }
        }
    }
    return FALSE;
}
Boolean TIOResourceConflictResolver::IsInterruptAssignmentWithinLimits(
    TIOResourceConflictResolver::FunctionPossibleAssignment & function)
{
    int                  thisindex, checkIndex;
    InterruptAssignment  *thisInterrupt;
    InterruptPossible    *checkInterrupt;
    if (function.fInterruptCount == 0 || fInterruptLimitCount == 0) {
        return TRUE;
    }
    thisInterrupt = function.fInterruptAssignments;
    for (thisIndex = 0; thisIndex <function.fInterruptCount; thisIndex++,
```

```
            thisInterrupt++) {
            checkInterrupt = fInterruptLimit;
            for (checkIndex = 0; checkIndex < fInterruptLimitCount; checkIndex++,
                checkInterrupt++) {
                if (thisInterrupt->fInterruptSocket >=
                        checkInterrupt->fLowerInterruptSocket
                    && thisInterrupt->fInterruptSocket <=
                        checkInterrupt->fUpperInterruptSocket) {
                    return TRUE;
                }
            }
        }
    }
        return FALSE;
}
void TIOResourceConflictResolver::UpdateCardsFromFunctionCollection()
{
    TDequeOf<TIOFunctionResourceUsage>              functionDeque;
    TIOFunctionResourceUsage                        *function;
    TSequenceOfIterator<TIOFunctionResourceUsage>   *functionIterator;
    TIOCardResourceUsage                            *card;
    TSequenceOfIterator<TIOCardResourceUsage>       *cardIterator;
    TArrayOf<FunctionPossibleAssignment>            orderedFunctions;
    int                                             functionIndex;
    FunctionPossibleAssignment                      *newFunction;
    //
    // Reconstruct the function Collection in the proper order
    //
    orderedFunctions.SetAutoGrowFlag(TRUE);
    for (functionIndex = 0; functionIndex <fFunctionCount; functionIndex++)
        orderedFunctions.AtPut(fFunctions[functionIndex].fFunctionIndex,
            &fFunctions[functionIndex]);
    cardIterator = fCard.CreateSequenceIterator();
    for (functionIndex = 0, card = cardIterator->First();card != NIL; card =
            cardIterator->Next()) {
        card->GetFunctionResourceUsage(functionDeque);
        functionIterator = functionDeque.CreateSequenceIterator();
        for (function = functionIterator->First(); function != NIL; function =
                functionIterator->Next()) {
            if (functionIndex >= fFunctionCount)
                // Throws Exception - Internal Errorr
                throw (TConflictResolverException(
                    TConflictResolverException::kInternalError));
            newFunction = orderedFunctions.At(functionIndex);
            if (newFunction == NIL) {
                throw newFunction;
            }
            if (newFunction->fHaveAssignment &&
                newFunction->fConstructedAssignment) {
                function->SetAssignment(*newFunction->
                    fConstructedAssignment);
            } else if (newFunction->fConflicts) {
                function->SetResourceConflicts(*newFunction->fConflicts);
            }
            if (newFunction->fConflicts) {
                newFunction->fConflicts->DeleteAll();
                delete newFunction->fConflicts;
            }
            if (newFunction->fConstructedAssignment)
                delete newFunction->fConstructedAssignment;
            if (newFunction->fDMAChannelNumbers)
                delete newFunction->fDMAChannelNumbers;
            if (newFunction->fInterruptSocketNumbers)
                delete newFunction->fInterruptSocketNumbers;
            if (newFunction->fRegisterBaseAddresses)
                delete newFunction->fRegisterBaseAddresses;
            if (newFunction->fMemoryBaseAddresses)
                delete newFunction->fMemoryBaseAddresses;
            RemoveConstructedAssignments(*newFunction);
            delete newFunction->fFunctionIdentifier;
            functionIndex++;
        }
        card->SetFunctionResourceUsage(functionDeque);
        delete functionIterator;
        functionDeque.DeleteAll();
    }
    if (functionIndex != fFunctionCount) {
        // throws exception
        throw (TConflictResolverException(
            TConflictResolverException::kInternalError));
```

-continued

```
    }
    delete cardIterator;
    delete        fFunctions;
    fFunctionCount = 0;
}
void TIOResourceConflictResolver::RemoveConstructedAssignments(
    TIOResourceConflictResolver::FunctionPossibleAssignment & function)
{
    if (function.fMemoryAssignments) {
        function.fMemoryCount = 0;
        delete function.fMemoryAssignments;
        function.fMemoryAssignments = NIL;
    }
    if (function.fRegisterAssignments) {
        function.fRegisterCount = 0;
        delete function.fRegisterAssignments;
        function.fRegisterAssignments = NIL;
    }
    if (function.fDMAAssignments) {
        function.fDMACount = 0;
        delete function.fDMAAssignments;
        function.fDMAAssignments = NIL;
    }
    if (function.fInterruptAssignments) {
        function.fInterruptCount = 0;
        delete function.fInterruptAssignments;
        function.fInterruptAssignments = NIL;
    }
}
```

3. The Resource Lock Class

The TIOFunctionResourceUsage class 1104 further includes a class which can be used, in accordance with the principles of the present invention, to control access to shared resources after a resource assignment has been made. This class is the TIOResourceLockEntry class 1106 which includes a GetResourceAssignment( ) method that is used to retrieve the conflict-free resource assignments for an I/O function and an Acquire( ) member function that is used to access the assigned resources. The Acquire( ) method calls a private method (AcquireResourceLock( )), described above in connection with the IOFunctionResourceUsage object created from class 1104, which method attempts to acquire a semaphore lock (of type TRecoverableSemaphore) in the IOFunctionResourceUsage object to the resources assigned to the corresponding I/O function. The Acquire( ) method includes a parameter (EAccessMode) which indicates whether the client requires exclusive or shared access to the resource assignment. The lock is acquired only once and an exception is thrown if a predetermined period of time expires before the lock is acquired. The exception identifies the holder(s) of the lock. The Acquire( ) method has the following code:

```
void Acquire (const TIOFunctionHardwareInterfaceIdentifier& function,
        const EAccessMode mode, const TTime& maximumWait)
{
    TIOFunctionResourceUsage      *functionItem;
    if ((functionItem = FindFunctionByID (id)) == NIL) {
        throw (TConflictResolverException
            (TConflictResolverException::kFunctionNotRegistered));
        return;
    }
    functionItem->AcquireResourceLock(mode, maximumWait);
}
```

Thus, to access the resources for an I/O function, clients instantiate a IOResourceLockEntry object from the TIOResourceLockEntry class 1106 and call the Acquire( ) method of the object. It should be noted that instantiation of the IOResourceLockEntry object alone does not implicitly acquire the lock. However, destruction of the IOResourceLockEntry object does implicitly release the resources acquired by the IOResourceLockEntry object.

The TIOResourceLockEntry class 1106 also includes a GetResourceAssignment( ) method which retrieves a resource assignment for an I/O function via the IOFunctionResourceUsage object. The GetResourceAssignment( ) method can be called after the resource lock is acquired by means of the Acquire( ) method and obtains the conflict-free resource assignment for an I/O function. The resources can be used only by the task which calls the Acquire( ) method or by interrupt handlers which have been registered in the I/O resource conflict resolver by the AddinterruptHandlerReference( ) and RemoveInterruptHandlerReference( ) methods. If resources are not assigned to an I/O function, the GetResourceAssignment( ) method throws an exception. The GetResourceAssignment( ) method has the following form:

void GetResourceAssignment
 (TIOFunctionResourceAssignment& function) const;

As mentioned above, resources may be assigned to an I/O function on an expansion card even if the expansion card is not physically installed. A corresponding device driver must verify that the hardware is physically installed in the expansion slot before using the resources. The GetResourceAssignment( ) method retrieves the resource assignments from an object created from the TIOFunctionResourceAssignment class 1108, which is the representation of the conflict-free resource assignment created for an I/O function. An IOFunctionResourceAssignment object is instantiated from the TIOFunctionResourceAssignment class 1108 and encapsulates resource assignment information such as memory, I/O registers, interrupt sockets, and DMA channel assignment. This class includes several nested classes which encapsulate the various assignments. These nested classes are discussed in more detail in connection with FIG. 15. In order to retrieve resource assignments, device driver clients create IOResourceLockEntry objects and retrieve an IOFunctionResourceAssignment object through the IOResourceLockEntry object thus created. The TIOFunctionResourceAssignment class 1108 is a monomorphic class which is normally not subclassed by developers.

The TIOFunctionResourceAssignment class 1108 includes a GetMemoryAssignment( ) member function which reads memory ranges from the object for a particular resource assignment and a SetMemoryAssignment( ) member function which writes the memory ranges in the object for the resource assignment. A GetIOAssignment( ) member function and a SetIOAssignment( ) member function respectively read and write the I/O ranges for this assignment in the object.

A GenerateInterrupt( ) method returns a first boolean value (e.g. TRUE) if the corresponding I/O function generates an interrupt to the processor and a second boolean value (e.g. FALSE) if the I/O function does not generate an interrupt to the processor. A GetInterruptAssignment( ) returns information about an interrupt socket for this assignment and a SetInterruptAssignment( ) method writes the information about the interrupt socket for this assignment.

A NeedsDMAChannel( ) method returns a first boolean value (e.g. TRUE) if the I/O function on the corresponding expansion card requires a DMA channel and a second boolean value (e.g. FALSE) if it does not. A GetDMAAssignment( ) method returns DMA channel assignment information for a particular resource assignment and a SetDMAAssignment( ) writes information about the DMA channel for the particular resource assignment.

The IOResourceLockEntry object is also responsible for managing resources assigned to an I/O function when that function dies. In order to perform this management function, device driver clients register a TInterruptHandlerReference with the IOResourceLockEntry object so that the object can free the resources assigned to the corresponding I/O functions automatically when the functions are terminated. The TIOResourceLockEntry class is a monomorphic class which is normally not subclassed by developers. The TIOResourceLockEntry class 1106 also includes a RemoveInterruptHandlerReference( ) method which de-registers the interrupt handler reference previously registered by the AddInterruptHandlerReference( ) method. The AddInterruptHandlerReference( ) method has the following form:
void AddInterruptHandlerReference (const TInterruptHandlerReference& interruptHandler);

4. The Resource Conflict Object and Resource Assignment Classes

In accordance with the principles of the invention, the TIOResourceConflict class 1110 encapsulates information explaining why a particular I/O function could not be assigned its required resources. The TIOResourceConflict class 1110 encapsulates information such as which resource is the conflicting resource, which assignment period is the conflicting assignment period (current boot or next boot) and the conflicting resource's index in a resource collection. Whenever a conflict in resource assignment is encountered while creating conflict-free assignment for an I/O function, the resource conflict resolver instantiates an IOResourceConflict object from the TIOResourceConflict class 1110. When the conflict is removed and a conflict-free resource assignment is produced, the IOResourceConflict object which was instantiated is subsequently deleted internally by the resource conflict resolver object. The TIOResourceConflict class is a monomorphic class which is normally not subclassed by developers.

The TIOResourceConflict class 1110 includes the typical constructor and destructor member functions and also includes a plurality of unique member functions.

For example, the TIOResourceConflict class 1110 defines a private attribute which stores an enumerated resource type (kMemoryRange, kIORange, kInterrupt or kDMA.) A GetResourceType( ) member function reads the type of resource which type indicates the existence of conflicts in a particular type of resources. A SetResourceType( ) member function writes the type of resource to the private attribute.

The TIOResourceConflict class 1110 also defines a private attribute which stores an enumerated conflict period designator (kConflictNow or kConflictAfterBoot.) The GetConflictType( ) member function reads the type of conflict from the private attribute and returns first type (kConflictNow) if the conflict will occur for the current boot period and the second type (kConflictAfterBoot) if the conflict will remain even after this boot period. A SetConflictType( ) member function writes the type of conflict to the private attribute.

A GetResourceIndex( ) member function of the TIOResourceConflict class 1100 reads the resource index of the resource over which the conflict occured (the index identifies the particular resource in a collection of resources) from a private attribute while a SetResourceIndex( ) member function writes the index into the private attribute.

This index allows a method which processes the resource conflict object to identify the particular resource which caused the conflict.

A SetFunctionIdentifier( ) member function writes the THardwareInterfaceIdentifier value for a conflicting I/O function into a private attribute in order to identify the function which caused the conflict.

The TPossibleIOResourceAssignment class 1112 is an encapsulation of possible choices (and constraints) in resource assignments for an I/O function. The possible choices and constraints are obtained, as discussed above, from either the board itself (in the case of auto-configure expansion boards) or from a database (in the case of a manually-configurable expansion board.)

A PossibleIOResourceAssignment object instantiated from the TPossibleIOResourceAssignment class 1112 encapsulates resource assignment information including, but not limited to, possible assignment of memory ranges, I/O register ranges, interrupt sockets or request lines, interrupt priority levels and DMA channels. The TPossibleIOResourceAssignment class 1112 is a monomorphic class which is normally not subclassed by developers. It includes several nested constraint classes which are explained in more detail in connection with FIG. 16 below.

The TPossibleIOResourceAssignment class 1112 includes a plurality of member functions including the typical constructor and destructor functions. The TPossibleIOResourceAssignment class 1112 also includes several methods for getting and setting constraints which are encapsulated in the nested constraint objects. These member functions include a GetMemoryConstraints( ) method and a SetMemoryConstraints( ) method for respectively reading and writing constraints in memory usage in a collection of nested IOMemoryConstraint objects.

Similarly, a GetIOConstraints( ) method and a SetIOConstraints( ) method respectively read and write constraints in I/O register usage in a collectoin of nested IORegisterConstraint objects.

A GetInterruptConstraints( ) method and a SetInterruptConstraints( ) method respectively read and write constraints in interrupt socket usage in a collection of IOInterruptConstraint objects, while a GetDMAConstraints( ) method and a SetDMAConstraints( ) method respectively read and write constraints in DMA channel usage in a collection of IODMAConstraint objects.

Figure 15:
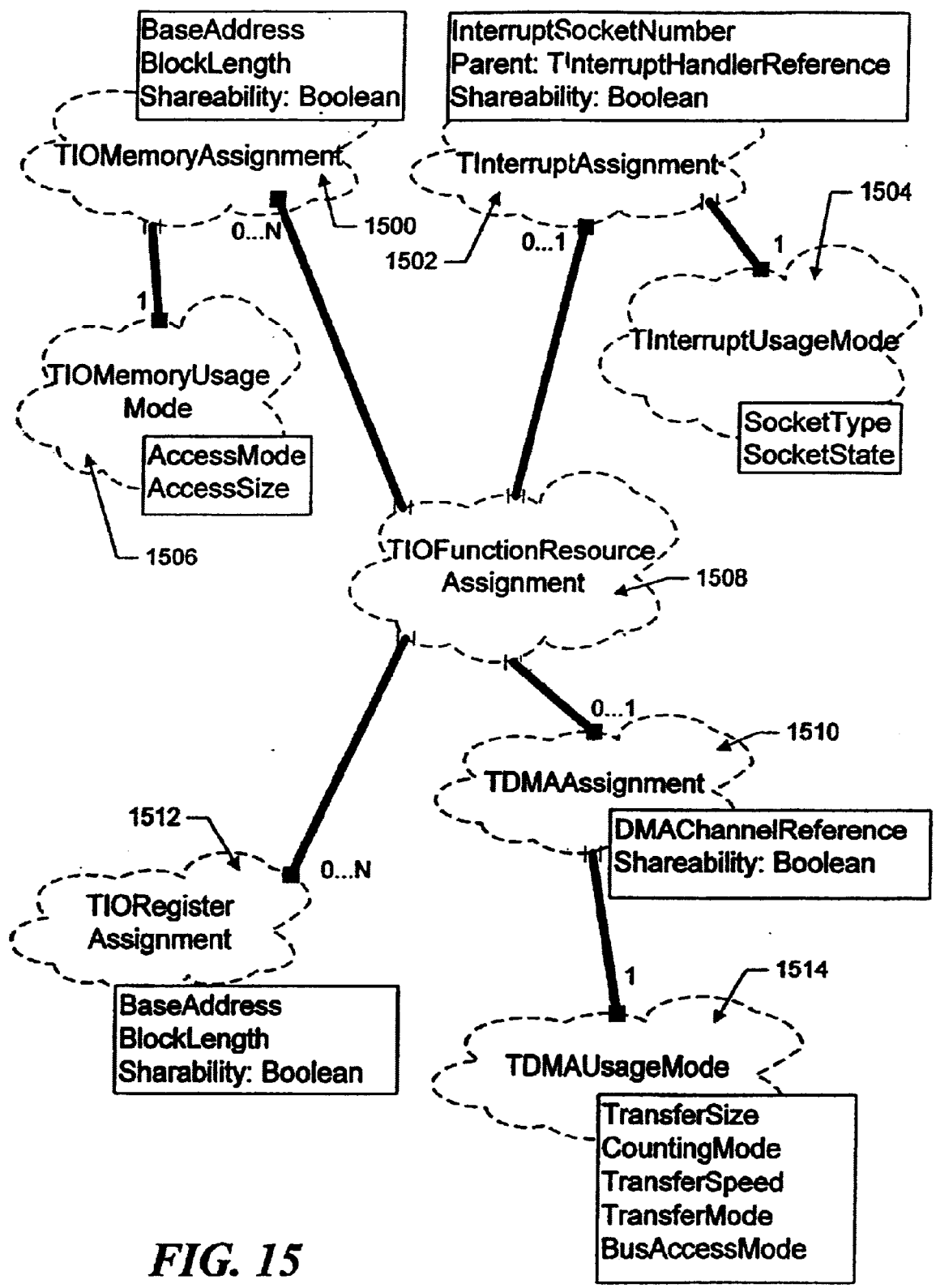
FIG. 15 is a Booch diagram illustrating class relationships concerning the function resource assignment classes.

Referring now to FIG. 15, the conflict resolver framework further includes a set of resource assignment classes. These classes include classes which are nested within a TIOFunctionResourceAssignment class 1508 mentioned above in conjunction with FIG. 11. The nested classes include a TInterruptAssignment class 1502, a TIOMemoryAssignment class 1500, a TIOMemoryUsageMode class 1506, a TIORegisterAssignment class 1512, a TDMAAssignment class 1510 and a TDMAUsageMode class 1514.

The TInterruptAssignment class 1502 encapsulates information about the Interrupt socket assigned to an individual I/O function. The TInterruptAssignment class 152 is a monomorphic class which is normally not subclassed and includes a plurality of unique member functions such as a GetInterruptSocket( ) method which reads the interrupt socket number for an I/O function from a private attribute and a SetInterruptSocket( ) method writes the interrupt socket number for the I/O function into the private attribute.

A GetParentInterruptHandlerReference( ) method and a SetParentInterruptHandlerReference( ) method respectively read and write the parent Interrupt handler for an I/O function into a private attribute.

A GetInterruptUsageMode( ) method and a SetInterruptUsageMode( ) method respectively read and write the usage mode for the interrupt socket used by the I/O function into a private attribute. An IsSharable( ) method returns a first value (e.g. boolean TRUE) if an interrupt socket used by the I/O function can be shared by other I/O functions and a SetSharability( ) method writes the shareability for the I/O function into a private attribute.

The TInterruptAssignment class 1502 is associated with a TInterruptUsageMode class 1504 which encapsulates information about the characteristics of the specified interrupt socket. The TInterruptUsageMode class 1504 is a monomorphic class which is normally not subclassed by developers.

The TInterruptUsageMode class 1504 also includes a plurality of member functions including a GetSocketType( ) method reads, from a private attribute, an enumerated socket type of the socket and returns a first value (kEdge) if the socket is an edge type socket and a second different value (kLevel) if the socket is a level type socket. A SetSocketType method writes the socket type to the private attribute.

A GetSocketState( ) method reads the socket state from a private attribute and returns a first value (kHigh) for a level high, or edge high, type and a second different value (kLow) for a level low, or edge low, type of socket. A SetSocketState( ) method writes the socket state to the private variable.

The TIOMemoryAssignment class 1500 is a representation of a memory range assigned to an individual I/O function and is nested inside the TIOFunctionResourceAssignment class 1508. The TIOMemoryAssignment class 1500 is a monomorphic class and is normally not subclassed by developers. The TIOMemoryAssignment class 1500 includes a plurality of member functions includiing the GetBaseAddress( ) method reads a base address from a private attribute for an assigned memory range and a SetBaseAddress( ) method writes the base address for the memory range. A GetLength( ) method reads the length of the assigned memory range and a SetLength( ) method writes the length of the assigned memory range into a private attribute. A GetMemoryUsageMode( ) method and a SetMemoryUsageMode( ) method respectively read and write the usage mode for the assigned memory range into a private attribute.

An IsSharable( ) method returns a first value (e.g. a boolean TRUE value) from a private attribute if a memory range used by the I/O function can be shared by other I/O functions. A SetSharability( ) method writes the shareability for the I/O function.

The TIOMemoryAssignment class 1500 is associated with a TIOMemory UsageMode class 1506. The TIOMemoryUsageMode class 1506 encapsulates information about the usage of a specified memory range. TIOMemoryUsageMode class 1506 is a monomorphic class which is normally not subclassed by developers.

The TIOMemoryUsageMode class 1506 incudes a GetAccessMode( ) method which reads an access mode for the memory range from a private attribute and returns a first value (kReadOnly) if the memory is read only memory (ROM) and a second different value (kWritable) if the memory is random access memory (RAM). A SetAccessMode( ) method writes the access mode for the memory range.

A GetAccessSize( ) method reads the access size for the memory range from a private attribute and returns an indication as to whether the memory range is accessible as an 8 bit, a 16 bit, both an 8 bit and a 16 bit or a 32 bit memory range. A SetAccessSize( ) method writes the access size for the memory range.

The TIORegisterAssignment class 1512 is the representation of an I/O register range assigned to an individual I/O function and is a monomorphic class which is nested inside the TIOFunctionResourceAssignment class 1508. The TIORegisterAssignment class 1508 includes the typical constructor and destructor member functions as well as a plurality of unique member functions. For example, a GetBaseAddress( ) method and a SetBaseAddress( ) method respectively read and write the base address for a particular I/O register range. A GetLength( ) method reads the length of the I/O register range and a SetLength( ) method writes the length of the I/O register range. An IsSharable( ) method returns a first value (e.g. Boolean TRUE) if an I/O register range used by the I/O function can be shared by other I/O functions and a SetSharability( ) method writes the sharability for the I/O function.

A TDMAAssignment class 1510 encapsulates information about a DMA channel assigned to an individual I/O function. The TDMAAssignment class 1510 is a monomorphic class which is nested inside the TIOFunctionResourceAssignment class 1508. The TDMAAssignment class 1510 is normally not subclassed by developers. The TDMAAssignment class 1510 includes a plurality of unique member functions. For example, a GetChannelReference( ) method and a SetChannelReference( ) method respectively read and write a reference to a DMA channel handle. A GetDMAUsageMode( ) method and a SetDMAUsageMode( ) method read from a private attribute and write to the private attribute the usage mode for the DMA channel. An IsSharable( ) method returns a first value (e.g. boolean TRUE) from a private attribute if the DMA channel used by the I/O function can be shared by other I/O functions and a SetSharability( ) method writes the sharability for the I/O function to the private attribute.

The TDMAAssignment class 1510 is associated with a TDMAUsageMode class 1514 which encapsulates information about the usage of a specified DMA channel. The TDMAUsageMode class 1514 is a monomorphic class which is normally not subclassed by developers and includes a plurality of member functions including a GetTransferSize( ) method which reads the size of a single data transfer unit from a private attribute and returns a parameter having a predetermined value to indicate whether an 8-bit, 16-bit, 32-bit or 8/16 bit transfer is taking place. A SetTransferSize( ) method writes the transfer size.

A GetCountingMode( ) method of class 1514 reads the mode for counting the data transfer units. The method returns a first value (kCountByByte) if counting is done on a byte-by-byte basis and a second different value (kCountByWord) if counting is done on a word-by-word basis. Similarly, a SetCountingMode( ) method of TDMAUsageMode class 1514 writes the mode for counting the transfer units into a private attribute. A GetTransferSpeed( ) method reads the timing information for the transfer from a private attribute and returns enumerated indicators (e.g. kISACompatible, kTypeA, kTypeB, kTypeC or kTypeF) to indicate if the I/O function uses ISA compatible timing, Type A timing, Type B timing, Type C timing or Type F timing respectively. A SetTransferSpeed( ) method writes timing information for the transfer into the private attribute.

A GetTransferMode( ) method reads the transfer mode used by the I/O function. The GettTransferMode( ) method returns an enumerated value (e.g. ksingle, kBlock or kDemand) if the I/O function uses single transfer, block transfer or demand mode transfer, respectively to indicate the transfer mode used by the I/O function. A corresponding SetTransferMode( ) method writes the transfer mode for an I/O function into a private attribute. A GetBusAccessMode( ) method returns a first enumerated value (kMaster) from a private attribute if an I/O function is a bus master and a second different value (kSlave) if the I/O function is not a bus master. A SetBusAccessMode( ) method writes the master or slave attribute for an I/O function to the private attribute.

Figure 16:
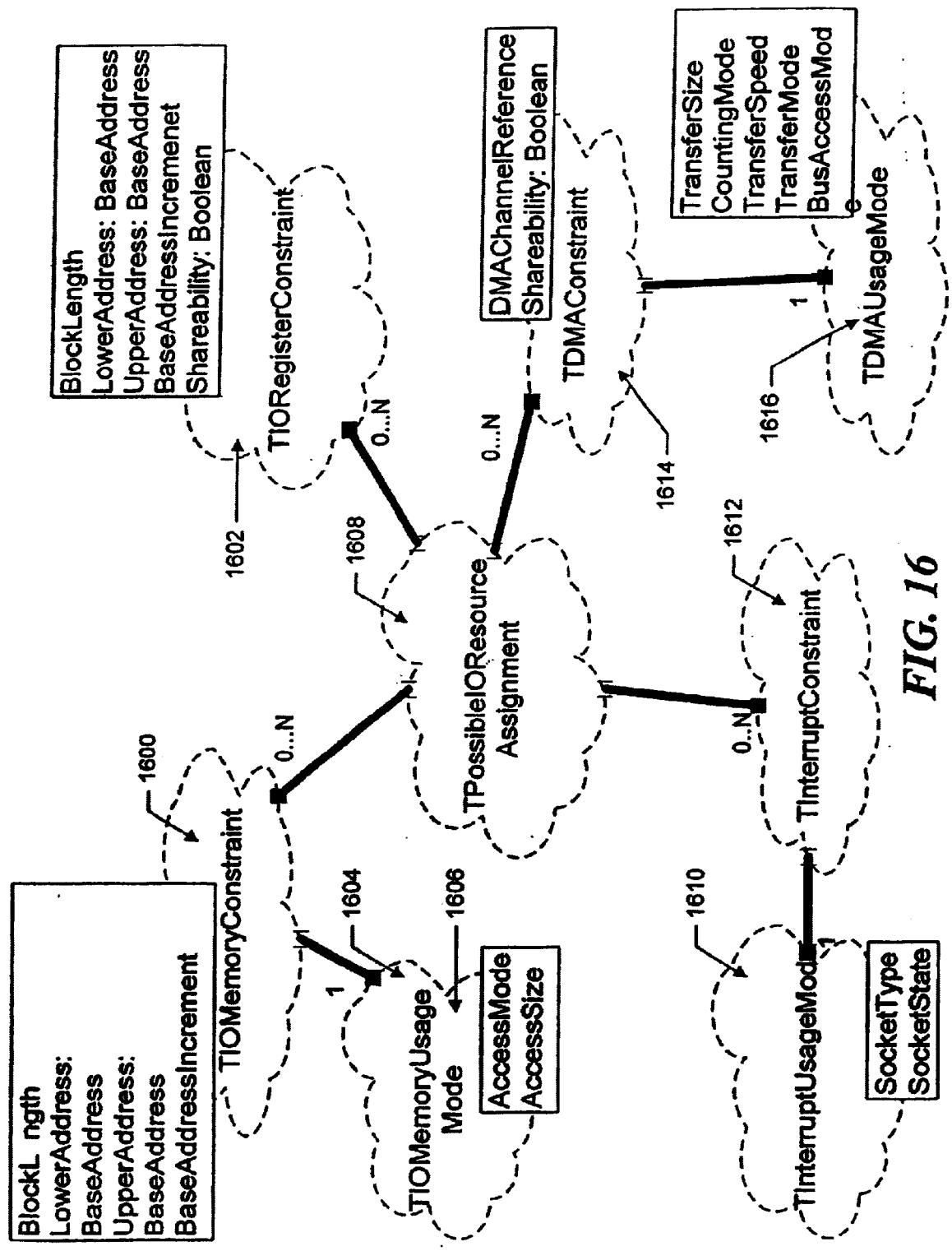
FIG. 16 is a Booch diagram illustrating class relationships concerning the possible I/O resource assignment classes.

Referring now to FIG. 16, the conflict resolver framework includes a plurality of constraint classes which are nested in the TPossibleIOResourceAssignment class 1608 also described above in conjunction with FIG. 11 (class 1110) These classes are also associated with the TIOMemoryUsageMode class 1606, the TInterruptUsageMode class 1610 and the TDMAUsageMode classes 1616 described above in conjunction with FIG. 15.

As can be seen in FIG. 16, the TPossibleIOResource Assignment class 1608 has nested constraint classes including a TIOMemoryConstraint class 1600, a TIORegisterConstraint class 1602, a TInterruptConstraint class 1612 and a TDMAConstraint class 1614.

The TIOMemoryConstraint class 1600 is the representation of constraints in the usage of memory ranges used by an individual I/O function, including memory locations and lengths. The TIOMemoryConstraint class is a monomorphic class which is normally not subclassed by developers. The TIOMemoryConstraint class 1600 includes a plurality of member functions including a GetLength( ) method and a SetLength( ) method which read and write, respectively, the length of a memory range in a private attribute.

A GetLowerBaseAddress( ) method reads the lowest base address of a memory block that can be assigned to an I/O function and a SetLowerBaseAddress method( ) writes the lowest base address of the memory block that can be assigned to an I/O function to a private attrbiute.

Similarly, a GetUpperBaseAddress( ) method reads the highest base address of a memory block that can be assigned to an I/O function and a SetUpperBaseAddress( ) writes the highest base address of the memory block that can be assigned to an I/O function to a private attribute.

A GetBaseIncrement( ) method reads a predetermined increment value for a base address and a SetBaseIncrement( ) method writes a base increment value for a base address to a private attribute.

An IsSharable( ) method returns a first value from a private attribute (e.g. a boolean TRUE) if a memory range used by an I/O function can be shared by other I/O functions and a SetSharability( ) method writes the sharability value for the I/O function to the private attribute. In a like manner, a GetMemoryUsageMode( ) method reads the usage mode of the memory range and a SetMemoryUsageMode( ) writes the usage mode of the memory range to a private attribute.

The TIORegisterConstraint class 1602 represents constraints in the usage of I/O register ranges by an individual I/O function. The TIORegisterConstraint class 1602 is a monomorphic class which is nested inside the TPossibleIOResourceAssignment class 1608.

The TIORegisterConstraint class 1602 includes a plurality of member functions for specifying constraints on I/O register ranges including a GetLength( ) method which reads the length of an I/O range and a SetLength( ) method writes the length of an I/O range from a private attribute. A GetLowerBaseAddress( ) method and a GetUpperBaseAddress( ) method respectively read the lowest and highest base addresses of the I/O block that can be assigned to an I/O function from a private attribute. A SetLowerBaseAddress( ) method and a SetUpperBaseAddress( ) method write respectively the lowest and highest base addresses of the I/O block that can be assigned to an I/O function to the private attribute.

The class 1602 further includes a GetBaseIncrement( ) method and a SetBaseIncrement( ) method which respectively read and write a base increment value for the base address to another private attribute. An IsSharable( ) method returns a first value (e.g. boolean TRUE) from an additional private attribute if the I/O range used by the I/O function can be shared by other I/O functions and a SetSharability( ) method writes the sharability for the I/O function in the private attribute.

The TInterruptConstraint class 1612 encapsulates information about resource constraints in the usage of an interrupt socket by an individual I/O function. The TInterruptConstraint class 1612 is a monomorphic class which is nested inside the TPossibleIOResourceAssignment class 1608 and is normally not subclassed by developers.

The TInterruptConstraint class 1612 includes a GetParentInterruptHandlerReference( ) method which reads the reference to the parent Interrupt handler for an I/O function and a SetParentInterruptHandlerReference( ) writes the reference to the parent Interrupt handler for an I/O function to a private attrbiute.

A GetLowerInterruptSocket( ) method reads the lowest Interrupt socket number which can be assigned to the I/O function and a SetLowerInterruptSocket method writes the lowest Interrupt socket number which can be assigned to the I/O function. Similarly, a GetUpperInterruptSocket method reads the highest Interrupt socket number can be assigned to an I/O function and a SetUpperInterruptSocket( ) method writes the highest Interrupt socket number can be assigned to an I/O function.

An IsSharable( ) method returns a first value (e.g. boolean TRUE) if the socket can be shared and a second different value (e.g. boolean FALSE) if the socket cannot be shared. A SetSharability( ) method writes the sharability of the socket into a private attribute. A GetinterruptUsageMode( )

method reads the usage mode for the interrupt socket used by an I/O function and a SetinterruptUsageMode( ) writes the usage mode for the interrupt socket used by an I/O function.

The TDMAConstraint class 1614 encapsulates information about a DMA channel used by an individual I/O function. The TDMAConstraint class 1614 is a monomorphic class and is nested inside TPossibleIOResourceAssignment class 1608. The TDMAConstraint class 1614 is normally not subclassed by developers.

The TDMAConstraint class 1614 includes a plurality of member functions including a GetChannelReference( ) method reads a reference to the DMA channel handle from a private attribute and a SetChannelReference( ) method writes the reference to the DMA channel handle to the private attribute.

An IsSharable( ) method returns a first value (e.g. boolean TRUE) if the DMA channel used by the I/O function can be shared by other I/O functions and a SetSharability( ) method writes the sharability for the I/O function. A GetDMAUsageMode( ) reads the usage mode for the DMA channel used by the I/O function and a SetDMAUsageMode( ) writes the usage mode for the DMA channel used by the I/O function.

6. Manual Module Framework Classes

FIGS. 17, 18A, 18B and 19 illustrate a set of classes which form a manual module framework. The manual module framework is provided from a set of classes that represent the general behavior of manually-configured expansion cards and the motherboard of the computer system. The classes of the manual module framework insure, inter alia, a persistent configuration of both manually-configured expansion cards and the motherboard from one boot operation to the next. It is this framework which is responsible for retrieving the configuration information from the hardware configuration database during boot operation.

In general overview, during boot operations, the manual module framework classes aid in instantiating configuration recorder objects for the motherboard and any manual expansion cards installed in the computer system. More specifically, the booting system instantiates a TManualRecorderRegistry object which instantiates the configuration recorder objects for the motherboard and the manual expansion cards.

The manual module framework also includes classes that aid in installing new expansion cards with a computer viewer object as explained above. The manual module framework provides a TManualIOCard object which communicates with the resource conflict resolver object and the configuration option retriever objects that retrieve the resource requirements for the motherboard and manual expansion cards from a configuration option database.

Figure 17:
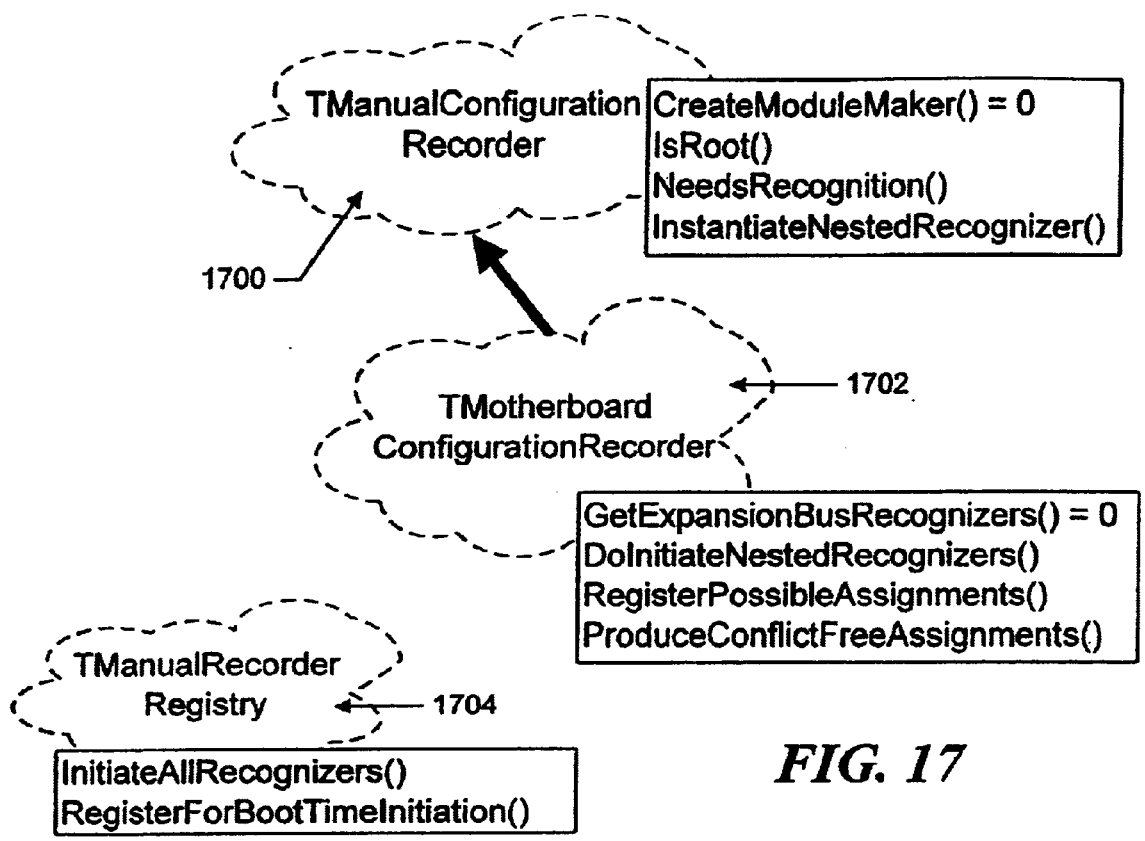
FIG. 17 is a Booch diagram illustrating class relationships concerning the configuration recorder classes.

Referring now to FIG. 17, the manual module framework includes a TManualConfigurationRecorder class 1700 having a CreateModuleMaker( ) method, an IsRoot( ) method, a NeedsRecognition( ) method and an InitiateNestedRecognizer( ) method. A TMotherboardConfigurationRecorder class 1702 inherits from the TManualConfigurationRecorder class 1700 (i.e. the TMotherboardConfigurationRecorder class is a subclass of the TManualConfigurationRecorder class) and thus includes each of the member functions of the TmanualConfigurationRecorder class 1700. The TMotherboardConfigurationRecorder class 1702 also includes a GetExpansionBusRecognizers( ) method, a DoInitiateNestedRecognizers( ) method, a RegisterPossibleAssignments( ) method and a ProduceConflictFreeAssignments( ) method.

The TManualConfigurationRecorder class 180 creates a configuration recorder which will record the conflict-free resource assignments generated by the resource conflict resolver object in the hardware configuration database. A configuration recorder object for a manually configurable component is responsible for creating a hardware module object for the component, which object encapsulates the hardware description of the component. The recorder object also creates a hardware identifier object for each of the connectors on the component and adds the hardware identifier objects to the hardware module.

A TManualConfigurationRecorder object is instantiated from the TManualConfigurationRecorder class 1700 and is used to construct the configuration recorder object for a manual component such as a manual ISA card or a local bus card. The TManualConfigurationRecorder class 1700 is an abstract base class and must be subclassed to allow a particular configuration recorder object for an individual manually configurable I/O expansion card to be instantiated therefrom. A TManualConfigurationRecorder object for a specific card is instantiated by the computer viewer during the installation of the card. A recorder object for a manual card that needs to invoke nested recognizers during a system boot operation (such as a SCSI bus) is registered with a ManualRecorderRegistry object that is persistent. During a boot operation, the ManualRecorderRegistry object instantiates the recorder for the card and invokes the InitiateNestedRecognizers( ) method of the recorder object in order to instantiate nested recognizers as required by the card.

A derived class of TManualConfigurationRecorder class 1700 must implement the CreateModuleMaker( ) method. The CreateModuleMaker( ) method is invoked by the computer viewer during installation and creates a HardwareModuleMaker object that represents the card, creates a THardwareInterfaceIdentifier object to represent each connector on the card and adds them to the THardwareModuleMaker object for the card created above.

An identifier for the edge connector (TUniqueNonActivatableHardwareInterfaceIdentifier) is passed in by the computer viewer object during construction of the object and the recorder object adds the identifier to the card module. The parent for the edge is not set for a Manual I/O card. For connectors representing an activatable function, the corresponding identifiers must be created by subclassing from a TIOFunctionHardwareInterfaceIdentifier class. A developer writing a sub-class of the TIOFunctionHardwareInterfaceIdentifier class need not set the "other End" or "connection kind" attributes of the HardwareModuleMaker object, since these attributes are set by the computer viewer object. The developer should not set the "this end" attribute of the maker, because it defaults to the default connector of the module (typically edge).

An IsRoot( ) method returns FALSE by default and returns TRUE only for the motherboard configuration recorder object. The IsRoot( ) method is called by a manual recorder registry object to check if the recorder object is for the motherboard.

A NeedsRecognition( ) method returns FALSE by default and can be overridden to return TRUE if the subclass needs to invoke secondary recognizers. This method is called by the manual recorder registry object to check if the card needs to invoke any secondary recognizer objects during a boot operation.

An InitiateNestedRecognizers( ) method instantiates any secondary recognizer objects required by the card. By default, this method does nothing. Developers should override this method if the card needs to invoke a secondary recognizer object during a boot operation. The configuration recorder object stores the function identifier for the function that needs recognition. If a subclass overrides this method, its CreateModuleMaker( ) method should save (in object state) any identifiers required by the InitiateNestedRecognizers( ) method.

The TMotherboardConfigurationRecorder class 1702 is used to construct a configuration recorder for the motherboard of the computer system. The TMotherboardConfigurationRecorder class 1702 is an abstract base class and must be subclassed to represent the configuration recorder object for a specific motherboard.

The TMotherboardConfigurationRecorder class 182 is responsible for creating a hardware module object for the motherboard, creating hardware identifier objects for each connector other than expansion bus slots on the motherboard, adding the identifier objects created above to the motherboard module, instantiating recognizer objects for each expansion bus (such as ISA, PCI, etc.) on the motherboard and instantiating nested recognizer objects (such as SCSI recognizer objects) required by the motherboard.

The TMotherboardConfigurationRecorder class 1702 is instantiated by a computer viewer object during installation of the motherboard. The motherboard recorder object is persistently registered with the ManualRecorderRegistry object because it always incorporates buses that require nested recognizers. During a system boot operation, the ManualRecorderRegistry object instantiates the motherboard recorder object and invokes the InitiateNestedRecognizers( ) method of the motherboard recorder object. This latter method then instantiates expansion bus and nested device bus recognizer objects as required.

The TMotherboardConfigurationRecorder class 1702 also includes a plurality of member functions including an IsRoot( ) method which is called by the manual recorder registry object to check if the recorder object is for the motherboard. If the recorder object is for the motherboard the IsRoot( ) method returns a first predetermined value (e.g. a boolean TRUE value).

A NeedsRecognition( ) method is called by the manual recorder registry object to determine if the motherboard requires any secondary recognizer objects to be invoked during a boot operation. If secondary recognizer objects are required then the NeedsRecognition( ) method returns a first predetermined value (e.g. a boolean TRUE value).

An InitiateNestedRecognizers( ) method instantiates the recognizers for all expansion buses (such as ISA, PCI, etc.) and device buses (such as SCSI) on the motherboard. The InitiateNestedRecognizers method also Invokes the GetExpansionBusRecognizers( ) method to determine the recognizer objects for the expansion buses on the motherboard, iterates over the collection of TIOCardRecognizer objects returned by the previous step and invokes appropriate methods of each recognizer object to register the resource requirements for the functions on cards residing on each expansion bus with the resource conflict resolver object. It also invokes the appropriate method of the resource conflict resolver object to produce conflict-free resource assignments for each function on the motherboard and expansion cards, invokes the appropriate methods of each auto-configurable recognizer object to instantiate configuration recorder objects for the expansion cards and calls the DoInitiateNestedRecognizers( ) method to instantiate secondary recognizer objects on the motherboard, if required.

A RegisterPossibleAssignnments( ) method is not overridden by developers and registers the resource requirements, such as possible resource assignments and constraints, in resource assignments for the motherboard functions with the resource conflict resolver object.

A DoInitiateNestedRecognizers( ) method, by default, does nothing and developers can override this method to instantiate a secondary recognizer object (such as SCSI recognizer object) on the motherboard, if required. The configuration recorder object stores the identifier for the function that needs recognition.

A GetExpansionBusRecognizers( ) method must be implemented by developers to return a collection of recognizer objects for the expansion buses on the motherboard.

The TManualRecorderRegistry class 1704 includes an InitiateAllRecognizers( ) method and a RegisterForBootTimeInitiation( ) method. A TManualRecorderRegistryHandle represents the persistent registry of configuration recorders for manually-configured I/O expansion cards that require nested recognizers to be instantiated during boot. If a card requires a nested recognizer object to be instantiated during a system boot operation then during installation of the card, the recorder object for that card is added to the recorder registry database. During a system boot operation, the booting system invokes the InitiateAllRecognizers( ) method of the recorder registry database. The recorder registry will then iterate across all recorder objects registered therein, starting first with the motherboard recorder, calling an InitiateNestedRecognizer( ) method on each registered TManualConfigurationRecorder object.

The TManualRecorderRegistry object is self garbage-collecting. It performs garbage collection first, each time it is requested to instantiate all of its recorders. Garbage collection is handled by obtaining a collection of all of the THardwareModuleHandle objects in the hardware configuration database, iterating across all of its TManualConfigurationRecorder objects and verifying that for each recorder object, there still exists a hardware module in the hardware configuration database. If not, then the corresponding TManualConfigurationRecorder object is automatically deleted from the recorder registry. The TManualRecorderRegistry class 1704 is a monomorphic class which is not normally subclassed by developers. In addition to the above-described methods, class 1704 also includes a RegisterForBootTimeInitiation( ) method which registers with the booting system that the recorder registry exists so that the InitiateAllRecognizers( ) method will be called during the booting process.

Figure 18A:
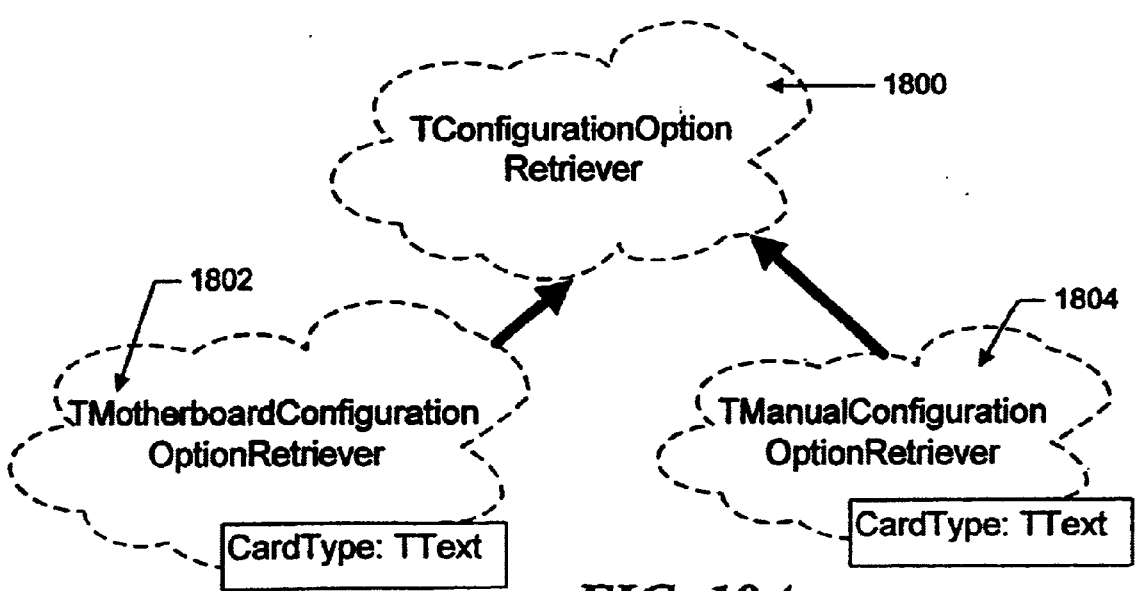
FIGS. 18A and 18B are Booch diagrams illustrating class relationships concerning the configuration option retriever classes.

Referring now to FIG. 18A, the manual module framework further includes several configuration option retriever classes. These classes include the TMotherboardConfigurationOptionRetriever class 1802 and a TManualConfigurationOptionRetriever class 1804, each of which are a subclass of, and thus inherit from, a TConfigurationOptionRetriever class 1800 discussed above in conjunction with FIG. 8. The TMotherboardConfigurationOptionRetriever class 1802 is a monomorphic class which is not normally subclassed by developers.

The TMotherboardConfigurationOptionRetriever class 1802 implements the protocols for retrieving resource requirements such as possible resource assignments, constraints in resource assignments and default resource assignments corresponding to the factory setting of the motherboard, from persistent configuration option files, such as configuration files of EISA and ISA expansion cards. These default configurations can be added to the configuration option database with the assistance of the computer viewer or provided by card manufacturers.

The TMotherboardConfigurationOptionRetriever class 1802 includes a method, GetVendorInformation( ), which returns vendor specific information for an expansion card and a method, GetCardType( ), which returns the type for the expansion card.

The TMotherboardConfigurationOptionRetriever class 1802 also includes a method, GetFunctionCount( ), which returns the number of functions on an expansion card and a method, GetFunctionInformation( ), which returns the function information for an individual function on an expansion card.

A GetPossibleAssignments( ) method of class 1802 retrieves and returns the choices in resource assignments for an individual function on an expansion card and a GetDefaultAssignment( ) method of class 190 returns the default resource assignment for an individual function corresponding to the factory setting of the card.

Figure 18B:
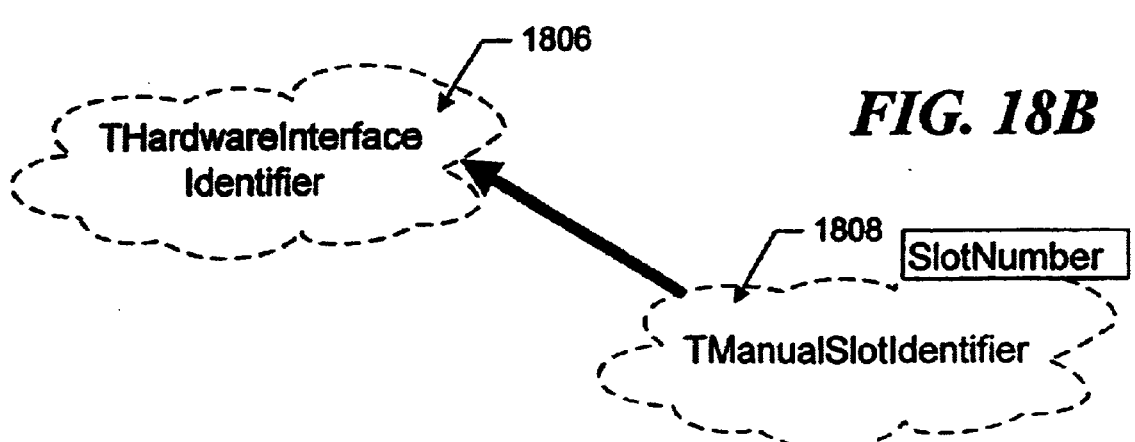

Referring momentarily to FIG. 18B, a TManualSlotIdentifier class 1808 represents the hardware identifier for the slots of a manual bus such as ISA, VESA, etc. and is a sub-class of a THardwareInterfaceIdentifier class 1806. A ManualSlotIdentifier object instantiated from class 1808 encapsulates a SlotNumber which is used as a key to retrieve the configuration information from the configuration option database.

Referring again to FIG. 18A, the TManualConfigurationOptionRetriever class 1804 has instantiated therefrom objects which retrieve the resource requirements and other configuration information for manual expansion cards from persistent configuration files. The TManualConfigurationOptionRetriever class 1804 implements the protocols for retrieving resource requirements, such as possible resource assignments, constraints in resource assignments and default resource assignment corresponding to the factory setting of a manually-configured I/O expansion card, from persistent configuration files (such as configuration files of EISA and ISA type expansion buses and cards). The TManualConfigurationOptionRetriever class 1804 is a monomorphic class which is not normally subclassed by developers.

The TManualConfigurationOptionRetriever class 1804 includes a method, GetFunctionCount( ), which returns the number of functions on an expansion card and another method, GetFunctionInformation( ), which returns the function information for an individual function on the expansion card.

Class 1804 also includes a method, GetPossibleAssignments( ), which returns the choices in resource assignments for an individual function on the card and another method, GetDefaultAssignment( ), which returns a default resource assignment for an individual function corresponding to the factory setting of the expansion card.

Class 1804 further includes a method, GetVendorInformation( ), which returns vendor specific information for an expansion card and a further method, GetCardType( ), which returns the type of the card.

Figure 19:
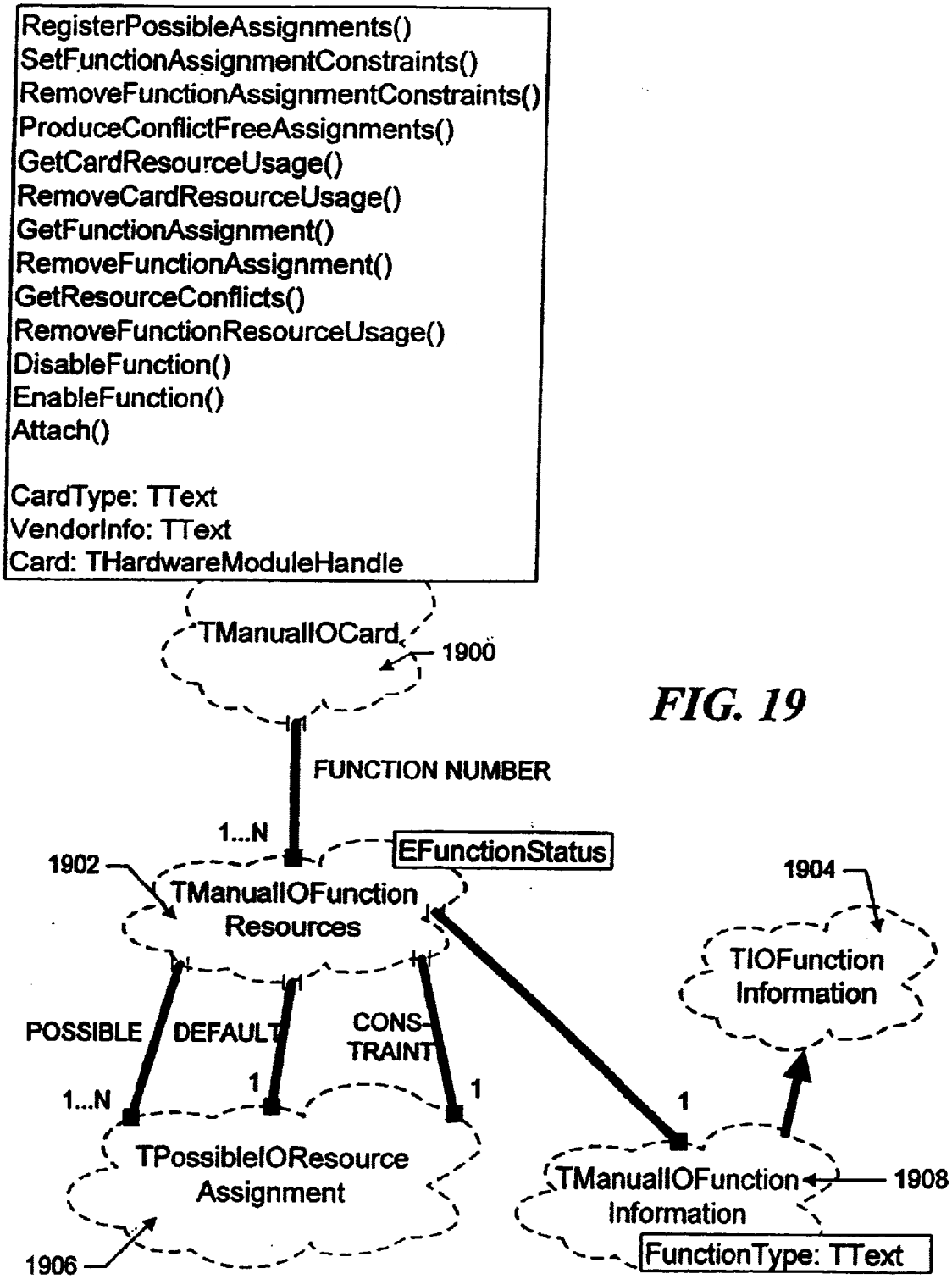
FIG. 19 is a Booch diagram illustrating class relationships concerning manual I/O card classes.

Referring now to FIG. 19, in general overview, the manual module framework also includes TManualIOCard class 1900. Objects instantiated from the TManualIOCard class 1900 represent the behavior of manually-configured expansion cards such as manual ISA expansion cards, manual Local bus expansion cards and the motherboard. The TManualIOCard class 1900 is associated with a TManualIOFunctionResources class 1902.

A ManualIOFunctionResources object instantiated from class 1902 encapsulates the resource requirements such as possible resource assignments, resource assignment constraints and a default resource assignment for an individual function on a manual I/O card or motherboard. A ManualIOFunctionResources object also encapsulates the TManualIOFunctionInformation for the function. The TManualIOFunctionResources class 1900 includes a private attribute which is a deque of objects instantiated from the TPossibleIOResourceAssignment class 1906 and a private attribute which an object instantiated from a TManualIOFunctionInformation class 1908.

The TPossibleIOResourceAssignment class 1906 is used to create objects which encapsulate possible resource assignment sets for a particular function, default assignment sets and constraint sets for the function as described above. The TManualIOFunctionInformation class 1908 encapsulates information such as function type for an I/O function on a manual expansion card or motherboard.

The TManualIOCard class 1900 is a monomorphic class which is not normally subclassed by developers. A ManualIOCard object instantiated from this class encapsulates information, such as generic card and vendor specific information of a manually-configured card such as ISA card, a Local bus card and a motherboard. ManualIOCard objects also include a private deque of ManualIOFunctionResource objects, one for each function on the card. As discussed above, during installation of a Manual I/O card or a motherboard, a computer viewer object uses a ManualIOCard object to communicate with the resource conflict resolver.

Other responsibilities of the ManualIOCard object are: (1) registration of resource requirements such as the possible resource assignments and constraints in resource assignments for the functions on the card with the resource conflict resolver object; (2) invocation of an appropriate method of the resource conflict resolver object to produce conflict-free resource assignments for individual functions on the card being installed; (3) attachment of the ManualIOCard object with the default connector object on the card; and (4) disabling and enabling individual functions on the card.

The TManualIOCard class 1900 includes a plurality of member functions including a method, RegisterPossibleAssignments( ), for registering the possible resource assignments for all functions on a manual I/O card or a motherboard with the resource conflict resolver object. Possible resource assignments for each function on the expansion card must be set up by instantiating the appropriate PossibleIOResourceAssignment objects before call to RegisterPossibleAssignments( ).

The class 1900 also includes another method, SetFunctionAssignmentConstraints( ), for registering constraints in a resource assignment for an I/O function on a card with the resource conflict resolver object and a further method, RemoveFunctionAssignmentConstraints( ) for removing resource assignment constraints associated with an I/O function that does not have a resource assignment. The method for registering constraints in a resource assignment for an I/O function is used by clients to force the resource assignment for an I/O function to a specific value. The constraints must not be in conflict with the possible resource assignments for the card. If there is any conflict in the constraints, this method throws an exception. Each of the aforementioned methods throw an exception if the card or the function is not registered with the resource conflict resolver object.

Class 1900 also includes a method, ProduceConflictFreeAssignments( ), which produces a conflict-free resource assignment for I/O functions on the motherboard and expansion cards in the system for a specified boot period. The boot period indicates to the resource conflict resolver object to produce the resource assignment for this boot operation (kThisBoot) or a next boot operation (kNextBoot). This method generates IOFunctionResourceAssignment objects for all I/O functions currently without resource assignments. If there are any resource conflicts, this method creates a IOResourceConflict object and throws an exception if any resource conflicts are encountered while producing the resource assignment.

Class 1900 further includes a method, GetCardResourceUsage( ), which is called to get conflict-free resource assignments for all I/O functions on a card identified by the SlotID. The conflict-free resource assignments are created by a prior call to the ProduceConflictFreeAssignments( ) method. The GetCardResourceUsage( ) method throws an exception if the card is not registered with the resource conflict resolver object.

Class 1900 also includes another method, RemoveCardResourceUsage( ) which is called to remove all resource assignments (encapsulated in IOCardResourceUsage object) for a particular expansion card. This method is typically called when an expansion card is removed from the computer system and the method generates an exception if the resources are in use.

A GetFunctionAssignment( ) method of class 1900 returns a conflict-free resource assignment for an I/O function. A unique HardwareInterfaceIdentifier for the I/O function is passed in as a key to obtain the resource assignment. The configuration recorder object for a card creates the function identifier by subclassing from the TIOFunctionHardwareInterfaceIdentifier class. This method returns the resource assignment for a card, even if the hardware is not physically installed in the computer system and throws an exception if the resource assignment is not created, or if there is any conflict in creating a resource assignment for this I/O function. This method also throws exception if the function is not registered with the resource conflict resolver object. This method is called by the recognizers and control panels only.

A GetResourceConflicts( ) method of class 1900 returns the conflicts in resource assignment for an I/O function. A unique HardwareInterfaceIdentifier for the I/O function is passed in as a key to obtain the resource conflicts. This method throws exception if the function is not registered with the resource conflict resolver object. This method is only called by the recognizer objects and control panel objects.

A RemoveFunctionAssignment( ) method of class 1900 is called to remove the resource assignment (encapsulated in a IOFunctionResourceAssignment object) for an I/O function. This method is called when a I/O function is removed from the computer system. The caller asserts that the resources are not being responded to by the corresponding hardware. This method generates an exception if the resources are in use or if the function is not registered with the resource conflict resolver object.

A RemoveFunctionResourceUsage( ) method of class 1900 is called to remove the resource usage(encapsulated in a TIOFunctionResourceUsage object) associated with an I/O function. The RemoveFunctionResourceUsage( ) method is called when an I/O function is removed from the system. The caller asserts that the resources are not being responded to by the corresponding hardware. This method generates an exception if the resources are in use. This method also throws exception if the function is not registered with the resolver.

An Attach( ) method attaches the ManualIOCard object with the hardware interface identifier for a connector on the card typically the default (edge) connector. A DisableFunction( ) method is called to disable an existing function on a manual card or a motherboard. The caller asserts that the function is electrically isolated. An EnableFunction( ) method, on the other hand, is called to enable a previously disabled function on a manual card or a motherboard.

A GetType( ) method returns the type of the manually-configured card and a SetType( ) method writes the card type to a private attribute. A GetVendorInformation( ) method returns the vendor information and a SetVendorInformation( ) method writes the vendor information to a private attribute.

A GetFunctionResources( ) method reads the ManualIOFunctionResources objects for the functions on the card and a SetFunctionResources( ) writes the ManualIOFunctionResources objects into an internal deque for the functions on the card.

The TManualIOFunctionResources class 1902 is a monomorphic class which is not normally subclassed by developers. The TManualIOFunctionResources class 1902 includes a plurality of member functions including a GetPossibleAssignments( ) method which reads the possible resource assignments for the function and a SetPossibleAssignments( ) method which writes the possible resource assignments for the function.

A GetDefaultAssignment( ) method reads the default resource assignment for the function and a SetDefaultAssignment( ) method writes the default resource assignment for the function. The default resource assignment corresponds to the factory setting for the function on the card.

A GetAssignmentConstraint( ) method reads the constraints in resource assignments for the function and a SetAssignmentConstraint( ) writes the constraints in resource assignments for the function.

The TManualIOFunctionResources class 1902 also includes a GetFunctionInformation( ) method and a SetFunctionInformation( ) method. The GetFunctionInformation( ) method reads the TManualIOFunctionInformation( ) for the function and the SetFunctionInformation( ) writes the TManualIOFunctionInformation for the function.

The TManualIOFunctionResources class 1902 also includes a GetFunctionStatus( ) method and a SetFunctionStatus( ) method. The GetFunctionStatus( ) method returns a first enumerated value (kDisabled) if the function on the card is disabled. The SetFunctionStatus( ) method writes the status for the function and when an I/O function is disabled, the resource conflict resolver object will not produce a resource assignment for that I/O function and those resources may be allocated to other I/O functions in the system. If the disabled I/O function is electrically present in the system and the resources used by the disabled I/O function are assigned to other I/O functions, there may be problems. The user should ensure that the I/O function is electrically isolated before it is disabled.

The TManualIOFunctionInformation class 1908 is a monomorphic class which is not normally subclassed by developers and includes a plurality of member functions including a GetFunctionType( ) method reads a function type that indicates the I/O operation represented by the function and a SetFunctionType( ) sets the function type.

ISA Bus Framework Classes

FIGS. 20, 21A, 21B and 22 illustrate a set of classes which form an ISA bus framework. The ISA bus framework includes a plurality of classes which are used in dynamic booting of operating system device drivers for devices installed on the motherboard and expansion cards installed in an ISA based machine.

Figure 20:
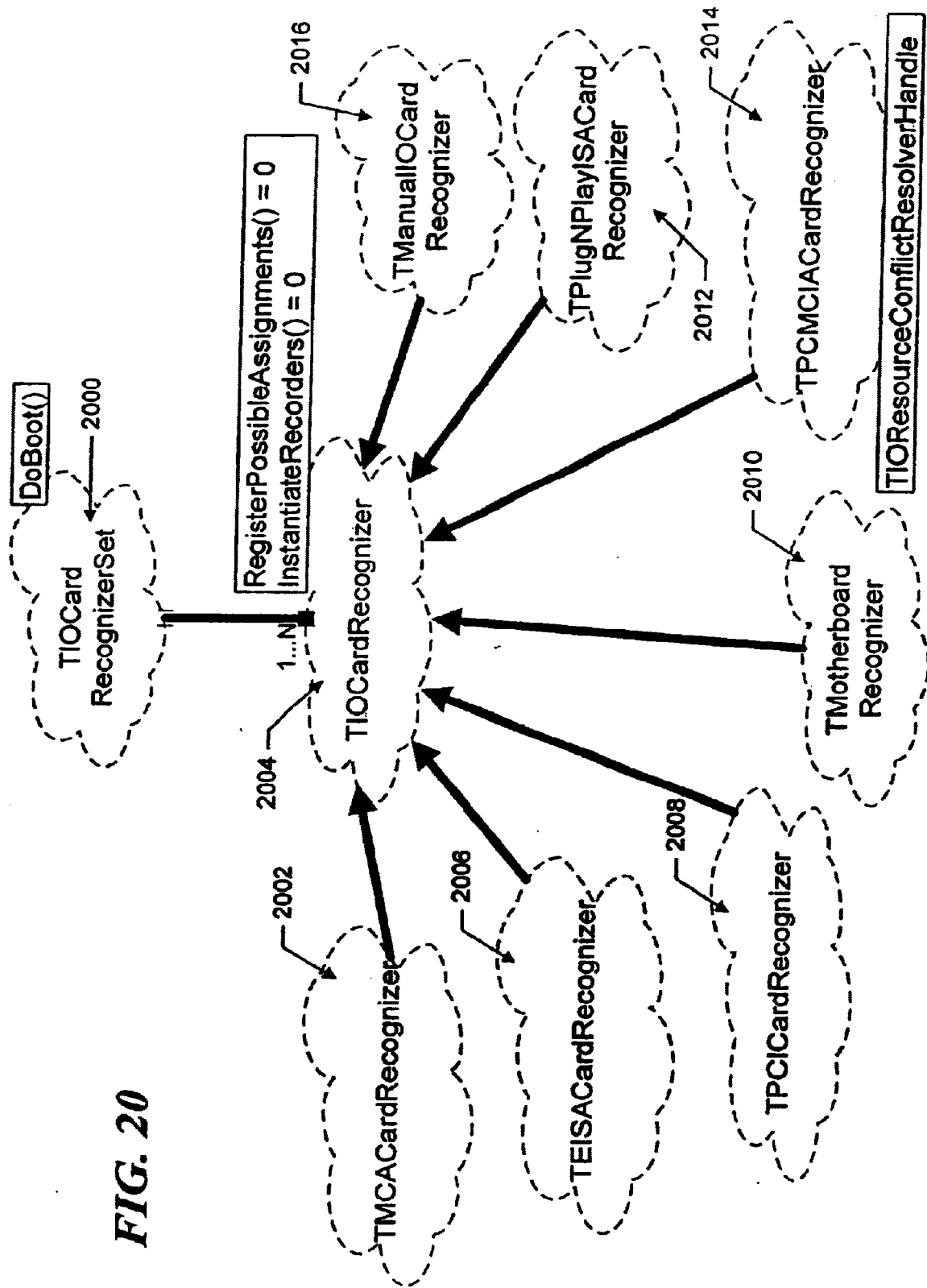
FIG. 20 is a Booch diagram illustrating class relationships concerning card recognizer classes.

Referring now to FIG. 20, an illustrative ISA framework includes a TMCACardRecognizer class 2002, a TEISACardRecognizer class 2006, a TPCICardRecognizer class 2008, a TMotherboardRecognizer class 2010, a TPCMCIACardREcognizer class 2014, a TPlugNPlayISACardRecognizer class 2012 and a TManualIOCardRecognizer class 2016 and As shown in FIG. 20, the TMotherboardRecognizer class 2010 is derived from a TIOCardRecognizer class 2004 and represents the recognizer for the mother board of the system. A MotherboardRecognizer object is instantiated from the TMotherboardRecognizer class 2010 and determines the functions on the motherboard and registers the possible resource assignments of the functions with the resource conflict resolver object. The MotherboardRecognizer object is also responsible for instantiating a configuration recorder object for the motherboard of the computer.

The TMotherboardRecognizer class 2010 includes a plurality of member functions including DoBoot( ) method and a method (RegisterPossibleAssignments( )) which is called to register the possible resource assignments for each function on the motherboard with the resource conflict resolver object. The possible resource assignments for the motherboard functions are retrieved from the configuration option database.

The TMotherboardRecognizer class 2010 also includes a method (InstantiateRecorders( )) which is called to instantiate an appropriate configuration recorder object for the motherboard.

The TManualIOCardRecognizer class 2016 has instantiated therefrom recognizer objects for all manual I/O cards such as traditional ISA and Local bus cards in the system. The recognizer objects determine which manual I/O cards are in the computer system and register their possible resource assignments with the resource conflict resolver object. It is also responsible for instantiating an appropriate configuration recorder object for each manual I/O card in the system.

As can be seen in FIG. 20, the TManualIOCardRecognizer class 2016 is derived from a TIOCardRecognizer class 100 described above in conjunction with FIG. 7. ManualIOCardRecognizer objects are instantiated by booting system in accordance with a set of recognizers identified in a TIOCardRecognizerSet object (instantiated from the TIOCardRecognizerSet class 2000) and registers the possible resource assignments for the manually-configured I/O cards with the resource conflict resolver object. The TManualIOCardRecognizer objects are also responsible for instantiating the configuration recorder objects for the manual I/O cards in the computer and can be destroyed after invoking a DoBoot( ) method which is a member function of the TManualIOCardRecognizer class 2016.

The TManualIOCardRecognizer class 2016 includes a plurality of member functions including a method (RegisterPossibleAssignments( )) which registers the possible resource assignments for the functions on a Manual I/O card such as traditional ISA or Local bus card with the resource conflict resolver object. Such possible resource assignments for the functions are retrieved from the configuration option database as previously described.

The TManualIOCardRecognizer class 2016 also includes a method (InstantiateRecorders( )) which is called to determine which manually-configured expansion cards are in a system and to instantiate the appropriate configuration recorder object for each of the manually-configured expansion cards. The manually-configured cards are determined by searching the hardware configuration database as previously described.

The TPlugNPlayISACardRecognizer class 2012 represents recognizer objects for all Plug & Play ISA cards in the system. In a similar manner, the TMCACardRecognizer class 2002, the TEISACARDRECOGNIZER class 2006 and the TPCMCIACardRecognizer class 2014 are used to instantiate object which represent MCA cards, EISA cards and PCMCIA cards. Objects instantiated from the TPlugNPlayISACardRecognizer class 2012, the TMCACardRecognizer class 2002, the TEISACARDRECOGNIZER class 2006 and the TPCMCIACardRecognizer class 2014 identify the Plug & Play ISA cards, MCA cards, EISA cards and PCMCIA cards in the computer system and register their possible resource assignments with the resource conflict resolver object. Objects 2002, 2006 2008, 2012 and 2014 are also responsible for configuring each ISA card with conflict-free resource assignments and for instantiating the appropriate configuration recorder object for each ISA card in the computer system.

Classes 2002, 2006, 2008, 2012 and 2014 are derived from the TIOCardRecognizer class 2004 and represent the recognizers for all ISA expansion cards in the system. Object are instantiated from these classes by the booting system using information in the IOCardRecognizerSet object and register the possible resource assignments for the ISA cards with the resource conflict resolver. The corresponding recognizer objects are also responsible for instantiating configuration recorder objects for all the ISA cards in the computer system and for configuring the ISA cards with conflict-free resource assignments computed by the resource conflict resolver object. The recognizer objects can be destroyed after invoking a DoBoot( ) method which is a member function of the recognizer classes 2002, 2006, 2008, 2012 and 2104.

The TPlugNPlayISACardRecognizer class 2012, the TMCACardREcognizer class 2002 and the TEISACARDRECOGNIZER class 2006 include a plurality of member functions including a method (RegisterPossibleAssignments( )) which registers the possible resource assignments for a Plug & Play ISA card with the resource conflict resolver object. The possible resource assignments are retrieved from the cards.

Classes 2002, 2006, 2008, 2102 and 2104 also include a method (InstantiateRecorders( )) which is called to recognize the corresponding ISA cards in a system and to instantiate the appropriate configuration recorder objects for each ISA card in the system. Each ISA card includes a read only memory in which is stored an identification code which uniquely identifies the card as being an ISA card. Each ISA card can thus be recognized by retrieving from the cards the unique card identification codes which are stored in the read only memory of the card. The cards are also capable of being programmed with resource assignments and this capability can be used to configure the ISA cards with the conflict-free resource assignments computed by the resource conflict resolver object.

The RegisterPossibleAssignments( ) method and the InstantiateRecorders( ) methods have the following form:
virtual void RegisterPossibleAssignments (const TIOConflictResolverHandle& resolver);
virtual void InstantiateRecorders (const TIOConflictResolverHandle& resolver,
   const THardwareModuleMaker& parentDevice,
   const short slotIndex, const short slotCount,
const THardwareInterfaceIdentifer& parentInterface,
const TInterruptHandlerReference& parentHandler);

The configuration information of a card can be viewed by double-clicking a card icon which is displayed with a computer viewer object. When the user double-clicks on the card icon, the configuration information for the card is retrieved from a THardwareInterfaceIdentifier object for the slot into which the card is plugged. For motherboards, the configuration information is retrieved from a special THardwareInterfaceIdentifier object created for motherboard. The configuration information for the card is stored in the THardwareInterfaceIdentifier object for the slot by the corresponding recognizer object. For manual I/O cards, the configuration information is also stored in the THardwareInterfaceIdentifier object by the card viewer object.

The resource assignments for manual I/O cards can be changed using the card viewer object. Any change in resource allocation is checked for any conflicts by the TManualIOCard object in the same manner as for a newly added card. The ISA bus framework does not support any mechanism that allows a user to manually change the configuration of auto-configurable cards.

If the appropriate configuration recorder object for a card is not found, the bus object spawns a new thread that waits for the card's configuration recorder object to become available in the computer system. This thread will be alive even after the bus object gets destroyed. When the Configuration Recorder object for the card is available, it is instantiated. It is assumed that the address space the thread lives in will not go away until system shut down.

Figure 21A:
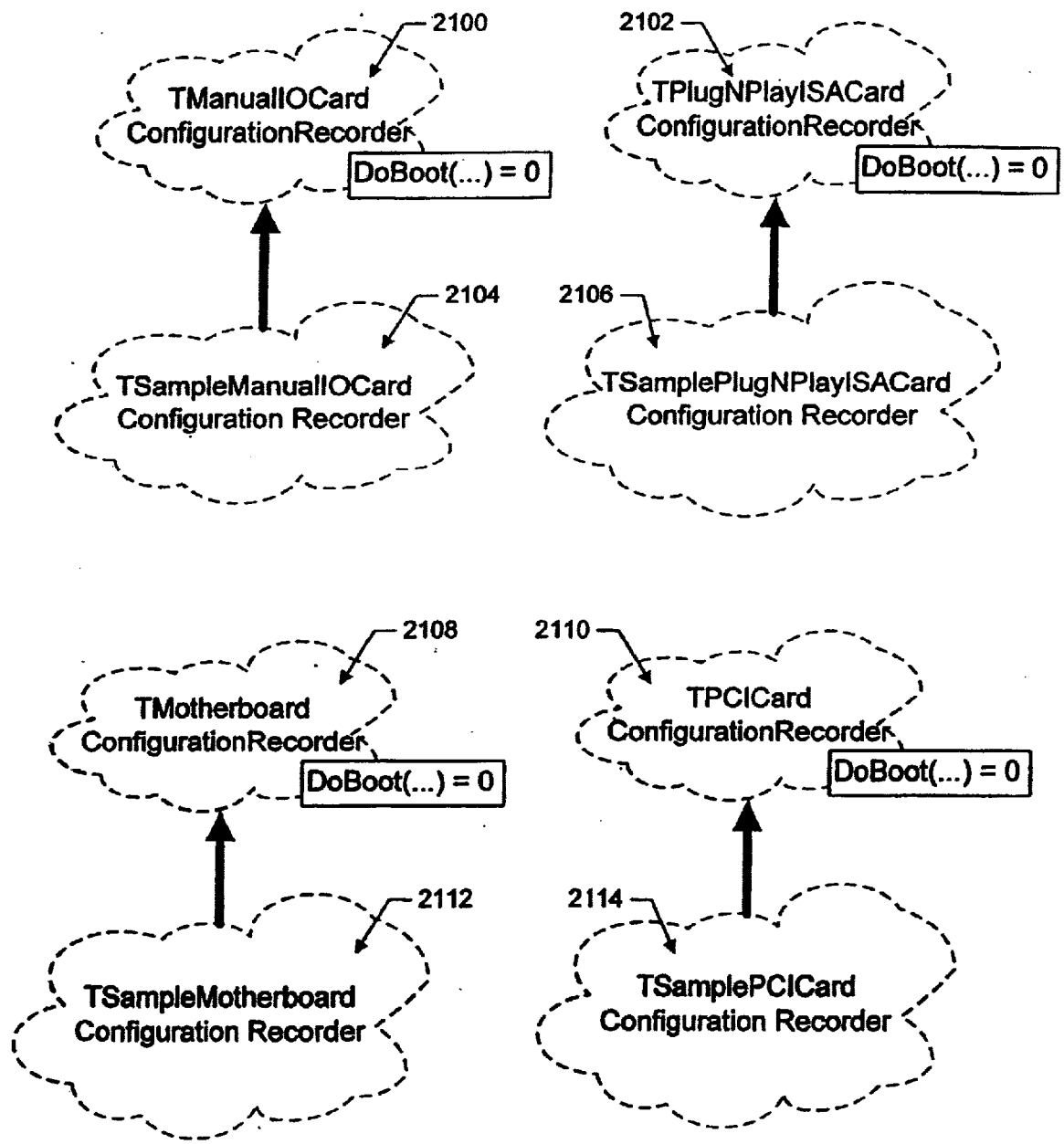
FIGS. 21A and 21B are Booch diagrams illustrating class relationships concerning configuration recorder classes.
Figure 21B:
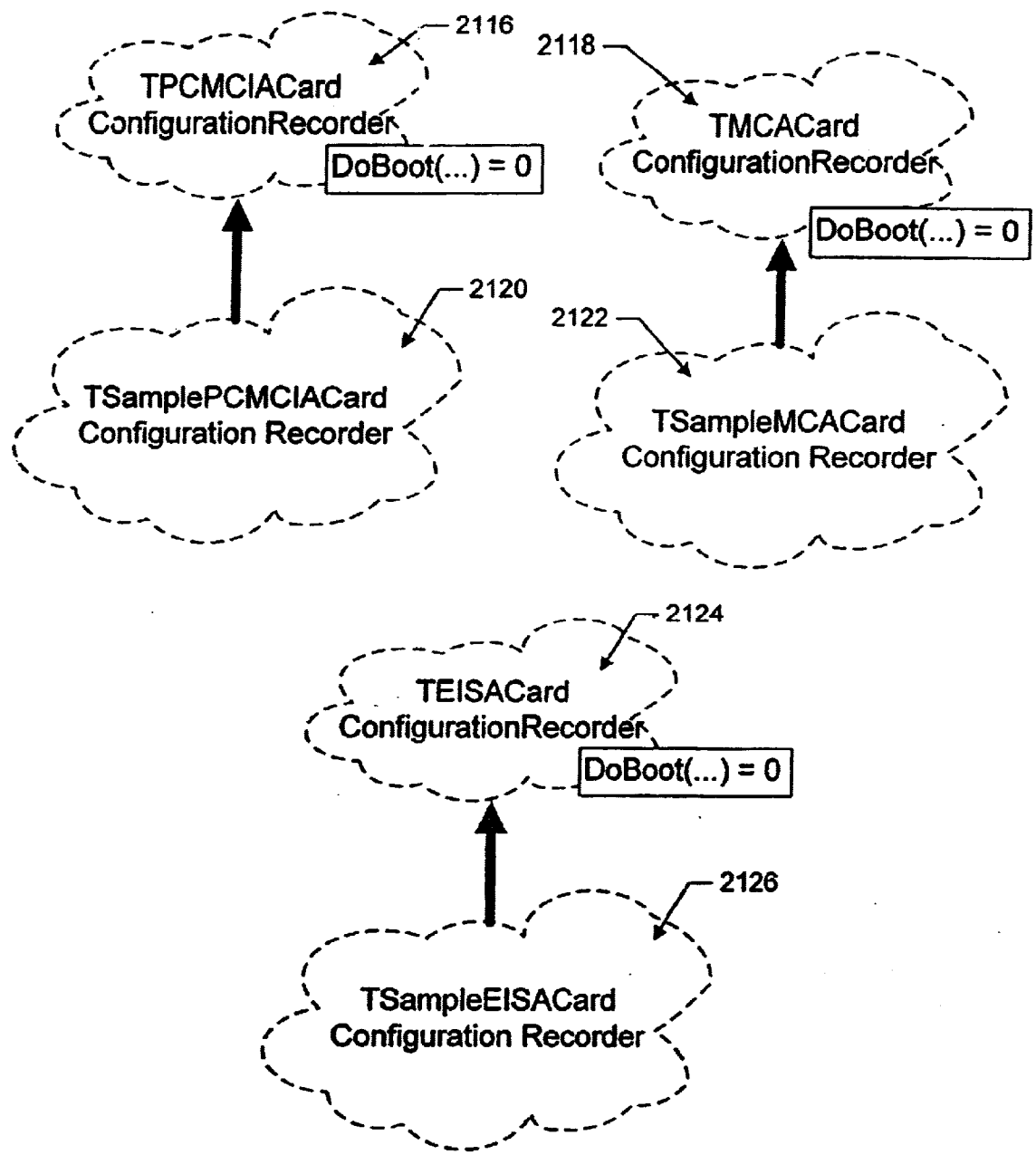

Referring now to FIGS. 21B and 21B, the ISA framework further includes a set of configuration recorder objects. This set includes a plurality of base classes from which subclasses representing specific boards are derived. For example, a TManualIOCardConfigurationRecorder base class 2100 has a derived subclass for a particular card, denoted as a TSampleManualIOCardConfigurationRecorder class 2104, from which a configuration recorder object for a particular manual I/O card (e.g. a traditional ISA card or a manually-configured local bus card) is instantiated. The configuration recorder object is responsible for registering the manual I/O card and recording its configuration information in the hardware configuration database.

A ManualIOCardConfigurationRecorder object is the configuration access manager for a manual I/O card, such as an ISA card or a local bus card, in a computer system having an ISA architecture. Consequently, the ManualIOCardConfigurationRecorder object includes methods which deal directly with the hardware on the card.

The TSampleManualIOCardConfigurationRecorder class 2104 is instantiated during a system boot operation by a TManualIOCardRecognizer object. This class is also instantiated whenever the user adds a new manual I/O card with the help of the computer viewer object as described above. A SampleManualIOCardConfigurationRecorder object can be destroyed after invoking a DoBoot( ) method which is a pure virtual member function of the TManualIOCardConfigurationRecorder class 2100. Consequently, each class which is derived from the TManualIOCardConfigurationRecorder class 2100 must implement the DoBoot( ) method. The DoBoot( ) method is invoked by a ManualIOCardRecognizer object in order to instantiate a configuration recorder object for a manual I/O card in an ISA machine. This method is also invoked by the Card Viewer in order to instantiate the Configuration Recorder for a new Manual I/O card. The DoBoot( ) method of class 2100 has the form:

virtual void DoBoot (const TManualIOCard& card, const TCollection<TManualIOFunctionResources>& funcs, const THardwareIntefaceIdentifier& slotID)=0

This method (1) creates a THardwareModuleMaker object that represents the I/O card; (2) creates a THardwareInterfaceIdentifier object to represent each connector on the card and stores the resources associated with the connector (such as parent TInterruptHandler, InterruptSocketNumber, etc.) in that object; (3) adds the THardwareInterfaceIdentifier objects created above to the parent THardwareModuleMaker object passed in; and (4) registers the card (THardwareModuleMaker) with computer hardware configuration database.

The motherboard configuration recorder classes 2108 and 2112 are constructed and behave in an analogous fashion to the manual 10 cards configuration recorder classes 2100 and 2104, respectively.

The framework includes other classes which are used to instantiate configuration recorder objects for other ISA cards, such as Plug N Play cards, PCI cards, PCMCIA cards, MCA cards and EISA cards. For example, a TPlugNPlayISACardConfigurationRecorder class 2102 is an abstract base class and must be subclassed before a configuration recorder object for an individual Plug & Play ISA card can be instantiated therefrom. In FIG. 21A, such a subclass is the TSamplePlugNPlayISACardConfigurationRecorder class 2106 which would be tailored for a particular card. A PlugNPlayISACardConfigurationRecorder object instantiated from a TSamplePlugNPlayISACardConfigurationRecorder class 2106 is the configuration access manager for a Plug & Play ISA card. The TSamplePlugNPlayISACardConfigurationRecorder class is instantiated during a boot operation by a corresponding PlugNPlayISACardRecognizer object for the card. A SamplePlugNPlayISACardConfigurationRecorder object can be destroyed after invoking its DoBoot( ) method which is a member function of the TPlugNPlayISACardConfigurationRecorder class 2102.

Each class derived from the TPlugNPlayISACardConfigurationRecorder class 2102 must implement the DoBoot( ) method. The DoBoot( ) method is invoked by a TPlugNPlayISACardRecognizer object in order to instantiate the configuration recorder object for a Plug & Play ISA card in the system. The DoBoot( ) method of class 2102: (1) creates a THardwareModuleMaker object that represents the Plug & Play ISA card; (2) creates a THardwareInterfaceIdentifier object to represent each connector on the card and stores the resources associated with the connector (such as parent TInterruptHandler, InterruptSocketNumber, etc.) in that object; (3) adds the THardwareInterfaceIdentifier objects created above to the parent ThardwareModuleMaker object passed in; and (4) registers the card (THardwareModuleMaker) with the computer hardware configuration database. The remaining classes 2110, 2114; 2116, 2120; 2118, 2122 and 2124, 2126 function in an analogous manner.

Figure 22:
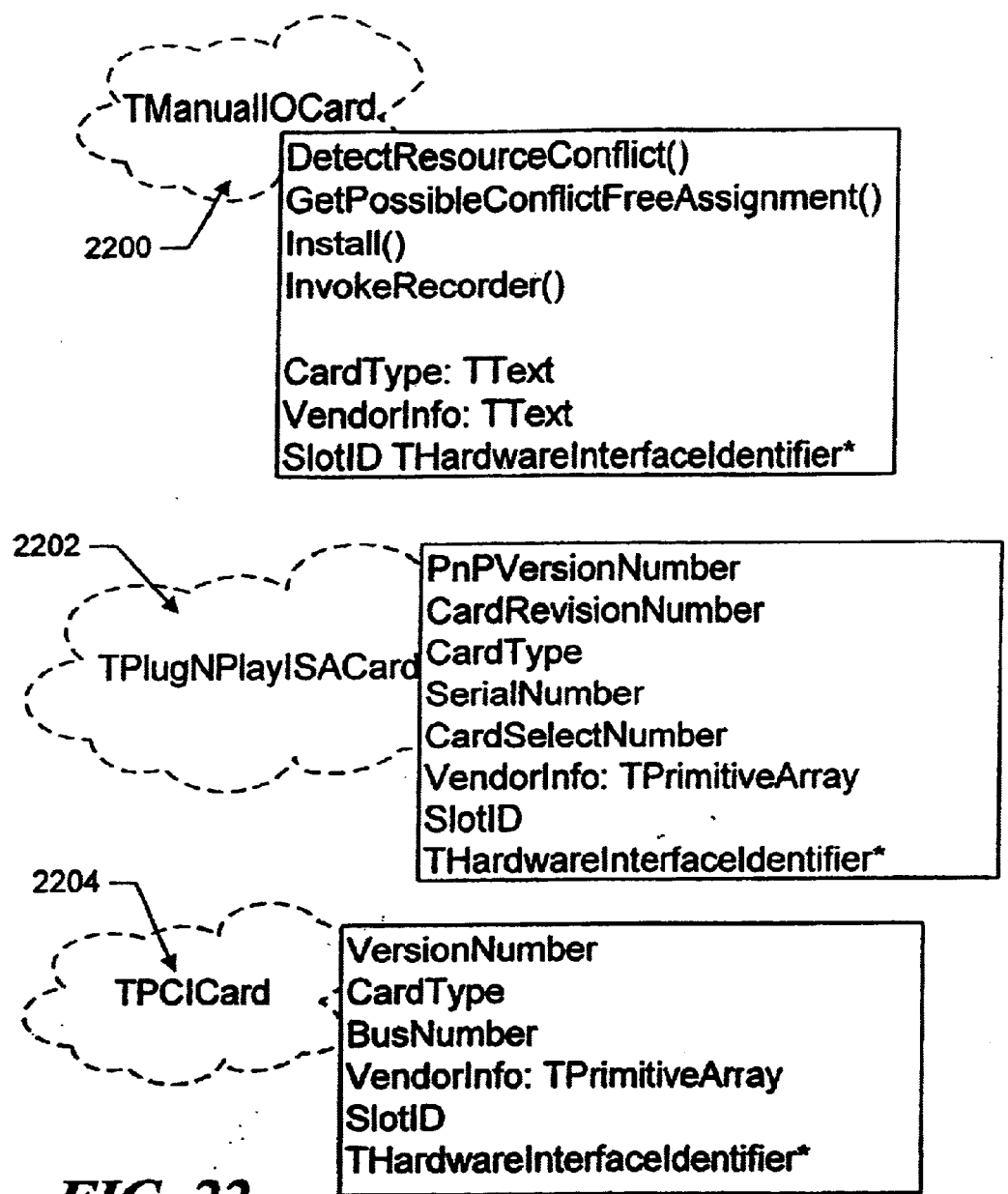
FIG. 22 are Booch diagrams illustrating class relationships concerning manual, plug-and-play and PCI card classes.

Referring now to FIG. 22, the ISA bus framework also includes a TManualIOCard class 2200 from which a TManualIOCard object is instantiated. A TManualIOCard object represents the behavior of a manually-configured I/O component such as an ISA card, a local bus card or a system board device in an ISA based machine. This object encapsulates the card's information, such as generic card and vendor specific information. This object can be instantiated by a TManualIOCardRecognizer object, a TMotherboard- Recognizer object or a card viewer object and passed to the corresponding configuration recorder objects.

The TManualIOCard class 2200 includes a plurality of member functions including a DetectResourceConflict( ) method which checks the proposed resource assignment for cards being added to the system to make sure that there is no conflict in the resource allocation of the card. If there is no conflict, the method returns a first enumerated value (kNoConflict). If there is a resource conflict and if the resource conflict can be resolved during a next boot operation the method returns a second different value (kNoConflictAfterBoot). If there is conflict and it can not be resolved automatically, the method returns a third value (kConflict). The method also makes a copy of a IOResourceAssignments object passed in during instantiation and returns information about the conflicting functions for the proposed resource assignment in a conflicts argument of the method. The proposed resource assignments are compared with the existing resource assignments to detect a conflict and proposed resource assignments, obviously, must not themselves conflict with the possible resource assignments. This method has the form:

virtual ConflictResult DetectResourceConflict (const TIOCardResourceUsage& proposal,
TCollection<TIOResourceConflict>conflicts);

Another method, GetPossibleConflictFreeAssignments( ), is called to obtain information about conflict-free resource assignments currently available and conflict-free resource assignments that will be available after a reboot operation is performed. The selection of currently-available TIOResourceAssignments from a IOCardResourceUsage collection of free resources will cause the GetPossibleConflictFreeAssignments( ) method to return a first value (kNoConflict). The selection of IOResourceAssignments from an IOCardResourceUsage collection of resources that will be available after a reboot operation will cause the GetPossibleConflictFreeAssignments( ) method to return a second value (kNoConflictAfterBoot). This method has the form:

virtual void GetPossibleConflictFreeAssignments (const TIOCardResourceUsage& possibles,
TCollection<TIOCardResourceUsage>& freeNow,
TCollection<TIOCardResourceUsage>& freeAfterBoot) const;

An Install( ) method updates the hardware configuration database with the configuration information for the new card added, or the change in configuration information for an existing card. This method stores the appropriate value of the corresponding THardwareInterfaceIdentifier in the parent object. This method should be called only after invoking the aforementioned DetectResourceConflict( ) method so that potential resource conflicts can be detected before the resource assignments are stored. The method throws an exception if a previous call to the DetectResourceConflict( ) method returns the enumerated value (kConflict) indicating that a conflict in resource assignments has already been discovered.

An InvokeRecorder( ) method of class 2200 is called to instantiate an appropriate configuration recorder object if no conflicts in resource allocation have been detected. This method throws an exception if there is any conflict in the resource allocation. For example, an exception will be thrown if a previous call to the DetectResourceConflict( ) method returned the enumerated value (kConflict) which indicates that an unresolvable conflict has been detected or the value (kNoConflictAfterBoot) which indicates that a resolvable conflict has been detected.

The TManualIOCard class 2200 further includes a method, GetType( ), which returns the type of the manually-configured card and a method SetType( ) which writes the card type to a private attribute. A GetVendorInformation( ) method of class 2200 returns the vendor information and a SetVendorInformation( ) method writes the vendor information to another private attribute.

A SetSlotIdentifier( ) method of class 2200 writes the THardwareInterfaceIdentifier for the slot in which the card is plugged in a private attribute and a GetBusType( ) method returns an enumerated value, kManualIOCard type indicated the bus type on the board.

A TPlugNPlayISACard class 2202 representing a Plug and Play ISA card includes a plurality of methods including a GetPlugNPlayVersionNumber( ) method for reading a Plug & Play version number used by the card, a SetPlugNPlayVersionNumber( ) method for setting the Plug & Play version number used by the card, a GetCardRevisionNumber( ) method for reading the card's revision number and a SetCardRevisionNumber( ) method for setting the card's revision number.

The class 2202 further includes a GetCardType( ) method for reading the type of the card, a SetCardType( ) method for setting the type of card, a GetSerialNumber( ) method for reading the serial number of the card which is used to distinguish two cards of same type and a SetSerialNumber( ) method for setting the serial number of the card.

Also includes are a GetCardSelectNumber( ) method for reading a card select number assigned to the card during a Plug & Play isolation phase, a SetCardSelectNumber( ) method for setting the card select number for the card, a GetVendorInformation( ) method for reading the vendor specific information for the card, a SetVendorInformation( ) method for writing the vendor specific information for the card, a SetSlotIdentifier( ) method for setting an identification code for the slot where the card is plugged in and the GetBusType( ) method which returns an enumerated kPlugNPlayISA value.

In general overview, a TPlugNPlayISACard object instantiated from the TPlugNPlayISACard class 2202 represents the behavior of a Plug & Play ISA card in a system. For each Plug & Play ISA card, a PlugNPlayISACard object representing the card and a collection of TPlugNPlayISAFunctionResources objects for the functions on the card are created and passed to the PlugNPlayISACardConfigurationRecorder object.

A TPCICard class 2204 in a like manner represents a PCI card in the system. Is encapsulates analogous data to a PlugNPlayISACard object including the card version number, type, bus number, vendor information and slotID. Similar methods are used to set and get these values from private attributes.

Figure 23:
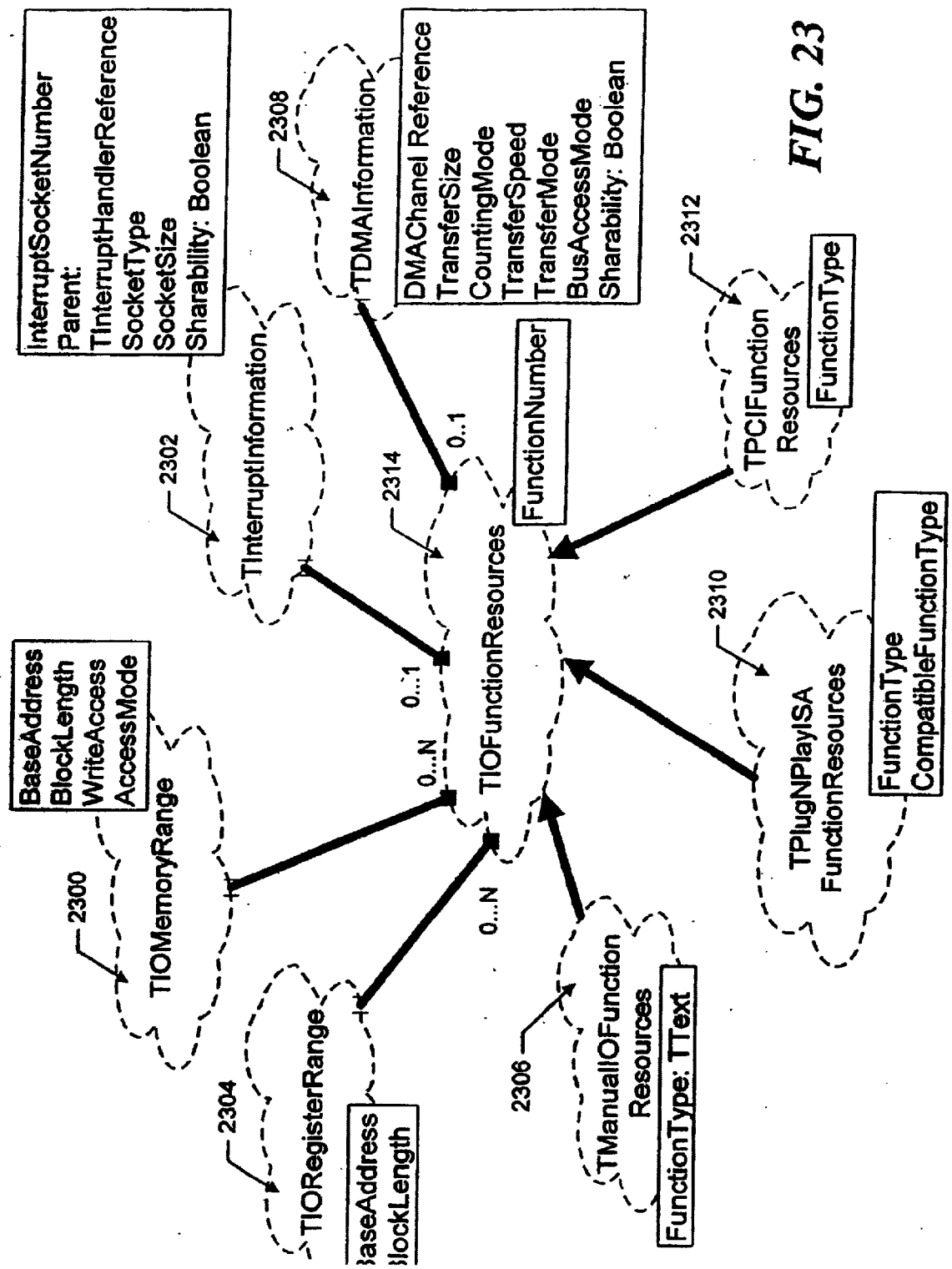
FIG. 23 is a Booch diagram illustrating class relationships concerning function resource classes.

Referring now to FIG. 23, the ISA bus framework also includes a TPlugNPlayISAFunctionResources class 2310 and a TManualIOFunctionResources class 2306. The TPlugNPlayISAFunctionResources class 2310 represents system resources used by an individual function on a Plug & Play ISA card. As shown in FIG. 23, the TPlugNPlayISAFunctionResources class 2310 is a subclass of the TIOFunctionResources class 2314.

The TPlugNPlayISAFunctionResources class 2310 includes a plurality of member functions including a GetFunctionType( ) method and a SetFunctionType( ) method for respectively reading and setting the function type into a private attribute. A function type indicates the I/O operation represented by the function.

Class 2310 also includes a method, GetCompatibleType( ) for reading a compatible device type and a method, SetCompatibleType( ), for setting the compatible device type. The existence of a compatible device type indicates other devices compatible with the device on which the function is located.

The TIOFunctionResources class 2314 contains nested classes that encapsulate information concerning various resources needed by the function. These classes include TIORegisterRange 2304 which encapsulates information relating to I/O register ranges, TIOMemoryRange 2300 which encapsulates information relating to memory ranges required by the function, TInterruptInformation 2302 which encapsulates information relating to interrupt sockets and TDMAInformation 2308 which encapsulates information relating to DMA channels.

Figure 24:
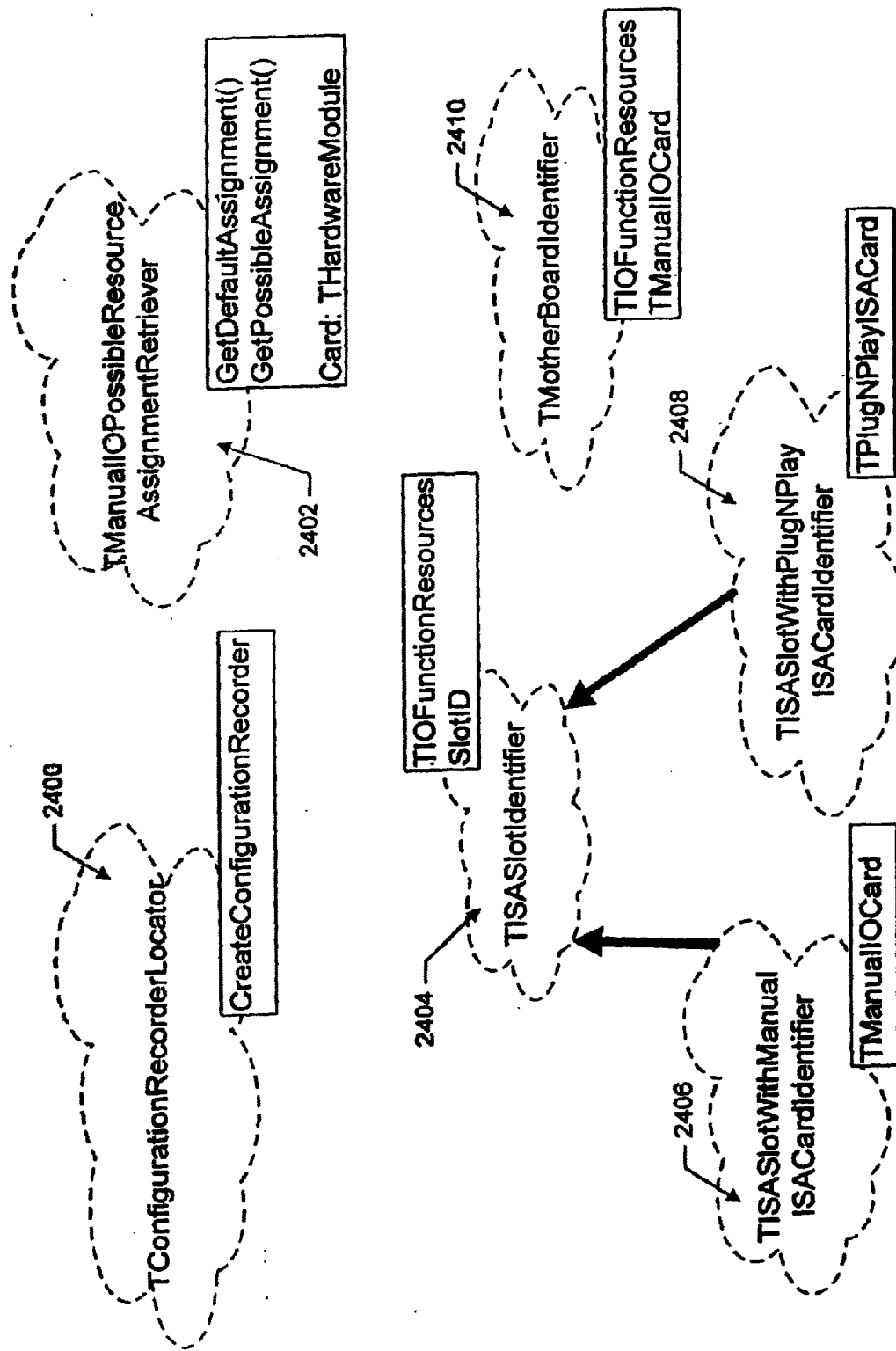
FIG. 24 are Booch diagrams illustrating class relationships concerning various miscellaneous classes.

Referring now to FIG. 24, the ISA bus framework is shown to further include a TISASlotWithPlugNPlayISACardIdentifier class 2408, which represents the THardwareInterfaceIdentifier object for a slot into which is plugged a card of the Plug & Play ISA type, a TISASlotWithManualISACardIdentifier class 2406 which represents the THardwareInterfaceIdentifier object for a slot into which is plugged a card of the manually-configured type. Both classes 2406 and 2408 are derived from a TISASlotIdentifier class 2404. The TISASlotIdentifier class 2404 represents the THardwareInterfaceIdentifier for an ISA slot. The TISASlotIdentifier class 2404 includes a plurality of member functions, including a GetFunctionResources( ) method and a SetFunctionResources( ) method which respectively read and set the function resources used by the card. Class 2404 also includes a GetSlotID( ) method and a SetSlotID( ) method for reading and setting the slot's identifier.

The ISA bus framework also includes a TConfigurationRecorderLocator class 2400, a TManualIOPossibleResourceAssignmentRetriever class 2402 and a TMotherboardIdentifier class 2410. The TMotherboardIdentifier class 2410 represents a THardwareInterfaceIdentifier object created for a motherboard in order to store the configuration information for the motherboard devices. The TMotherboard Identifier class 2410 includes a GetFunctionResources( ) method and a SetFunctionResources( ) method which, respectively, read and set the function resources used by the card in a private attribute. The TMotherboardIdentifier class 2410 also includes a GetCard( ) method and a Setcard( ) method which respectively read and set the card object.

The TManualIOPossibleResourceAssignmentRetriever class 2402 instantiates an object which is responsible for retrieving the default I/O resource assignment and the possible I/O resource assignment information for a function on a specific manually-configured I/O Card such as manual ISA card, Local bus card or Motherboard device. When the user drags a card icon to a slot icon in the computer viewer, a THardwareModuleSignature obtained from the THardwareModule for the card is used to retrieve the constraints from the configuration option database.

While the invention has been described in terms of a preferred embodiment in a specific system environment, those skilled in the art recognize that the invention can be practiced, with modification, in other and different hardware and software environments within the spirit and scope of the appended claims.

What is claimed is:

1. Apparatus for use in a computer system having a plurality of system resources, a plurality of devices, a resource conflict resolution mechanism for generating a conflict-free resource assignment and a plurality of device drivers, the apparatus operating during operation of a program running on the computer system and preventing race conditions caused by the plurality of device drivers attempting to simultaneously access the same system resources under control of the program, and comprising:

(a) a resource lock object having a method operable during the operation of the program for retrieving a conflict free resource assignment for an I/O function of one of the devices generated by the conflict resolution mechanism (b) means operating during the operation of the program and controlled by one of the plurality of device drivers for attempting to acquire the resource lock;

(c) means operable when the resource lock is acquired for obtaining the conflict-free resource assignment so that the one device driver can use the assigned resources during the operation of the program; and (d) means for generating an exception if a predetermined period of time expires before the one device driver acquires the resource lock.

2. Apparatus according to claim 1 wherein the computer system has a memory and the resource conflict resolution mechanism stores the conflict-free resource assignment in the memory and wherein the resource lock is stored in the memory with the conflict free resource assignment.

3. Apparatus according to claim 1 wherein the exception generating means includes means for identifying another holder of the resource lock.

4. Apparatus according to claim 1 wherein the means for attempting to acquire the resource lock comprises means for specifying whether the resource lock is exclusive or shared.

5. A method for use in a computer system having a plurality of system resources, a plurality of devices, a resource conflict resolution mechanism for generating a conflict-free resource assignment and a plurality of device drivers, the method operable during operation of a program running on the computer system and preventing race conditions caused by the plurality of device drivers attempting to simultaneously access the same system resources under control of the program, and comprising the steps of:

(a) creating a resource lock object having a method operable during the operation of the program for retrieving a conflict free resource assignment for an I/O function of one of the devices generated by the conflict resolution mechanism;

(b) during the operation of the program, using one of the plurality of device drivers to attempt to acquire the resource lock;

(c) when the resource lock is acquired, obtaining the conflict-free resource assignment so that the one device driver can use the assigned resources during the operation of the program; and (d) generating an exception if a predetermined period of time expires before the one device driver acquires the resource lock.

6. A method according to claim 5 wherein the computer system has a memory and the resource conflict resolution mechanism stores the conflict-free resource assignment in the memory and wherein step (a) comprises the step of:

(a1) storing the resource lock in the memory with the conflict free resource assignment.

7. A method according to claim 5 wherein step (d) comprises the step of:

(d1) identifying another holder of the resource lock.

8. A method according to claim 5 wherein step (b) comprises the step of:

(b1) specifying whether the resource lock is exclusive or shared.

9. A computer program product for use in a computer system having a plurality of system resources, a plurality of devices, a resource conflict resolution mechanism for generating a conflict-free resource assignment and a plurality of device drivers, the computer program product operable during operation of a program running on the computer system and preventing race conditions caused by the plurality of device drivers attempting to simultaneously access the same system resources, and comprising a computer usable medium having computer readable program code thereon, including:
  (a) program code for creating a resource lock object having a method operable during the operation of the program for retrieving a conflict free resource assignment for an I/O function of one of the devices generated by the conflict resolution mechanism;
  (b) program code operable during the operation of the program for using one of the plurality of device drivers to attempt to acquire the resource lock;
  (c) program code operable when the resource lock is acquired, for obtaining the conflict-free resource assignment so that the one device driver can use the assigned resources during the operation of the program; and
  (d) program code for generating an exception if a predetermined period of time expires before the one device driver acquires the resource lock.

10. A computer program product according to claim 9 wherein the computer system has a memory and the resource conflict resolution mechanism stores the conflict-free resource assignment in the memory and wherein the program code for creating a resource lock comprises program code for storing the resource lock in the memory with the conflict free resource assignment.

11. A computer program product according to claim 9 wherein the program code for generating an exception comprises program code for identifying another holder of the resource lock.

12. A computer program product according to claim 9 wherein the program code for for attempting to acquire the resource lock comprises program code for specifying whether the resource lock is exclusive or shared.

13. In a computer system having a plurality of system resources, a plurality of devices, a plurality of device drivers and a resource conflict resolver object having methods for generating conflict-free resource assignments, an apparatus operating during operation of a program running on the computer system and for preventing race conditions caused by a plurality of device drivers attempting to access the same system resource, the apparatus comprising:
  (a) a recognizer object for identifying one of the plurality of system resources assigned to an I/O function of one device of the plurality of devices;
  (b) a resource lock object having a method operable during the operation of the program for retrieving a conflict free resource assignment for the I/O function of the one device generated by the conflict resolver object;
  (c) means for determining whether the I/O function requires exclusive or shared access to the resource assignment;
  (d) means in the resource lock object executable by one of the plurality of device drivers for acquiring a lock for the one system resource assigned to the I/O function of the one device during the operation of the program; and
  (e) means for generating an exception if a predetermined period of time expires before the one device driver acquires the lock.

14. Apparatus according to claim 13 wherein the means for generating an exception includes means for identifying a holder of the lock.

15. Apparatus according to claim 13 wherein the means for acquiring the lock includes means for invoking a first method of the resource lock object.

16. Apparatus according to claim 13 wherein each device driver includes an interrupt handler reference and the apparatus further comprises means for registering the interrupt handler reference of each device driver with the resource lock entry object such that system resources assigned to the corresponding I/O functions are automatically freed when the device no longer requires the system resource.

17. In a computer system having a plurality of system resources, a plurality of devices, a plurality of device drivers and a resource conflict resolver object having methods for generating conflict-free resource assignments, a method operating during operation of a program running on the computer system and for preventing race conditions caused by a plurality of device drivers attempting to access the same system resource, the method comprising the steps of:
  (a) constructing a recognizer object for identifying one of the plurality of system resources assigned to an I/O function of one device of the plurality of devices;
  (b) constructing a resource lock object having a method for retrieving a conflict free resource assignment for the I/O function of the one device generated by the conflict resolver object;
  (c) determining whether the I/O function requires exclusive or shared access to the resource assignment;
  (d) using one of the device drivers during the operation of the program to acquire a lock for the one system resource assigned to the I/O function of the one device; and
  (e) generating an exception if a predetermined period of time expires before the one device driver acquires the lock.

18. A method according to claim 17 wherein step (e) comprises the step of:
  (e1) identifying a holder of the lock to the one device driver.

19. A method according to claim 17 wherein step (d) comprises the step of:
  (d1) invoking a first method of the resource lock object.

20. A method according to claim 17 wherein each device driver includes an interrupt handler reference and the method further comprises the step of:
  (f) registering the interrupt handler reference of each device driver with the resource lock entry object such that system resources assigned to the corresponding I/O functions are automatically freed when the device no longer requires the system resource.

21. In a computer system having a plurality of system resources, a plurality of devices, a plurality of device drivers and a resource conflict resolver object having methods for generating conflict-free resource assignments, a computer program product operating during operation of a program running on the computer system and for preventing race conditions caused by a plurality of device drivers attempting to access the same system resource, the computer program product comprising a computer usable medium having computer readable program code thereon, including:
  (a) program code for constructing a recognizer object for identifying one of the plurality of system resources assigned to an I/O function of one device of the plurality of devices;

(b) program code for constructing a resource lock object having a method for retrieving a conflict free resource assignment for the I/O function of the one device generated by the conflict resolver object;

(c) program code for determining whether the I/O function requires exclusive or shared access to the resource assignment;

(d) program code for using one of the device drivers during the operation of the program to acquire a lock for the one system resource assigned to the I/O function of the one device; and (e) program code for generating an exception if a predetermined period of time expires before the one device driver acquires the lock.

22. A computer program product according to claim 21 wherein the program code for generating an exception comprises program code for identifying a holder of the lock to the one device driver.

23. A computer program product according to claim 21 wherein the program code for acquiring a lock for the one system resource comprises program code for invoking a first method of the resource lock object.

24. A computer program product according to claim 21 wherein each device driver includes an interrupt handler reference and the program code further comprises program code for registering the interrupt handler reference of each device driver with the resource lock entry object such that system resources assigned to the corresponding I/O functions are automatically freed when the device no longer requires the system resource.

* * * * *